(12) United States Patent
Lim et al.

(10) Patent No.: US 12,289,454 B2
(45) Date of Patent: Apr. 29, 2025

(54) METHOD AND APPARATUS FOR IMAGE ENCODING/DECODING, TRANSMITTING FOR BITSTREAM BASED ON AN MPM LIST USING MULTIPLE REFERENCE LINES

(71) Applicant: LX SEMICON CO., LTD., Daejeon (KR)

(72) Inventors: Sung Chang Lim, Daejeon (KR); Hyun Suk Ko, Daejeon (KR); Jung Won Kang, Daejeon (KR); Jin Ho Lee, Daejeon (KR); Ha Hyun Lee, Seoul (KR); Dong San Jun, Daejeon (KR); Hui Yong Kim, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 18/226,432

(22) Filed: Jul. 26, 2023

(65) Prior Publication Data
US 2023/0370615 A1 Nov. 16, 2023

Related U.S. Application Data

(63) Continuation of application No. 17/524,570, filed on Nov. 11, 2021, now Pat. No. 12,143,598, which is a
(Continued)

(30) Foreign Application Priority Data

| Nov. 28, 2017 | (KR) | 10-2017-0160139 |
| Dec. 8, 2017 | (KR) | 10-2017-0168473 |
| Jun. 21, 2018 | (KR) | 10-2018-0071216 |

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/132* (2014.11); *H04N 19/176* (2014.11)

(58) Field of Classification Search
None
See application file for complete search history.

(56) References Cited

U.S. PATENT DOCUMENTS

| 9,838,689 B2 | 12/2017 | Lee et al. |
| 10,506,228 B2 | 12/2019 | Seregin et al. |

(Continued)

FOREIGN PATENT DOCUMENTS

| CN | 103404151 | 11/2013 |
| CN | 105338349 | 2/2016 |

(Continued)

OTHER PUBLICATIONS

Extended European Search Report in European Appln. No. 18883228.1, dated Jan. 12, 2022, 6 pages.
(Continued)

*Primary Examiner* — Chikaodili E Anyikire
(74) *Attorney, Agent, or Firm* — Fish & Richardson P.C.

(57) ABSTRACT

An image encoding/decoding method and apparatus for performing intra prediction mode based intra prediction are provided. An image decoding method may comprise decoding an intra prediction mode of a current block, deriving at least one intra prediction mode from the decoded intra prediction mode of the current block, generating two or more intra prediction blocks using the intra prediction mode of the current block and the derived intra prediction mode, and generating an intra prediction block of the current block based on the two or more intra prediction blocks.

15 Claims, 20 Drawing Sheets

Related U.S. Application Data continuation of application No. 16/767,478, filed as application No. PCT/KR2018/014812 on Nov. 28, 2018, now Pat. No. 11,218,704.

(51) Int. Cl.
*H04N 19/132* (2014.01)
*H04N 19/176* (2014.01)

(56) References Cited

U.S. PATENT DOCUMENTS

| | | | |
|---|---|---|---|
| 10,856,009 | B2 | 12/2020 | Chuang et al. |
| 10,992,963 | B2 | 4/2021 | Ikonin |
| 11,218,704 | B2 | 1/2022 | Lim et al. |
| 11,375,185 | B2 | 6/2022 | Lee et al. |
| 11,438,582 | B2 | 9/2022 | Lee |
| 2011/0038414 | A1 | 2/2011 | Song et al. |
| 2013/0182761 | A1 | 7/2013 | Chen et al. |
| 2013/0215968 | A1 | 8/2013 | Jeong et al. |
| 2014/0133565 | A1 | 5/2014 | Lee et al. |
| 2014/0369426 | A1 | 12/2014 | Li et al. |
| 2015/0103897 | A1 | 4/2015 | Kim et al. |
| 2017/0347095 | A1 | 11/2017 | Panuspone et al. |
| 2017/0347096 | A1 | 11/2017 | Hong et al. |
| 2017/0347103 | A1* | 11/2017 | Yu ................ H04N 19/184 |
| 2017/0347128 | A1 | 11/2017 | Panuspone et al. |
| 2017/0359595 | A1 | 12/2017 | Zhang et al. |
| 2018/0048889 | A1 | 2/2018 | Zhang et al. |
| 2018/0146211 | A1 | 5/2018 | Zhang et al. |
| 2018/0278942 | A1 | 9/2018 | Zhang et al. |
| 2018/0288410 | A1 | 10/2018 | Park et al. |
| 2019/0082194 | A1* | 3/2019 | Chang ............... H04N 19/11 |
| 2019/0116381 | A1 | 4/2019 | Lee et al. |
| 2019/0182481 | A1 | 6/2019 | Lee |
| 2019/0215512 | A1 | 7/2019 | Lee et al. |
| 2019/0246133 | A1 | 8/2019 | Lee |
| 2019/0273919 | A1 | 9/2019 | Lim et al. |
| 2020/0014920 | A1 | 1/2020 | Zhao et al. |
| 2020/0014928 | A1 | 1/2020 | Hsiang |
| 2020/0154118 | A1 | 5/2020 | Yang et al. |
| 2020/0162729 | A1 | 5/2020 | Lee et al. |
| 2020/0162737 | A1 | 5/2020 | Van der Auwera et al. |
| 2020/0195930 | A1 | 6/2020 | Choi et al. |
| 2020/0204824 | A1 | 6/2020 | Lai et al. |
| 2020/0244956 | A1* | 7/2020 | Lee ................ H04N 19/109 |
| 2020/0288135 | A1 | 9/2020 | Laroche et al. |
| 2020/0366900 | A1* | 11/2020 | Jun ................. H04N 19/176 |
| 2020/0413069 | A1 | 12/2020 | Lim et al. |
| 2021/0092413 | A1 | 3/2021 | Tsukuba |
| 2021/0144388 | A1 | 5/2021 | Zhang et al. |
| 2021/0385469 | A1 | 12/2021 | Deng et al. |
| 2022/0070474 | A1 | 3/2022 | Lim et al. |
| 2022/0329798 | A1 | 10/2022 | Kim et al. |

FOREIGN PATENT DOCUMENTS

| | | |
|---|---|---|
| EP | 2770739 | 8/2014 |
| JP | 2003284090 | 10/2003 |
| JP | 2013150178 | 8/2013 |
| KR | 100772576 | 11/2007 |
| KR | 1020140008503 | 1/2014 |
| KR | 101403341 | 6/2014 |
| KR | 20160143588 | 12/2016 |
| KR | 101703332 | 2/2017 |
| KR | 101712104 | 3/2017 |
| KR | 101769938 | 8/2017 |
| KR | 1020170116850 | 10/2017 |
| KR | 1020170124499 | 11/2017 |
| TW | 201724854 | 7/2017 |
| WO | WO 2005022919 | 3/2005 |
| WO | WO 2014050971 | 4/2014 |
| WO | WO 2014098374 | 6/2014 |
| WO | WO 2017176030 | 10/2017 |

OTHER PUBLICATIONS

International Preliminary Report on Patentability and International Search Report in International Appln. No. PCT/KR2018/014812, issued on Jun. 2, 2020, 24 pages (with English translation).

International Search Report and Written Opinion in International Appln. No. PCT/KR2018/014812, mailed on Mar. 18, 2019, 11 pages (with English translation).

Panusopone et al., "Unequal Weight Planar Prediction and Constrained PDPC," Joint Video Exploration Team (JVET) of ITU-T SG 16 WP 3 and ISO/IEC JTC 1/SC 29/WG 11, Document: JVET-E0068, ver.3, 5th Meeting: Geneva, CH, Jan. 12-20, 2017, 6 pages.

Seregin et al., Block shape dependent intra mode coding, I-EC Joint Video Exploration Team (JVET) of ITU-T SG 16 WP 3 and ISO/IEC JTC 1/SC 29/WG 11, Document: JVET-G0159, 7th Meeting: Torino, IT, Jul. 13-21, 2017, Qualcomm Incorporated.

Li et al., "Multi-Type-Tree," Joint Video Exploration Team (JVET) of ITU-T SG 16 WP 3 and ISO/IEC JTC 1/SC 29/WG 11, 4th Meeting, Chengdu, China, Oct. 15-21, 2016, JVET-D0117, 3 pages.

Keating et al., "CE3 Related: Additional results of JVET-J1023 Core Experiments 5.2.3, 5.2.4 and 5.2.5," Joint Video Experts Team (JVET) of ITU-T SG 16 WP 3 and ISO/IEC JTC 1/SC 29/WG 11, 11th Meeting, Ljubljana, SI, Jul. 10-18, 2018, JVET-K0221-v.2, Jul. 4, 2018, 8 pages.

Seregin et al., "EE1: Secondary MPM List," Joint Video Exploration Team (JVET) of ITU-T SG 16 WP 3 and ISO/IEC JTC 1/SC 29/WG 11, 8th Meeting: Macao, CN, Oct. 18-24, 2017, JVET-H0029, 2 pages.

* cited by examiner (a)　　　　(b)　　　　(c)　　　　(d)

FIG. 13

| TL | T | | | | TR |
|---|---|---|---|---|---|
| L0 | PH0 | PH1 | PH2 | PH3 | |
| L1 | PH4 | PH5 | PH6 | PH7 | |
| L2 | PH8 | PH9 | PH10 | PH11 | |
| L3 | PH12 | PH13 | PH14 | PH15 | |
| BL | | | | | |

FIG. 14

| TL | T0 | T1 | T2 | T3 | TR |
|----|----|----|----|----|----|
| L  | PV0 | PV4 | PV8 | PV12 | |
|    | PV1 | PV5 | PV9 | PV13 | |
|    | PV2 | PV6 | PV10 | PV14 | |
|    | PV3 | PV7 | PV11 | PV15 | |
| BL | | | | | |

FIG.15

| | T0 | T1 | T2 | T3 | |
|---|---|---|---|---|---|
| TL | | | | | TR |
| L0 | (WL*L0)+<br>(WT*T0)+<br>(WTR*TR)+<br>(WBL*BL) | (WL*L0)+<br>(WT*T1)+<br>(WTR*TR)+<br>(WBL*BL) | (WL*L0)+<br>(WT*T2)+<br>(WTR*TR)+<br>(WBL*BL) | (WL*L0)+<br>(WT*T3)+<br>(WTR*TR)+<br>(WBL*BL) | |
| L1 | (WL*L1)+<br>(WT*T0)+<br>(WTR*TR)+<br>(WBL*BL) | (WL*L1)+<br>(WT*T1)+<br>(WTR*TR)+<br>(WBL*BL) | (WL*L1)+<br>(WT*T2)+<br>(WTR*TR)+<br>(WBL*BL) | (WL*L1)+<br>(WT*T3)+<br>(WTR*TR)+<br>(WBL*BL) | |
| L2 | (WL*L2)+<br>(WT*T0)+<br>(WTR*TR)+<br>(WBL*BL) | (WL*L2)+<br>(WT*T1)+<br>(WTR*TR)+<br>(WBL*BL) | (WL*L2)+<br>(WT*T2)+<br>(WTR*TR)+<br>(WBL*BL) | (WL*L2)+<br>(WT*T3)+<br>(WTR*TR)+<br>(WBL*BL) | |
| L3 | (WL*L3)+<br>(WT*T0)+<br>(WTR*TR)+<br>(WBL*BL) | (WL*L3)+<br>(WT*T1)+<br>(WTR*TR)+<br>(WBL*BL) | (WL*L3)+<br>(WT*T2)+<br>(WTR*TR)+<br>(WBL*BL) | (WL*L3)+<br>(WT*T3)+<br>(WTR*TR)+<br>(WBL*BL) | |
| BL | | | | | |

FIG. 18
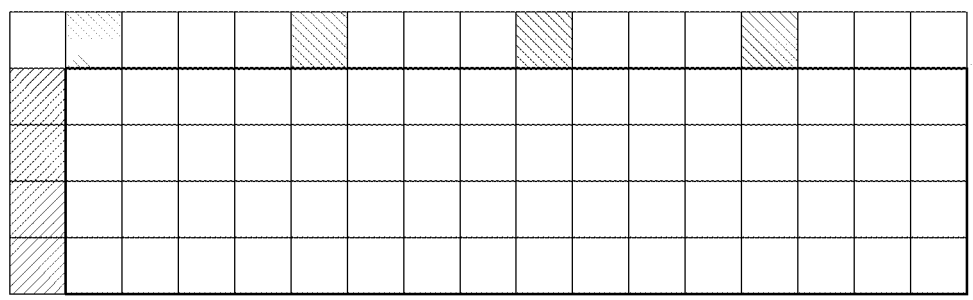
(a)
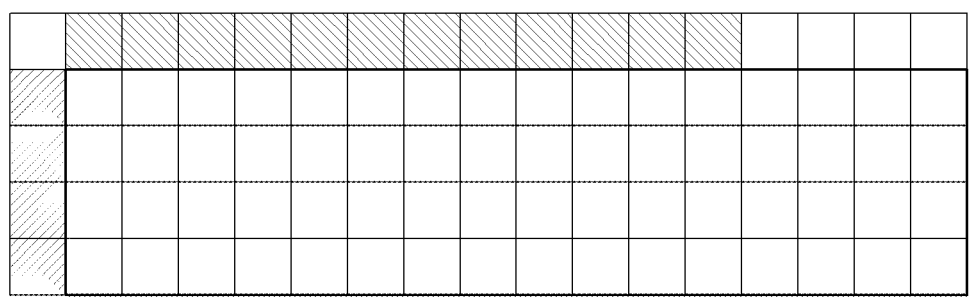
(b)

FIG. 19
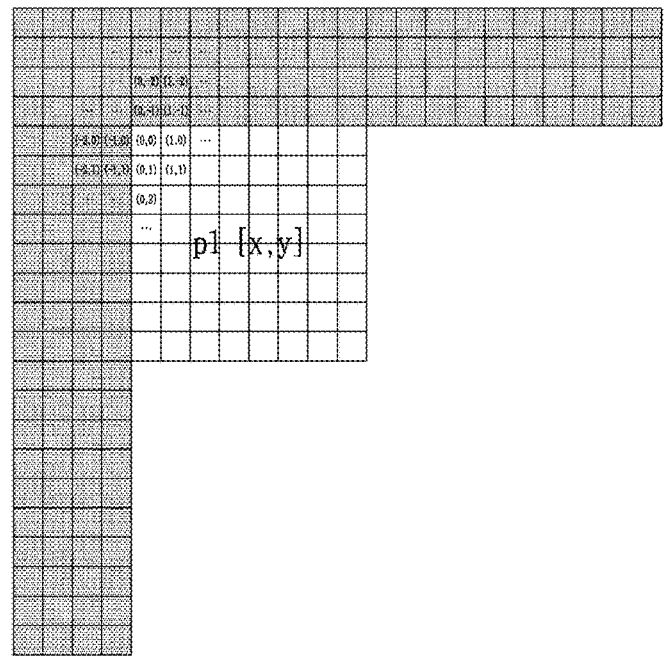
(a) first color component block
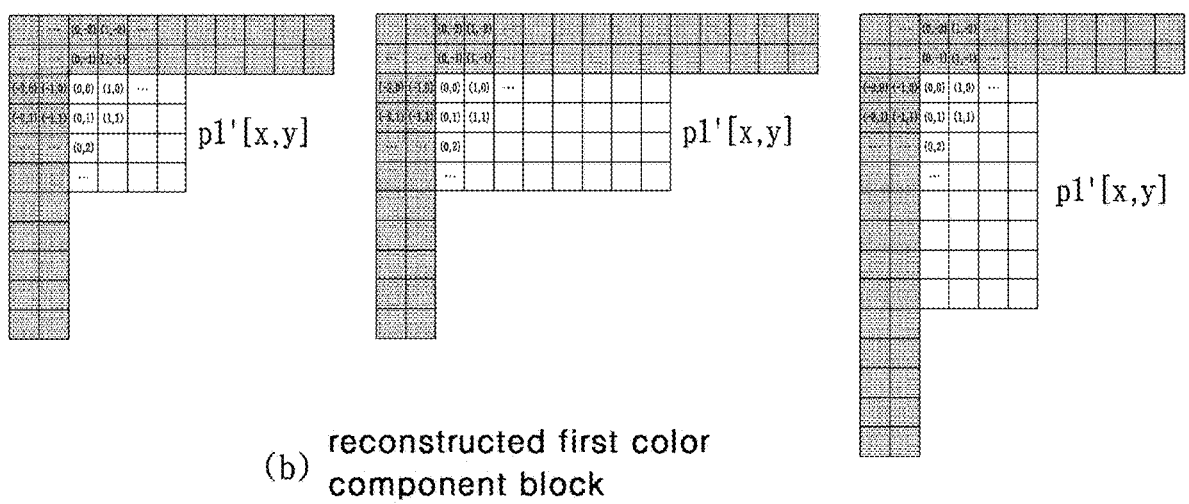
(b) reconstructed first color component block FIG. 20
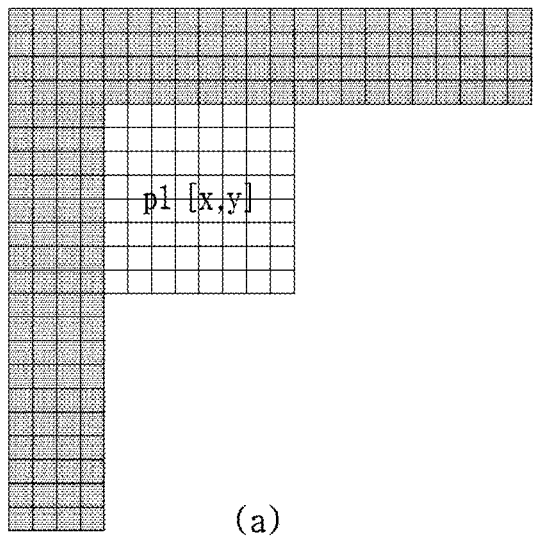
(a)
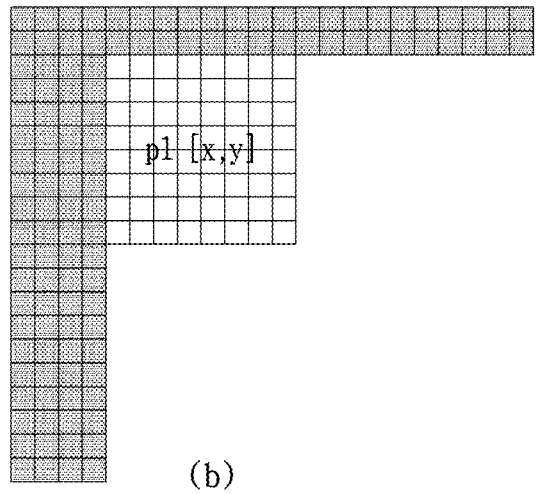
(b)
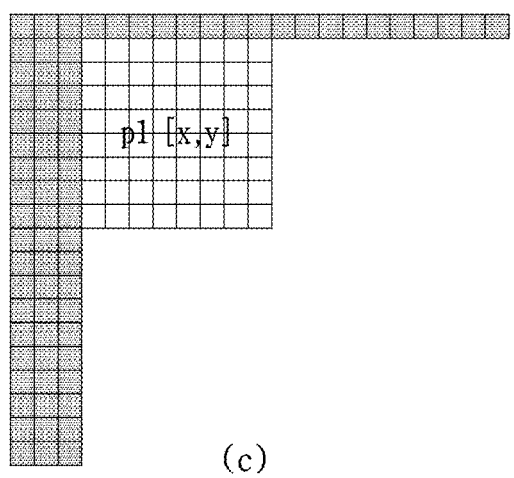
(c)
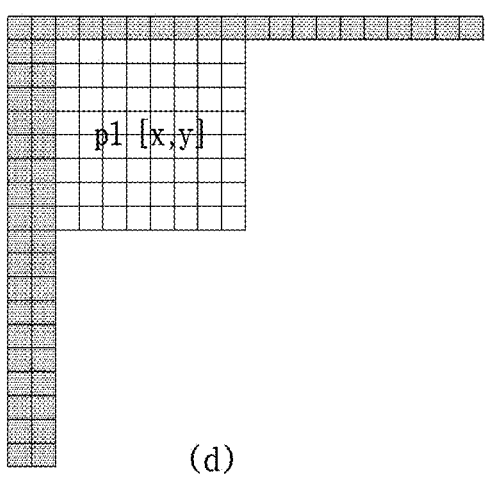
(d)
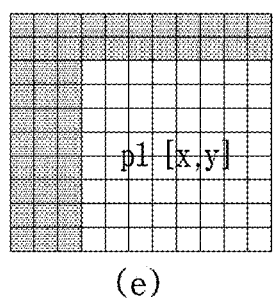
(e)

FIG. 21
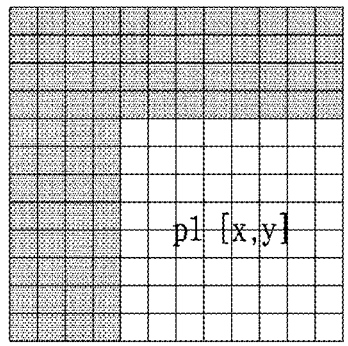
(a)
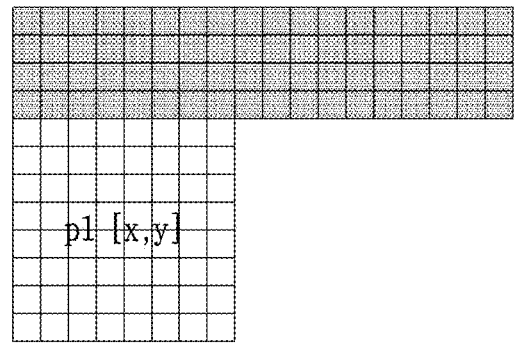
(b)
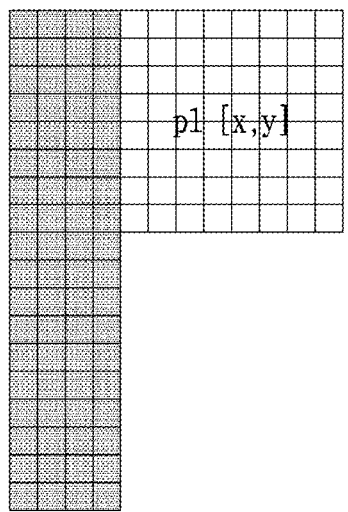
(c)
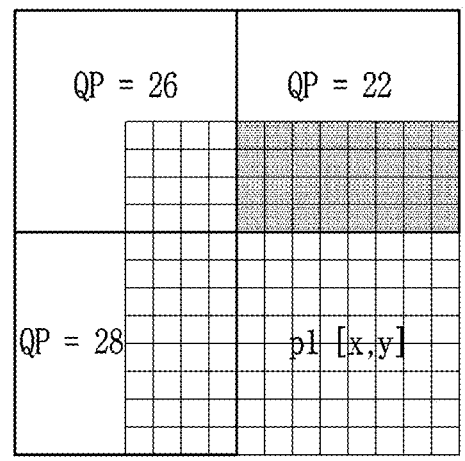
(d)

(a)    (b)

METHOD AND APPARATUS FOR IMAGE ENCODING/DECODING, TRANSMITTING FOR BITSTREAM BASED ON AN MPM LIST USING MULTIPLE REFERENCE LINES

CROSS-REFERENCE TO RELATED APPLICATIONS

This application is a continuation of U.S. application Ser. No. 17/524,570, filed Nov. 11, 2021, which is a continuation of U.S. application Ser. No. 16/767,478, filed on May 27, 2020, now U.S. Pat. No. 11,218,704, which is a National Stage of International Application No. PCT/KR2018/014812 filed on Nov. 28, 2018, which claims priority to Korean patent applications: KR10-2017-0160139 filed on Nov. 28, 2017, KR10-2017-0168473 filed on Dec. 8, 2017, and KR10-2018-0071216 filed on Jun. 21, 2018 with the Korean Intellectual Property Office, the contents of which are all incorporated herein by reference in their entirety.

TECHNICAL FIELD

The present invention relates to a method and apparatus for encoding/decoding an image and a recording medium storing a bitstream. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture: an intra-prediction technique of predicting a pixel value included in a current picture by using pixel information in the current picture: a transform and quantization technique for compressing energy of a residual signal; an entropy encoding technique of assigning a short code to a value with a high appearance frequency and assigning a long code to a value with a low appearance frequency: etc. Image data may be effectively compressed by using such image compression technology, and may be transmitted or stored.

Conventional intra prediction only uses an intra prediction mode of a neighboring block and/or samples of a neighboring block. Therefore, there may be a limit to improve encoding efficiency. Further, an intra prediction mode having a small angular difference among conventional partial intra prediction modes may have a limit to improve encoding efficiency.

DISCLOSURE

Technical Problem

An object of the present invention is to provide a method and apparatus for encoding and decoding an image to enhance compression efficiency.

Another object of the present invention is to provide a method and apparatus for encoding and decoding an image using intra prediction to enhance compression efficiency.

Another object of the present invention is to provide a recording medium storing a bitstream generated by an image encoding method/apparatus of the present invention.

Technical Solution

An image decoding method according to an embodiment of the present invention may comprise decoding an intra prediction mode of a current block, deriving at least one intra prediction mode from the decoded intra prediction mode of the current block, generating two or more intra prediction blocks using the intra prediction mode of the current block and the derived intra prediction mode, and generating an intra prediction block of the current block based on the two or more intra prediction blocks.

In the image decoding method according to present invention, the derived intra prediction mode may be a mode adjacent to the intra prediction mode of the current block.

In the image decoding method according to present invention, when the decoded intra prediction mode of the current block is IPM, the derived intra prediction mode may comprise IPM+k or IPM−k, and k may be an integer of 1 or more.

In the image decoding method according to present invention, when at least one of the IPM+k and the IPM−k is not available, only an available intra prediction mode may be used as the derived intra prediction mode.

In the image decoding method according to present invention, the intra prediction block of the current block may be generated by calculating a weighted sum of the two or more intra prediction blocks.

In the image decoding method according to present invention, in the calculation of the weighted sum, a weight for the intra prediction block based on the intra prediction mode of the current block may be larger than a weight for the intra prediction block based on the derived intra prediction mode.

In the image decoding method according to present invention, the calculation of the weighted sum may be performed in units of at least one among a sample, a sample group, a line and a block.

In the image decoding method according to present invention, the calculation of the weighted sum may be performed on a boundary region within the intra prediction block of the current block.

In the image decoding method according to present invention, the boundary region may include N columns inside the intra prediction block adjacent to a left reference sample of the current block and M rows inside the intra prediction block adjacent to a top reference sample.

In the image decoding method according to present invention, the weight may be determined according to at least one of the intra prediction mode, a division depth, a size, and a shape of the current block and a sample position.

An image encoding method according to another embodiment of the present invention may comprise determining an intra prediction mode of a current block, deriving at least one intra prediction mode from the intra prediction mode of the current block, generating two or more intra prediction blocks using the intra prediction mode of the current block and the derived intra prediction mode, and generating an intra prediction block of the current block based on the two or more intra prediction blocks.

In the image encoding method according to present invention, the derived intra prediction mode may be a mode adjacent to the intra prediction mode of the current block.

In the image encoding method according to present invention, when the intra prediction mode of the current block is IPM, the derived intra prediction mode may comprise IPM+k or IPM−k wherein the K is an integer of 1 or more.

In the image encoding method according to present invention, when at least one of the IPM+k and the IPM−k is not available, only an available intra prediction mode may be used as the derived intra prediction mode.

In the image encoding method according to present invention, the intra prediction block of the current block may be generated by calculating a weighted sum of the two or more intra prediction blocks.

In the image encoding method according to present invention, in the calculation of the weighted sum, a weight for the intra prediction block based on the intra prediction mode of the current block may be larger than a weight for the intra prediction block based on the derived intra prediction mode.

In the image encoding method according to present invention, the calculation of the weighted sum may be performed in units of at least one among a sample, a sample group, a line and a block.

In the image encoding method according to present invention, the calculation of the weighted sum may be performed on a boundary region within the intra prediction block of the current block.

In the image encoding method according to present invention, the boundary region may include N columns inside the intra prediction block adjacent to a left reference sample of the current block and M rows inside the intra prediction block adjacent to a top reference sample.

A computer readable recording medium according to another embodiment of the present invention may store a bitstream generated by an image encoding method according to the present invention.

Advantageous Effects

According to the present invention, a method and apparatus for encoding and decoding an image to enhance compression efficiency may be provided.

According to the present invention, a method and apparatus for encoding and decoding an image using intra prediction to enhance compression efficiency may be provided.

According to the present invention, a recording medium storing a bitstream generated by an image encoding method/apparatus of the present invention may be provided.

DESCRIPTION OF DRAWINGS

FIG. 13 is a view illustrating one-dimensional horizontal prediction based on Planar mode, according to one embodiment of the present invention.

FIG. 14 is a view illustrating one-dimensional vertical prediction based on Planar mode, according to one embodiment of the present invention.

FIG. 15 is a view illustrating one embodiment of a planar mode intra prediction using a weighted sum in units of a sample.

FIG. 18 is a diagram illustrating exemplary reference samples used to derive prediction parameters when the current block is a non-square block.

FIG. 19 is an exemplary diagram illustrating a process of restructuring a color component block.

FIG. 20 is a diagram illustrating an embodiment performing restructuring by using a plurality of upper-side reference sample lines and/or a plurality of left-side reference sample lines.

FIG. 21 is an exemplary diagram illustrating reference samples used for the restructuring in accordance with an intra prediction mode or a coding parameter of a corresponding block.

MODE FOR INVENTION

Figure 1:
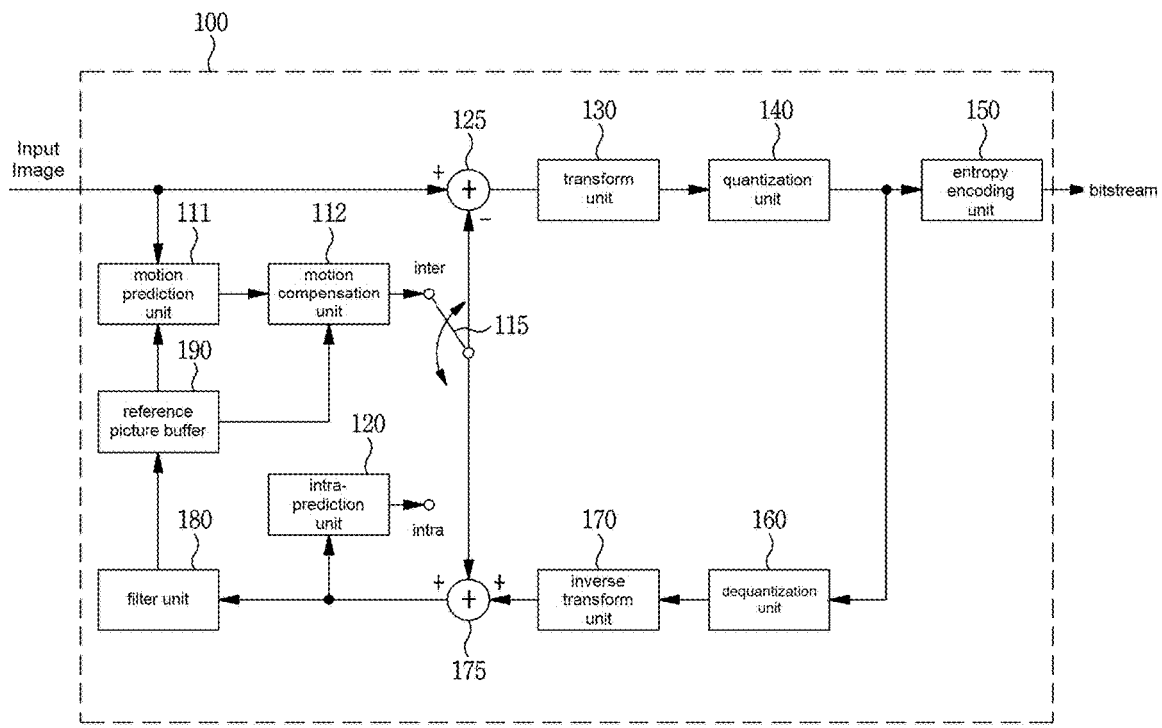
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method, a ternary-tree partitioning method, etc. to configure a lower unit such as coding unit, prediction unit, transform unit, etc. It may be used as a term for designating a sample block that becomes a process unit when encoding/decoding an image as an input image. Here, a quad-tree may mean a quaternary-tree.

When the size of a coding block falls within a first predetermined range, only quad-tree partitioning is allowed for the coding block. Here, the first predetermined range may be defined by at least one of a maximum size and a minimum size of a coding block that can be partitioned only by quad-tree partitioning. Information indicating the maximum/minimum size of the coding block for which quad-tree partitioning is allowed may be signaled as data included in a bitstream, and the information may be signaled in units of at least one of a sequence, a picture parameter, a tile group, and a slice (segment). Alternatively, the maximum/minimum size of the coding block may be a fixed size preset in the encoder/decoder. For example, when the size of the coding block is within a range from 64×64 to 256×256, the coding block can be partitioned only by quad-tree partitioning. Alternatively, when the size of the coding block is larger than the maximum size of a transform block (TB), the coding block can be partitioned only by quad-tree partitioning. In this case, the block to be partitioned into quadrants may be either a coding block or a transform block. In this case, information (for example, split_flag) indicating the quad-tree partitioning of a coding block may be a flag indicating whether or not the coding unit is partitioned by quad-tree partitioning. When the size of a coding block falls within a second predetermined range, the coding block can be partitioned only by binary-tree partitioning or ternary-tree partitioning. In this case, the above description of quad-tree partitioning can also be applied to binary-tree partitioning or ternary-tree partitioning.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a tile group, a slice header, and tile header information. In addition, the tile group may mean a group including a plurality of tiles and may have the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter-picture prediction or motion compensation. Alternatively, a reference picture may be a picture including a reference block referred to by a current block for inter prediction or motion compensation. Hereinafter, the term "reference picture" and "reference image" may be used as the same meaning and used interchangeably.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction.

When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether to partition of a ternary-tree form, a partition direction of a ternary-tree form (horizontal direction or vertical direction), a partition form of a ternary-tree form (symmetric partition or asymmetric partition), whether to partition of a multi-type-tree form, a partition direction of a multi-type-tree form (horizontal direction or vertical direction), a partition form of a multi-type-tree form (symmetric partition or asymmetric partition), a partitioning tree of multi-type-tree form, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile group identification information, a tile group type, tile group partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed 5 block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
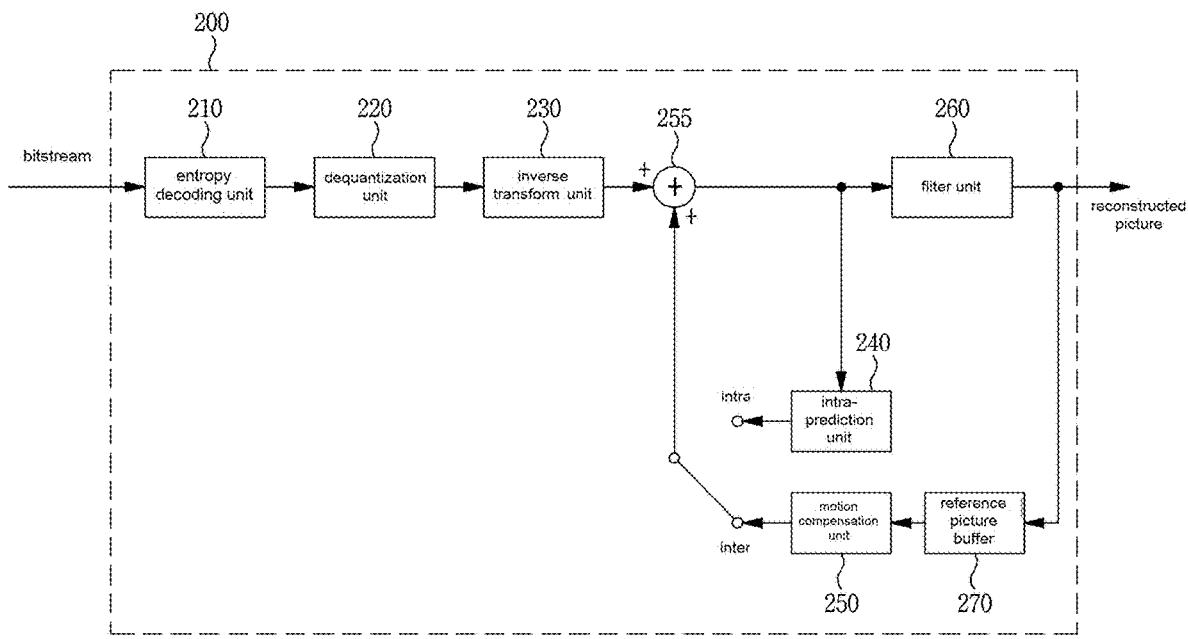
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
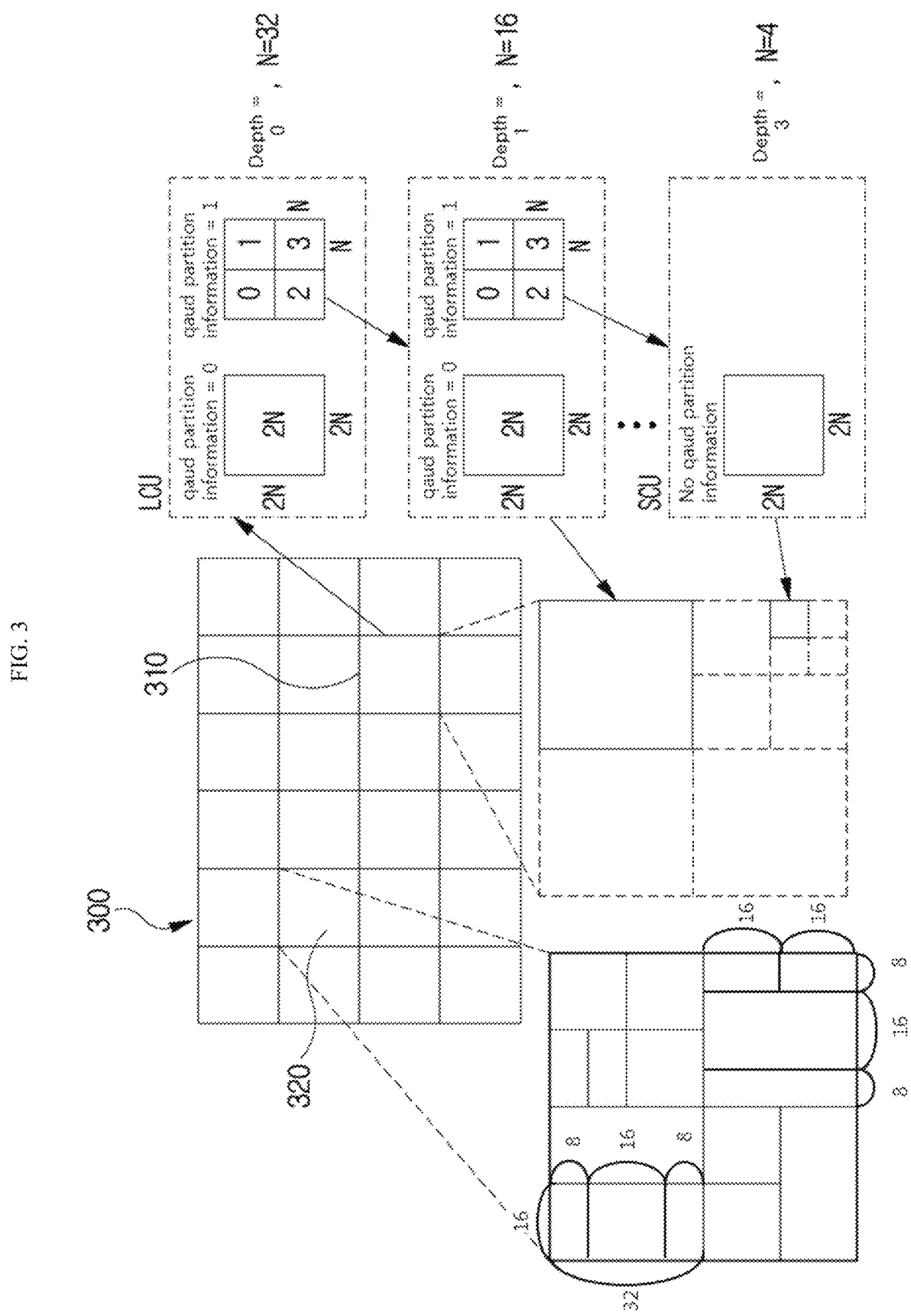
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within a CTU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned (quad-tree partitioned) into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. For example, when a coding unit having a size of 8×32 is horizontally partitioned into two sub-coding units, each of the two sub-coding units may have a size of 8×16. When a single coding unit is partitioned into two coding units, it may be called that the coding unit is partitioned (binary-tree partitioned) in a binary-tree form.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-tree partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is partitioned by a multi-type tree partition structure, the coding unit may further include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is partitioned by a multi-type tree partition structure, the current coding unit may further include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quad-tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bitstream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a tile level, a tile group level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, a tile group level, a tile level or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-tree partitioned or ternary-tree partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-tree partitioned or ternary-tree partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-tree partitioned and/or ternary-tree partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-tree partitioned and/or ternary-tree partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
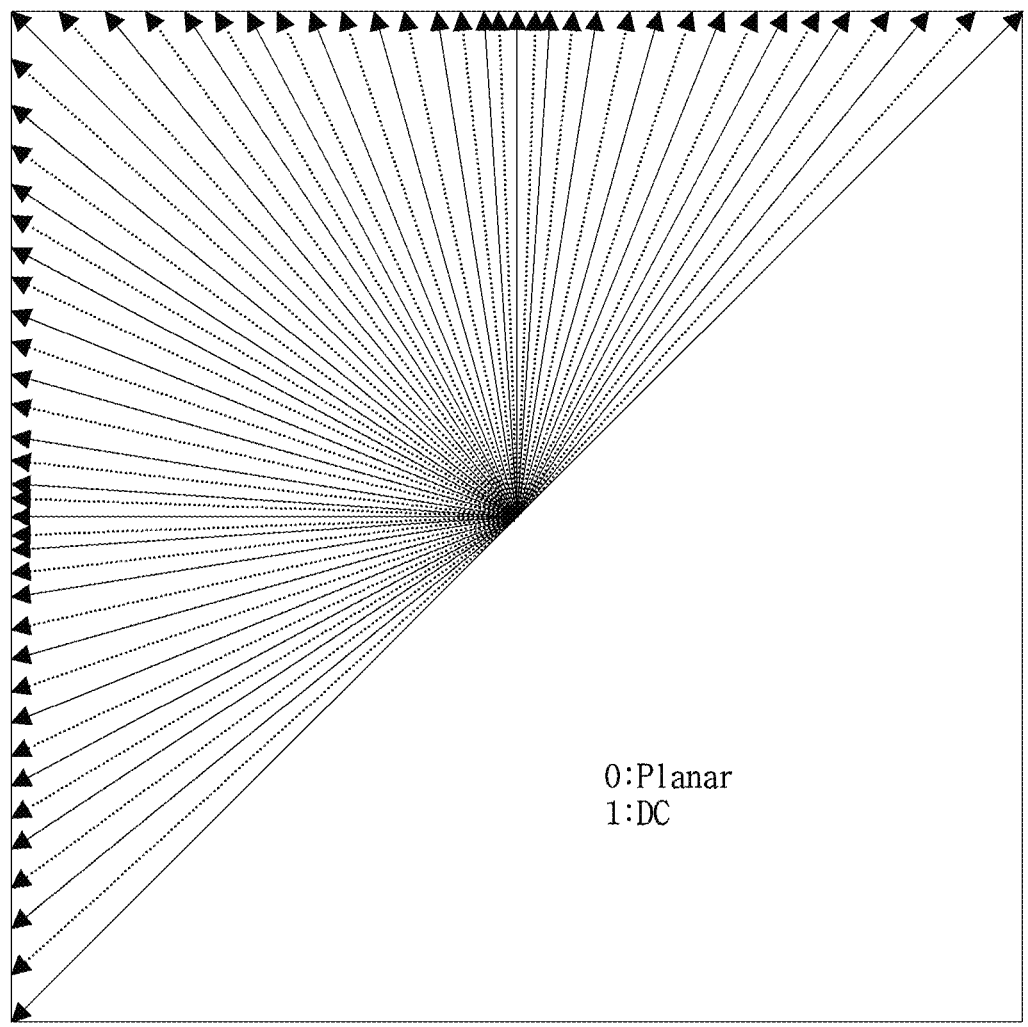
FIG. 4 is a view for explaining an embodiment of a process of intra prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and a mode direction. A number of intra-prediction modes may be M including 1, and the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size/shape.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
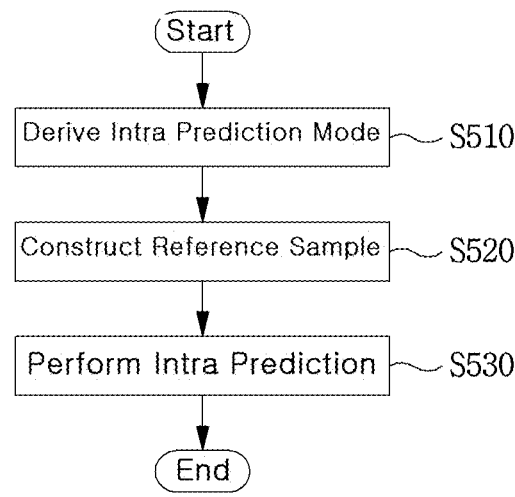
FIG. 5 is a view showing intra-prediction according to the present invention.

FIG. 5 is a view showing intra-prediction according to the present invention.

Intra-prediction of a current block may include: step S510 of deriving an intra-prediction mode, step S520 of configuring a reference sample, and/or step S530 of performing intra-prediction.

In step S510, an intra-prediction mode of a current block may be derived. The intra-prediction mode of the current block may be derived by using a method of using an intra-prediction mode of a neighbor block, a method of entropy encoding/decoding an intra-prediction mode of a current block from a bitstream, a method of using a coding parameter of a neighbor block or a method of using intra prediction mode of a color component. According to the method of using the intra-prediction mode of the neighbor block, the intra-prediction mode of the current block may be derived by using at least one intra-prediction mode derived by using an intra-prediction mode of a neighbor block, a combination of at least one intra-prediction mode of a neighbor block, and at least one MPM.

In step S520, a reference sample may be configured by performing at least one of reference sample selecting, reference sample padding and reference sample filtering.

In step S530, intra-prediction may be performed by performing at least one of non-angular prediction, angular prediction, positional information based prediction, inter color component prediction, and weighted sum-based intra-prediction. In step S530, filtering on a prediction sample may be additionally performed.

In order to derive the intra-prediction mode of the current block, at least one reconstructed neighbor block may be used. A position of the reconstructed neighbor block may be a fixed position that is predefined, or may be a position derived by encoding/decoding. Hereinafter, encoding/decoding may mean entropy encoding and decoding. For example, when a coordinate of a left upper corner side sample of a current block having a W×H size is (0, 0), a neighbor block may be at least one of blocks adjacent to coordinate of (−1, H−1), (W−1, −1), (W, −1), (−1, H), and (−1, −1), and neighbor blocks of the above blocks. Here, W and H may represent length or the number of samples of width (W) and height (H) of the current block.

An intra-prediction mode of a neighbor block which is not available may be replaced with a predetermined intra-prediction mode. The predetermined intra-prediction mode may be, for example, a DC mode, a planar mode, a vertical mode, a horizontal mode, and/or a diagonal mode. For example, when a neighbor block is positioned outside of a boundary of at least one predetermined unit of a picture, a slice, a tile group, a tile, and a coding tree unit, the neighbor block is inter-predicted, or when the neighbor block is encoded in a PCM mode, the corresponding block may be determined as non-available. Alternatively, when the neighbor block is unavailable, the intra prediction mode of the corresponding block is not replaced and not used.

The intra-prediction mode of the current block may be derived as a statistical value of an intra-prediction mode of a predetermined positional neighbor block or an intra-prediction mode of at least two neighbor blocks. In the present description, the statistical value may mean at least one of an average value, a maximum value, a minimum value, a mode, a median value, a weighted average value, and an interpolation value.

Alternatively, the intra-prediction mode of the current block may be derived based on a size of neighbor blocks. For example, an intra-prediction mode of a neighbor block having relatively large size may be derived as the intra-prediction mode of the current block. Alternatively, a statistical value may be calculated by assigning a large weight on an intra-prediction mode of a block having relatively large size. Alternatively, a mode to which a relatively large weight is assigned may be pre-defined or signaled. For example, a relatively large weight may be assigned to at least one among a vertical directional mode, a horizontal directional mode, a diagonal directional mode and non-directional mode. The same weight may be assigned to the above modes.

Alternatively, whether or not the intra-prediction mode of the neighbor block is angular mode may be considered. For example, when the intra-prediction mode of the neighbor block is a non-angular mode, the non-angular mode may be derived as the intra-prediction mode of the current block. Alternatively, an intra-prediction mode of other neighbor block, except for the non-angular mode, may be derived as the intra-prediction mode of the current block.

In order to derive the intra-prediction mode of the current block, it is possible to construct one or more most probable mode (MPM) lists. The MPM list includes one or more MPM candidate modes, and the MPM candidate mode may include an intra-prediction mode of at least one spatial neighboring block in which encoding/decoding is completed and/or a given intra-prediction mode.

An intra prediction mode of the current block may be derived by adding an offset of a specific K to a statistic value of MPM candidate modes included in an MPM list. In this case, K may mean at least one among a negative integer, 0 and a positive integer. For example, for an intra prediction mode of the current block, an MPM candidate mode generated by adding an offset of a specific K to a minimum value of MPM candidate modes included in an MPM list may be added to the MPM list. For example, for an intra prediction mode of the current block, an MPM candidate mode generated by adding an offset of a specific K to a maximum value of MPM candidate modes included in an MPM list may be added to the MPM list.

Figure 6:
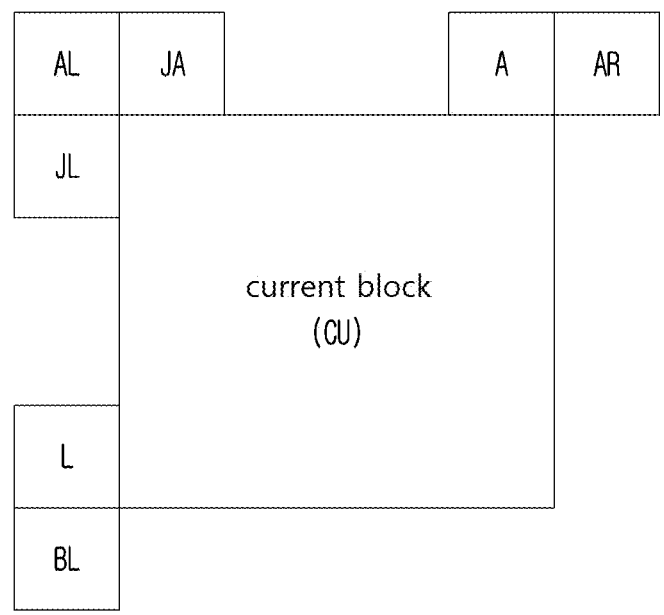
FIG. 6 is a diagram illustrating spatial neighboring blocks of a current block used when configuring an MPM list.

FIG. 6 is a diagram illustrating spatial neighboring blocks of a current block used when configuring an MPM list.

For example, assuming that the number of intra-prediction modes configuring the MPM list is six, as shown in FIG. 6, from at least one of the spatial neighboring blocks (AL, JA, A, AR, JL, L and BL) of the current block, the candidate modes to be included in the MPM list may be sequentially derived up to k at maximum (k is a positive integer). In the following description, for example, k is 5.

The order of deriving the MPM candidate mode from the neighboring blocks may be arbitrarily set by the encoder/decoder. For example, the MPM candidate modes may be derived in the order of a left block L, a top block A, a lower left block BL, an upper right block AR, and an upper left block AL. Further, the MPM candidate modes may be derived in the order of the left block L and the top block A. A Planar mode and/or a DC mode, which is a non-directional mode, may be regarded as an intra-prediction mode having a high probability of occurrence. Therefore, when the Planar mode and/or the DC mode are not included in the five intra-prediction modes derived from the spatial neighboring blocks, the Planar mode and/or DC mode may be included in the MPM list as the MPM candidate mode. That is, the Planar mode and/or DC modes may always be included in the MPM candidate list.

In case mrl_index below is not 0, a Planar mode and/or a DC mode may be included in an MPM candidate list. In addition, in case mrl_index below is 0, a Planar mode and/or a DC mode may not be included in an MPM candidate list.

Herein, the order in which the Planar mode and/or the DC mode are located in the MPM list may be arbitrarily set in the encoder/decoder. For example, the MPM list may be configured in the order of the left block L, the top block A, Planar mode, DC mode, the lower left block BL, the upper left block AR, and the upper left block AL. In addition, the MPM list may be configured in the order of the left block L, the top block A, Planar mode, and DC mode.

The redundancy check may be performed to determine whether the intra-prediction modes in the configured MPM list are prediction modes different from each other. In case the redundancy check is performed, intra prediction modes redundant each other may not exist in the MPM list. When the number of intra-prediction modes included in the MPM list after the redundancy check is smaller than the maximum number (for example, six) of intra-prediction modes that the MPM list may include, an intra-prediction mode in which a predetermined offset is added and/or subtracted to/from the intra-prediction mode having directionality among intra-prediction modes included in the MPM list may be additionally included in the MPM list. Herein, the offset value is not limited to one but may be an integer of two or more.

When the MPM list is not filled through the above process, for example, when the number of the MPM candidate modes is less than six, the MPM list is filled in the order of a vertical mode, a horizontal mode, and a diagonal mode, so that the MPM list may be configured with up to six intra-prediction modes at maximum different from each other. The order in which the default modes (vertical mode, horizontal mode, and diagonal mode) are filled is not limited to the above example and may be any sequence previously defined in the encoder/decoder. When the number of intra-prediction modes is 67 at maximum, mode 0 indicates a Planar mode, mode 1 indicates a DC mode, and modes 2 through 66 may indicate directional modes. In addition, the vertical mode may be mode 50, the horizontal mode may be mode 18, and the diagonal mode may be mode 2, mode 34, and/or mode 66.

An indicator "prev_intra_luminance_pred_flag" indicating whether there is the same mode as the intra-picture prediction mode of the current block within the derived MPM list is encoded/decoded.

When the indicator indicates that there is the same mode as the intra-picture prediction mode of the current block within the MPM list, index information "mpm_idx" indicating which mode within the MPM list is the same as the intra-picture prediction mode of the current block is encoded/decoded so that the intra-picture prediction mode of the current block can be derived.

When the indicator indicates that there is no mode the same as the intra-picture prediction mode of the current block, the intra-picture prediction mode of the current block is encoded/decoded so that the intra-picture prediction mode of the current block can be derived. In this case, at least one of the intra-picture prediction modes that are not listed in the MPM list are sorted in ascending or descending order.

When the indicator indicates that there is no mode the same as the intra-picture prediction mode of the current block within the MPM list, a secondary MPM list including one or more intra-picture prediction modes is constructed. In this case, the intra-picture prediction mode of the current block is derived by using index information "2nd_mpm_idx" indicating which mode within the secondary MPM list is the same as the intra-picture prediction mode of the current block.

When the indicator indicates that there is no mode the same as the intra-picture prediction mode of the current block within the MPM list and/or the secondary MPM list, the intra-picture prediction mode of the current block is encoded/decoded by using a remaining intra-picture prediction mode index "rem_intra_luminance_pred_mode".

An intra-picture prediction mode of a chrominance component is acquired by using at least one of an intra-picture prediction mode index "intra_chroma_pred_mode" of the chrominance component and an intra-picture prediction mode of the corresponding luminance component.

According to a further embodiment of the present invention relating to a method of deriving an intra prediction mode, an intra prediction mode of a current block may be derived by using an intra prediction mode of a different color component. For example, when the current block is a chroma block (Cb block or Cr block), an intra prediction mode of a luma block corresponding to the chroma block can be used to derive an intra prediction mode of the chroma block. As the luma block corresponding to the chroma block, there may be one or more luma blocks. The corresponding luma block may be determined depending on at least any one of a position of the luma block, a position of the chroma block, an upper-left sample position of the luma block, an upper-left sample position of the chroma block, the size of the luma block, the size, the shape, and the encoding parameter of the chroma block. Alternatively, the corresponding luma block may be determined depending on at least any one of the size, the shape, and the encoding parameter of a luma block.

The luma block corresponding to the chroma block may be composed of a plurality of blocks. All or part of the plurality of blocks may have different intra prediction modes thereof. An intra prediction mode of the chroma block may be derived on the basis of all or part of the plurality of blocks included in the corresponding luma block. In this case, some blocks may be selectively used, in which the used blocks are selected based on the comparison of the block size, the shape, the depth information, etc. of the chroma block with those of the luma block (all or part of the plurality of blocks). A block at a position in the luma block corresponding to a predetermined position in the chroma block may be selectively used. The predetermined position may refer to a corner sample (e.g., upper left sample) position in the chroma block or a center sample position in the chroma block. The center sample position may be determined based on an upper-left position of a luma/chroma block, half horizontal size of a luma/chroma block, half vertical size a luma/chroma block. For example, position of x-axis direction of the center sample may be determined by adding half horizontal size of a luma/chroma block to an upper-left position of the luma/chroma block in horizontal direction. Also, position of y-axis direction of the center sample may be determined by adding half vertical size of a luma/chroma block to an upper-left position of the luma/chroma block in vertical direction. Here, position of a luma block corresponding to a center sample position of the chroma block may mean a center sample position of the luma block.

The method of deriving an intra prediction mode of one color component block using an intra prediction mode of a different color component block (i.e. inter color component intra prediction mode) according to the present invention is not limited to the example in which an intra prediction mode of a luma block corresponding to a chroma block is used. For example, an intra prediction mode of a chroma block may be derived by using or sharing at least any one of an MPM index mpm_idx and an MPM list of a luma block corresponding to the chroma block.

Figure 7:
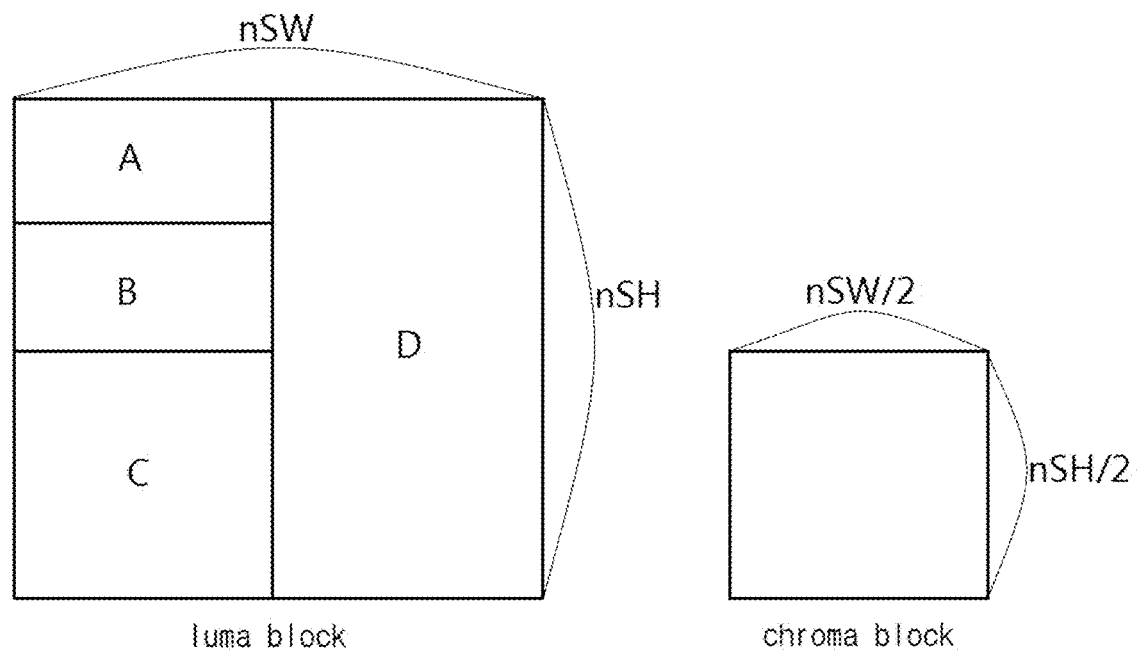
FIG. 7 is an exemplary diagram illustrating the relationship between a luma block and a chroma block.

FIG. 7 is an exemplary diagram illustrating the relationship between a luma block and a chroma block.

In the example illustrated in FIG. 7, a sample ratio of color components is 4:2:0, and at least one of luma blocks A, B, C, and D corresponds to one chroma block.

With reference to FIG. 7, an intra prediction mode of one chroma block may be derived by using an intra prediction mode of A of (0,0) position inside the luma block corresponding to a sample at an upper left position in the chroma block, an intra prediction mode of D of (nSW/2, nSH/2) position inside the luma block corresponding to a sample at a center position in the chroma block, or an intra prediction mode of B of ((nSW/2)−1, (nSH/2)−1) position inside the luma block corresponding to a sample at another center position in the chroma block. The predetermined position in the luma block is not limited to (0, 0), ((nSW/2)−1, (nSH/2)−1) and (nSW/2, nSH/2). For example, The predetermined position may be an upper right position, a lower left position, and/or a lower right position inside a luma block. the nSW may mean a size of width of a luma block and the nSH may mean a size of height of a luma block.

That is, an intra-picture prediction mode of a top-left sample within a particular chrominance block is derived from an intra-picture prediction mode of at least one sample located at a specific position within the corresponding luminance block, in which the specific position is a top left position (0, 0), a central position (nSW/2, nSH/2), a position ((nSW/2)−1, (nSH/2)−1), a top right corner position, a bottom left corner position, or a bottom right corner position when the top left position of the luminance block is a reference position. Alternatively, an intra-picture prediction mode of a top-left sample position within a particular chrominance block is derived from an intra-picture prediction of a central sample position (nSW/2, nSH/2) within the corresponding luminance block when the top-left position is a reference position.

The positions within the chrominance block and the positions within the luminance block are calculated according to the distance from the top-left position of each block. For instance, the central sample position of the luminance block is calculated by adding the coordinate values (nSW/2, nSH/2) to the coordinate values (0, 0) of the top-left sample position of the luminance block.

The predetermined position may be selected on the basis of the shape of the luma block or the shape of the chroma block. For example, with the chroma block having a square shape, the predetermined position may be a center sample position. With the chroma block having an oblong shape, the predetermined position may be an upper left sample position. Alternatively, the predetermined position may be a position of an upper left sample in the chroma block having a square shape or a position of a center sample in the chroma block having an oblong shape.

According to a further embodiment, an intra prediction mode of a chroma block may be derived by using statistic figures of one or more intra prediction modes of a luma block having an equal size to the chroma block.

In the example illustrated in FIG. 7, a mode corresponding to one among statistic values of the intra prediction modes of the luma blocks A and D or a mode corresponding to one among statistic values of the intra prediction modes of the luma blocks A, B, C, and D having an equal size to the chroma block is derived as the intra prediction mode of the chroma block.

When there are multiple intra prediction modes of available luma blocks, all or part of them may be selected. The selection is performed based on the predetermined position in the luma block or the chroma block or based on the size(s), the shape(s), and/or the depth(s) of the chroma block, the luma block, or both. The intra prediction mode of the chroma block can be derived by using the selected intra prediction mode of the luma block.

For example, the size of A of (0, 0) position inside the luma block corresponding to the upper left sample position in the chroma block and the size of the luminance bock D corresponding to the center sample position (nSW/2, nSH/2) in the chroma block are compared, and the intra prediction mode of the luma block D having a larger size may be used to derive the intra prediction mode of the chroma block.

Alternatively, when the size of a luma block corresponding to a predetermined position in a chroma block is equal to or larger than the size of the chroma block, an intra prediction mode of the chroma block is derived by using the intra prediction module of the luma block.

Alternatively, when the size of a chroma block is within a predetermined range, an intra prediction mode of the chroma block is derived by using an intra prediction mode of a luma block corresponding to the upper left sample position (0, 0) in the chroma block.

Alternatively, when the size of a chroma block is within a predetermined range, sizes of luma blocks existing at predetermined positions (0, 0), ((nSW/2)−1, (nSH/2)−1), (nSW/2, nSH/2) inside a luma block corresponding to predetermined positions inside a chroma block are compared, and an intra prediction mode of the chroma block is derived by using the intra prediction mode of the luma block having a larger size.

The predetermined range may be derived from at least any one piece of information among information signaled through a bitstream, information of the size (and/or depth) of a block (a chroma block, a luma block, or both), and information predefined in an encoder/decoder.

Alternatively, when a chroma block has an oblong shape, an intra prediction mode of the chroma block may be derived by using an intra prediction mode of a center sample position (nSW/2, nSH/2) inside a luma block corresponding to a center sample position inside a chroma block or an intra prediction mode of another center sample position ((nSW/2)−1, (nSH−/2)−1) inside a luma block corresponding to another center sample position in a chroma block.

Among the plurality of blocks of the luma block, a block having the same shape as the chroma block may be used. For example, when the chroma block has a square shape or a non-square shape, a block having a square shape or a non-square shape, selected among the plurality of blocks of the luma block, may be used.

In the example described with reference to FIG. 7, the method of deriving an intra prediction mode of a chroma block using an intra prediction mode of a luma block also applies to a case in which an intra prediction mode of a luma block is used as an intra prediction mode of a chroma block as it is. The method of deriving an intra prediction mode of a chroma block is not limited to the method of using an intra prediction mode of the corresponding luma block. For example, an intra prediction mode of a chroma block can be derived from information, including an MPM list and an MPM index mpm_idx, which is used to derive an intra prediction mode of a luma block.

Alternatively, the MPM list of the chroma block can be constructed using the intra prediction mode of the luma block corresponding to the sample of the predetermined position in the chroma block. In this case, the mpm-idx information of the chroma block may be encoded and signaled. The MPM list of the chroma block may be constructed in a similar way to the construction of the MPM list of the luma block. MPM candidates of the chroma block may include intra prediction modes of neighbor chroma blocks and/or intra prediction modes of luma blocks corresponding to the chroma block.

When an MPM flag is 0, a second MPM list including at least one intra-prediction mode may be configured, and the intra-prediction mode of the current block may be derived by using a second MPM index (2nd_mpm_idx). Herein, a second indicator (for example, a second MPM flag) indicating whether or not the intra-prediction mode of the current block is included in the second MPM list may be encoded/decoded. Similar to a first MPM list, the second MPM list may be configured by using intra-prediction modes of the neighbor block. Herein, the intra-prediction mode included in the first MPM list may not be included in the second MPM list. A number of MPM lists is not limited to 1 or 2, N MPM lists may be used.

When the intra-prediction mode of the current block is not included in one of a plurality of MPM lists, a luma component intra-prediction mode of the current block may be encoded/decoded. In addition, a chroma component intra-prediction mode may be derived and encoded/decoded based on an associated luma component intra-prediction mode.

Further alternatively, for example, the prediction coding efficiency of the intra-picture prediction mode of the chrominance block is improved by placing a higher priority on a luminance block position corresponding to the central sample position of the chrominance block when deriving the intra-picture prediction mode of the chrominance block from the intra-picture prediction mode of the corresponding luminance block.

Figure 8:
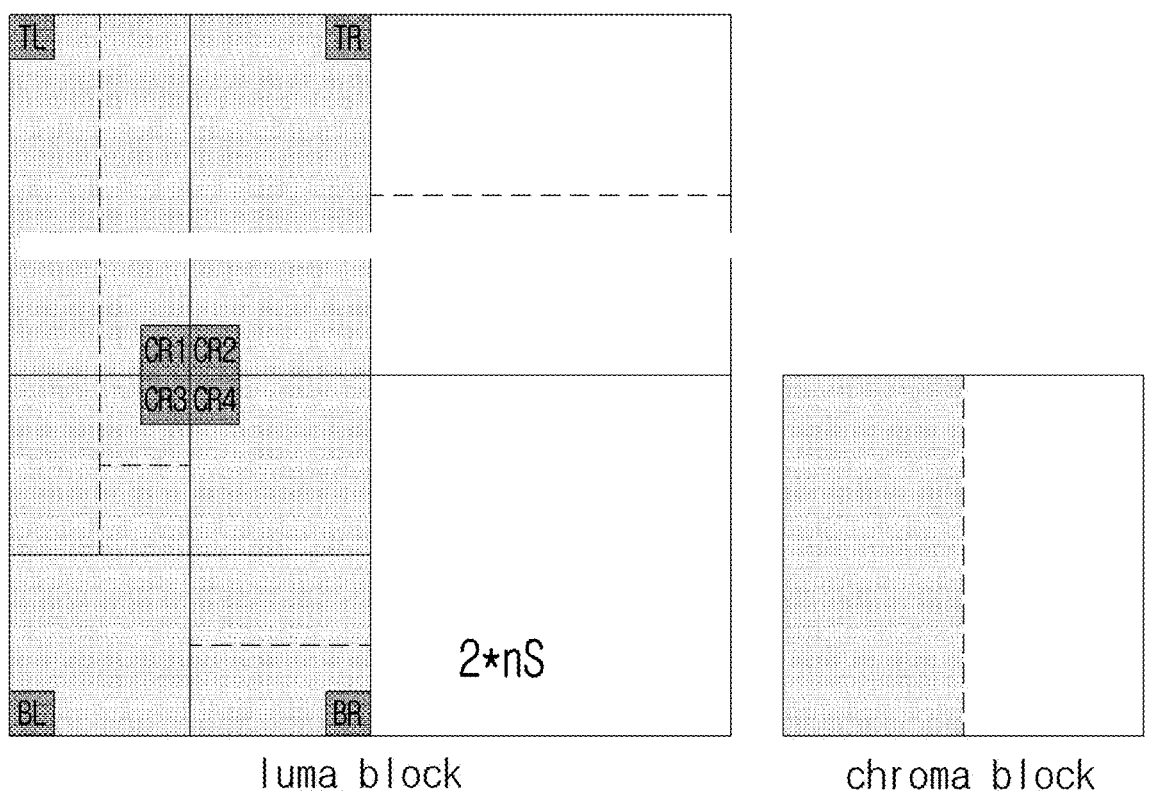
FIG. 8 is a diagram illustrating an exemplary method of deriving an intra-picture prediction mode of a chrominance block from the corresponding luminance block.

FIG. 8 is a diagram illustrating an exemplary method of deriving an intra-picture prediction mode of a chrominance block from the corresponding luminance block.

In the example illustrated in FIG. 8, a color component ratio is 4:2:0, and a luminance block corresponding to a chrominance block is located at least one of the following positions: CR1, CR2, CR3, CR4, top-left (TL), top-right (TR), bottom-left (BL), and bottom-right (BR).

At least one of the intra-picture prediction modes of the sample positions CR1, CR2, CR3, CR4, TL, TR, BL, and BR in the corresponding luminance block is used to derive the intra-picture prediction mode of the chrominance block.

The intra-picture prediction mode of the chrominance block is derived from available intra-picture prediction modes of the sample positions CR1, CR2, CR3, CR4, TL, TR, BL, and BR in this order. However, the order is not limited to the above order. The order is determined depending on the size or shape of the chrominance block.

When the intra-picture prediction mode of the chrominance block is derived from the intra-picture prediction mode of the corresponding luminance block, at least one of the coding parameters of the chrominance block and the luminance block is used.

The MPM list of the chrominance block is composed of at least one of the intra-picture prediction modes described below. Alternatively, the intra-picture prediction modes that can be used in the chrominance block include at least one of the intra-picture prediction modes listed below. Here, the MPM list of chrominance blocks is constructed such that the candidate modes in the MPM list do not overlap each other. The candidate modes include:
  intra-picture prediction modes of spatial neighboring blocks (at least one of the left, top, bottom left, top right, and top left blocks) adjacent to the chrominance block;
  at least one of Planar mode and DC mode;
  at least one of the intra-picture prediction modes of the sample positions CR1, CR2, CR3, CR4, TL, TR, BL, and BR within the luminance block corresponding to the chrominance block; and
  at least one of the vertical, horizontal, and diagonal modes.

When the current block is partitioned into a plurality of sub-blocks, in order to derive an intra-prediction mode of each sub-block, at least one of the described methods may be applied.

A size or form or both of a sub-block may be a predetermined size or block or both (for example, 4×4), or may be determined according to a size or form or both of the current block. Alternatively, the size of the sub-block may be determined based on whether or not a neighbor block of the current block is partitioned, or may be determined based on an intra-prediction mode of a neighbor block of the current block. For example, the current block may be partitioned based on a boundary at which an intra-prediction mode of a neighbor block is different. Alternatively, the current block may be partitioned based on whether the neighbor block is an intra coding block or an inter coding block.

An indicator (for example, NDIP_flag) representing that the intra-prediction mode of the current block is derived by using the intra-prediction mode of the neighbor block may be encoded/decoded. The indicator may be encoded/decoded by at least one unit of the current block and the sub-block. Herein, when a size of the current block or the sub-block corresponds to a predetermined size or a predetermined size range, the indicator may be encoded/decoded.

Determining whether or not the size of the current block corresponds to a predetermined size may be performed based on a horizontal or vertical length of the current block. For example, when the horizontal or vertical length is a length capable of being partitioned, it is determined that the size of the current block corresponds to a predetermined size.

When the intra-picture prediction mode is derived, information on intra-picture prediction is entropy-encoded encoded into or entropy-decoded from a bitstream. For example, the information on intra-picture prediction includes at least one among the following elements:
  an indicator indicating whether there is an intra-picture prediction mode identical to the intra-picture prediction mode of the current block mode, within the MPM list "prev_intra_luma_pred_flag";
  index information indicating which mode among the modes included in the MPM list is identical to the intra-picture prediction mode of the current block "mpm_idx";
  index information indicating which mode among the modes included in the secondary MPM list is identical to the intra-picture prediction mode of the current block "2nd_mpm_idx";
  remaining intra-picture prediction mode indices "rem_intra_luma_pred_mode"; and
  chrominance intra-picture prediction mode indices "intra_chroma_pred_mode".

There may be a case where at least one piece of the information on the intra-picture prediction will not signaled, depending on at least one of a block size and a block shape. The information that is not signaled is derived from a predetermined value, or is acquired from information on a previously processed block or a higher-level block.

For example, when the current block has a predetermined size, at least one piece of the information on the intra-picture prediction of the current block is not signaled. Instead of the signaling, at least one piece of the information on the intra-picture prediction of a block having a size identical to a previously encoded/decoded upper-level block.

When at least one piece of the information on the intra-picture prediction is entropy-encoded/entropy-decoded, at least one of the following binarization methods is used:
  a truncated Rice binarization method;
  a K-th order Exp_Golomb binarization method;
  a limited K-th order Exp_Golomb binarization method;
  a fixed-length binarization method;
  a unary binarization method; and
  a truncated unary binarization method.

The Intra-prediction information may be signaled through at least one of a video parameter set (VPS), a sequence parameter set (SPS), a picture parameter set (PPS), an adaptation parameter set (APS), a slice header, a tile group header, a tile header, a coding unit, a prediction unit, a transform unit, a block, a coding block, a prediction block and a transform block. In a predetermined block size or less, at least one piece of intra-prediction information may not be signaled. Herein, intra-prediction information of a previously encoded/decoded block (for example, higher block) may be used.

A reference sample for intra-prediction may be configured based on the derived intra-prediction mode. In the description hereinafter, a current block may mean a prediction block or a sub-block having a size/form smaller than a size/form of the prediction block. The reference sample may be configured by using at least one sample reconstructed adjacent to a current block or by using a combination of samples. In addition, filtering may be applied to the configured reference sample.

A number or position or both of reconstructed sample lines used for configuring the reference sample may vary according to a position of a current block within a coding tree block. Each reconstructed sample on a plurality of reconstructed sample lines may be used as a reference sample at it is. Alternatively, a predetermined filter may be applied to the reconstructed sample, and a reference sample may be generated by using the filtered reconstructed sample. Reconstructed samples to which a filter is applied may be included in the same reconstructed sample line or in different reconstructed sample lines. Here, a plurality of reference sample lines consecutive along X-axis direction or Y-axis direction may be used for intra prediction of the current block, and a plurality of reference samples lines obtained by excluding at least one reference sample line among a plurality of consecutive reference sample lines may be used for intra prediction of the current block. The reference sample line may mean a reconstructed sample line.

An indicator indicating whether multiple reference sample lines are utilized for prediction may be signaled. For example, an indicator such as mrl_enabled_flag may be included in at least one of an SPS, a PPS, a tile header, a tile group header, and a slice header so as to be signaled. The flag may be an indicator indicating whether a single reference sample line is used or multiple reference sample lines are used.

When the indicator indicates that multiple reference sample lines are used, reference sample line indexes are also signaled. For example, mrl_index is signaled. Therefore, it is possible to determine which reference sample lines are used.

When the indicator mrl_index has a value of 0, a first reference sample line which is closest to the current block is utilized. On the other hand, when the indicator mrl_index has a value of 1, a second reference sample line which is second closest to the current block is utilized. When the indicator mrl_index has a value of 2, a third closest reference sample line which is third closest to the current block is used. The first to fourth reference sample lines respectively correspond to reconstructed sample lines 1 to 4 illustrated in FIG. 9, respectively. The mrl_index may indicate which reference sample line is constructed for intra prediction of the current block among a plurality of reference sample lines remained by excluding at least one reference sample line among a plurality of consecutive reference sample lines. That is, the plurality of reference sample lines to be indicated by mrl_index may be reference samples lines which are not consecutive each other. The plurality of reference sample lines to be consecutive may mean a plurality of reference sample lines are adjacent each other along X-axis direction or Y-axis direction.

The indicator mrl_index is signaled depending on at least one of the intra prediction mode, the MPM information, the size (with and height) of the current block, the presence or absence of an upper boundary of a CTU, and the color component. When the indicator mrl_index is not signaled, the first reference sample line adjacent to the current block is used.

For example, when the intra prediction mode is a predetermined mode, the indicator mrl_index may be signaled. The intra prediction mode may be the intra prediction mode of the current block or at least one of the intra prediction modes of the respective neighboring blocks. The predetermined mode is at least one of non-directional prediction mode, directional prediction mode, vertical or horizontal mode, even-numbered mode, and odd-numbered mode. For example, when the intra prediction mode of a neighboring block adjacent to the left boundary or the upper boundary of the current block is one of directional modes, the indicator mrl_index may be signaled. Alternatively, when the intra prediction mode of the neighboring block is one of even-numbered modes or one of odd-numbered modes, the indicator mrl_index may be signaled. Further, in case the mrl_index is 0, the current block may be intra predicted using a Planar mode or a DC mode. In another example, in case the mrl_index is not 0, the current block may not be intra predicted in a Planar mode or a DC mode.

For example, the indicator mrl_index may be signaled on the basis of the MPM information of the current block. The MPM information include at least one of an MPM flag, an MPM index, an MPM list, and an MPM candidate. For example, when the MPM flag for the intra prediction mode of the current block indicates matching, the indicator mrl_index may be signaled. Alternatively, when any one directional prediction mode is present within an MPN candidate list or only directional prediction modes are present within the MPN candidate list, the indicator mrl_index may be signaled. Alternatively, when any one non-directional prediction mode is present in the MPM candidate line, the indicator mrl_index may be signaled. Alternatively, the MPM information of the current block is signaled differently depending on the indicator mrl_index. For example, when the indicator mrl_index has a value other than 0, at least one piece of the MPM information may not be signaled. For example, when the indicator mrl_index has a value other than 0, the MPM flag or the remaining mode information may not be signaled. That is, the indicator mrl_index is not 0, a process of deriving a remaining mode may not be performed, and intra prediction mode of the current block may not be derived using a remaining mode. On the other hand, when the indicator mrl_index has a value other than 0, the MPM index may be signaled and the intra prediction mode of the current block may be derived using the MPM index. For example, when the indicator mrl_index has a value other than 0, the MPM mode may be determined without parsing the MPM flag.

For example, when the size (width or height) of the current block is within a predetermined size range, the indicator mrl_index may be signaled. For example, when the size (width or height) is larger than a predetermined size (e.g., 4), the indicator mrl_index may be signaled.

For example, the indicator mrl_index may be signaled depending on whether the current block is located at the upper boundary of a CTU. For example, when the current block is located at the upper boundary of a CTU, the indicator mrl_index may not be signaled. That is, in case a Y-axis direction position of a top-left position of the current block is not the same as an upper position of a CTU, the indicator mrl_index may be signaled. The case where a Y-axis direction position of a top-left position of the current block is not the same as an upper position of a CTU may be determined as a case where a result obtained by performing modulo operation on a Y-axis direction position of a top-left position of the current block by a CTU size is greater than 0.

For example, the indictor mrl_index may be signaled when the color component of the current block is a luminance signal, and the indicator mrl_index indicator may not be signaled when the color component is a chrominance signal.

Alternatively, the indicator mrl_index refers to a reference sample line to be used optionally. For example, the first reference sample line adjacent to the current block may be always used, and the reference sample line indicated by the indicator mrl_index indicator may be optionally used.

When multiple reference sample lines are used, whether to apply filtering is determined for each reference sample line. For example, on the basis of the intra prediction mode and the block size/shape, filtering may be applied to the first reference sample line adjacent to the current block but the filtering may not be applied to the second and subsequent reference sample line around the current block. Alternatively, the filtering may be applied only to one reference sample line. For example, the filtering may be applied only to either a left reference sample line or an upper reference sample line. Which reference sample line is subjected to filtering may be determined depending on at least one of the shape, size, and intra prediction mode of the current block. The shape of the current block may be determined depending on a size comparison between the width and the height of the current block or a ratio of the width and the height.

The configured reference sample may be represented as ref [m, n], and a sample obtained by applying a filter to the configured reference sample may be represented as rec [m, n]. Herein, m or n may be a predetermined integer value representing a position of a sample. When a position of a left upper side sample within the current block is (0, 0), a position of a left upper side reference sample of the current block may be set to (−1, −1).

Figure 9:
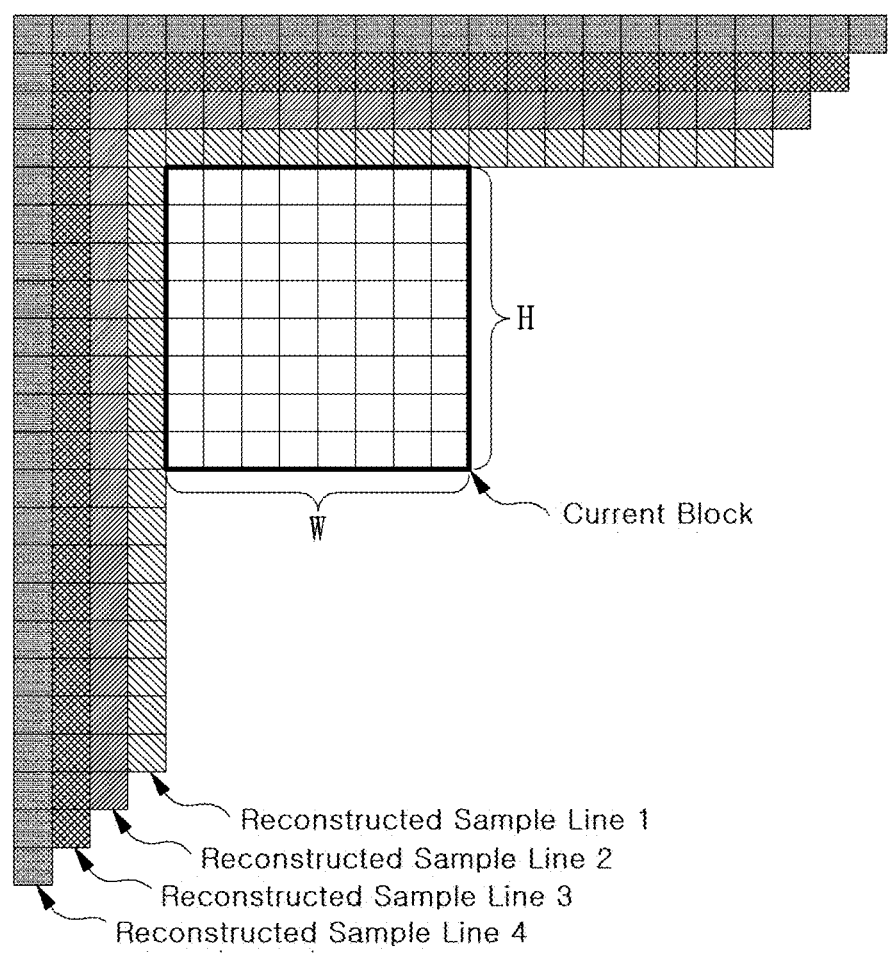
FIG. 9 is a diagram for describing a plurality of reconstructed sample lines.

FIG. 9 is a diagram for describing a plurality of reconstructed sample lines.

A reference sample can be constructed by selecting one or more reconstructed sample lines adjacent to the current block. For example, in FIG. 9, one of the plurality of reconstructed sample lines may be selected so as to construct a reference sample.

For example, a particular reconstructed sample line of the plurality of reconstructed sample lines may be fixedly or adaptively selected, or an arbitrary reconstructed sample line may be adaptively selected, in order to construct a reference sample.

In another embodiment, to construct a reference sample, one or more reconstructed sample lines may be selected from the plurality of reconstructed sample lines illustrated in FIG. 9, and the selected reconstructed sample lines may be combined.

For example, as shown in Equation 1, a reference sample may be constructed using a weighted average of reconstructed samples, in which the weights of the reconstructed samples differ according to the distance between the reconstructed sample and the current block.

$$ref[-1, -1] =$$
$$(rec[-2, -1] + 2 \times rec[-1, -1] + rec[-1, -2] + 2) \gg 2$$
$$ref[x, -1] = (rec[x, -2] + 3 \times rec[x, -1] + 2) \gg 2, (x = 0 \text{ to } H + W - 1)$$
$$ref[-1, y] = (rec[-2, y] + 3 \times rec[-1, y] + 2) \gg 2, (y = 0 \text{ to } H + W - 1)$$

[Equation 1]

Alternatively, a reference sample may be constructed using at least one of a mean value, a maximum value, a minimum value, a median value, and a mode value of a plurality of reconstructed samples based on at least one of the distance from the current block to the corresponding reconstructed sample and the intra prediction mode of the current block.

Alternatively, a reference sample may be constructed based on a change (change amount) between each of the sample values of the successive reconstructed samples. For example, a reference sample may be constructed based on at least one of a determination of whether the values of two successive reconstructed samples differ by more than a threshold value and a determination of whether the values of successive reconstructed samples change continuously or discontinuously. For example, when the values of a rec [−1, −1] and a rec [−2, −1] differ by more than a threshold value, the value of the ref [−1, −1] is determined as having the value of the rec [−1, −1], or a value corresponding to a weighted average obtained by applying a predetermined weight to the value of the rec [−1, −1]. For example, each of the values of the successive reconstructed samples changes by n as the distance between the reconstructed sample and the current block decreases, and thus the value of ref [−1, −1] is represented as "ref [−1, −1]=rec [−1, −1]−n".

In a different embodiment, referring to FIG. 9, two or more reconstructed sample lines may be selected to construct a reference sample. For example, two lines including a reconstructed sample line 1 and a reconstructed sample line 2 may be fixedly selected, or four lines ranging from a reconstructed sample line 1 to a reconstructed sample line 4 may be selected to construct a reference sample.

For example, a reference sample may be configured by selecting at least one among three lines corresponding to reconstructed sample line 1, reconstructed sample line 2 and reconstructed sample line 4. That is, in case indicator mrl_index is 0, reconstructed sample line 1 may be indicated. In case indicator mrl_index is 1, reconstructed sample line 2 may be indicated. In case indicator mrl_index is 2, reconstructed sample line 4 may be indicated.

For example, a reference sample may be configured by selecting at least one among three lines corresponding to reconstructed sample line 1, reconstructed sample line 3 and reconstructed sample line 4. That is, in case indicator mrl_index is 0, reconstructed sample line 1 may be indicated. In case indicator mrl_index is 1, reconstructed sample line 3 may be indicated. In case indicator mrl_index is 2, reconstructed sample line 4 may be indicated.

For example, a reference sample may be configured by selecting at least one among two lines corresponding to reconstructed sample line 1 and reconstructed sample line 3. That is, in case indicator mrl_index is 0, reconstructed sample line 1 may be indicated. In case indicator mrl_index is 1, reconstructed sample line 3 may be indicated.

The reconstructed sample line 1 to reconstructed sample line 4 are examples when starting from index 1 for reconstructed sample lines. When starting from index 0 for reconstructed sample lines, The reconstructed sample line 1 to reconstructed sample line 4 may have the same meaning as The reconstructed sample line 0 to reconstructed sample line 3.

Alternatively, two or more reconstructed sample lines may be adaptively selected to construct a reference sample. For example, one reconstructed sample line may be fixedly selected, and one or more reconstructed sample lines may be adaptively selected among the other reconstructed sample lines to construct a reference sample.

The fixedly selected reconstructed sample line may be predefined in the encoder/decoder. For the case where the fixedly selected reconstructed sample line is predefined, information on the fixedly selected reconstructed sample line may not be signaled.

The information on the adaptively selected reconstructed sample line(s) may be signaled in the form of an indicator or index. The adaptively selected reconstructed sample line may be determined based on at least one of coding parameters of the current block or a block neighboring the current block. For example, the adaptively selected reconstructed sample line may be determined based on at least one of the size/shape and intra prediction mode of the current block or the block neighboring the current block. In this case, the information necessary for selection may not be signaled.

A reference sample line may include one or more samples. For example, the reference sample line may include samples corresponding to a length equal to the width (that is, the horizontal dimension) or height (that is, the vertical dimension) of the current block. As another example, the reference sample line may include samples corresponding to a length that is two times the width or height of the current block. As a further example, the reference sample line may include samples corresponding to a length equal to N samples (N is 1, 2, 3, . . . ) plus two times the sum of the width and height of the current block. That is, the reference sample line may include reference samples corresponding to 2×(W+H)+N (where W and H are the width and height of the current block, and N is an integer of 1 or more).

The method of constructing a reference sample adjacent to an upper part of the current block and the method of constructing a reference sample adjacent to a left part of the current block may differ. For example, the number of reference sample lines located above the current block and the number of reference sample lines located to the left of the current block may differ. For example, the number of reference sample lines adjacent to the upper part of the current block may be one and the number of reference sample lines adjacent to the left part of the current block may be two, according to at least one of the width or height of the current block, and the intra prediction mode of the current block. For example, the length of the reference sample line above the current block and the length of the reference sample line located to the left of the current block may differ. For example, the length of the reference sample line may vary according to at least one of the width or height of the current block and the intra prediction mode of the current block.

Each of the reference sample lines may have a different length. For example, referring to FIG. 9, the lengths of the reconstructed sample lines 2 to 4 may be longer than the reconstructed sample line 1 by a length corresponding to one or more samples.

The length of the reference sample line may be different for each of the reconstructed sample lines. For example, a reconstructed sample line n may be longer or shorter than a reconstructed sample line n−1 by a length corresponding to m samples. In the example illustrated in FIG. 9, the reconstructed sample line n is longer than the reconstructed sample line n−1 by a length corresponding to one sample.

As described above, decision information on whether to construct a reference sample using only the nearest reference sample line or using a plurality of reference sample lines may be encoded/decoded. For example, the decision information may be encoded/decoded at the level of at least one of a sequence, a picture, a slice, a tile group, a tile, a CTU, a CU, a PU, and a TU. In addition, information on the availability of each of the plurality of reference sample lines may be signaled at a higher level.

At least one of the number, position, and configuration of the reconstructed sample lines used in the reference sample construction may be differently set when the top boundary or the left boundary of the current block corresponds to the boundary of at least one of a picture, a slice, a tile group, a tile, and a coding tree block (CTB). For example, when two or more reference sample lines are constructed, when the top boundary of the current block corresponds to the boundary of at least one of a picture, a tile group, a tile, a slice, and a coding tree block (CTB), one reference sample line adjacent to the upper part of the current block may be constructed. For example, one reference sample line may be configured when the top boundary of the current block corresponds to the top boundary of a CTU, and otherwise, two or more reference sample lines may be configured. In this case, since only one reference sample line at the top boundary of the CTU is used, the size of a line buffer for storing data of the reference samples of the reference sample line can be reduced.

Also, at least one among the plurality of reference sample lines may be a line for which a deblocking filter, an adaptive sample offset, adaptive in-loop filter are not performed. For example, a deblocking filter, an adaptive sample offset, adaptive in-loop filter may not be performed for at least one among remaining reference sample lines obtained by excluding the most adjacent reference sample line to the current block among a plurality of reference sample lines.

When selecting a reference sample, availability determination and reference sample padding may be performed for a block containing the reference sample to be used. For example, when a block containing a reference sample is available, the corresponding reference sample can be used. On the other hand, when a block containing a reference sample is not available, the unavailable reference samples in the block may be padded with one or more available neighboring reference samples.

When a reference sample is located outside the boundary of at least one of a picture, a tile group, a tile, a slice, or a coding tree block (CTB), the reference sample may be determined to be unavailable. When the current block is coded with constrained intra prediction (CIP), in the case where the block including the reference sample has been encoded/decoded in an inter prediction mode, the reference sample is determined to be unavailable.

Figure 10:
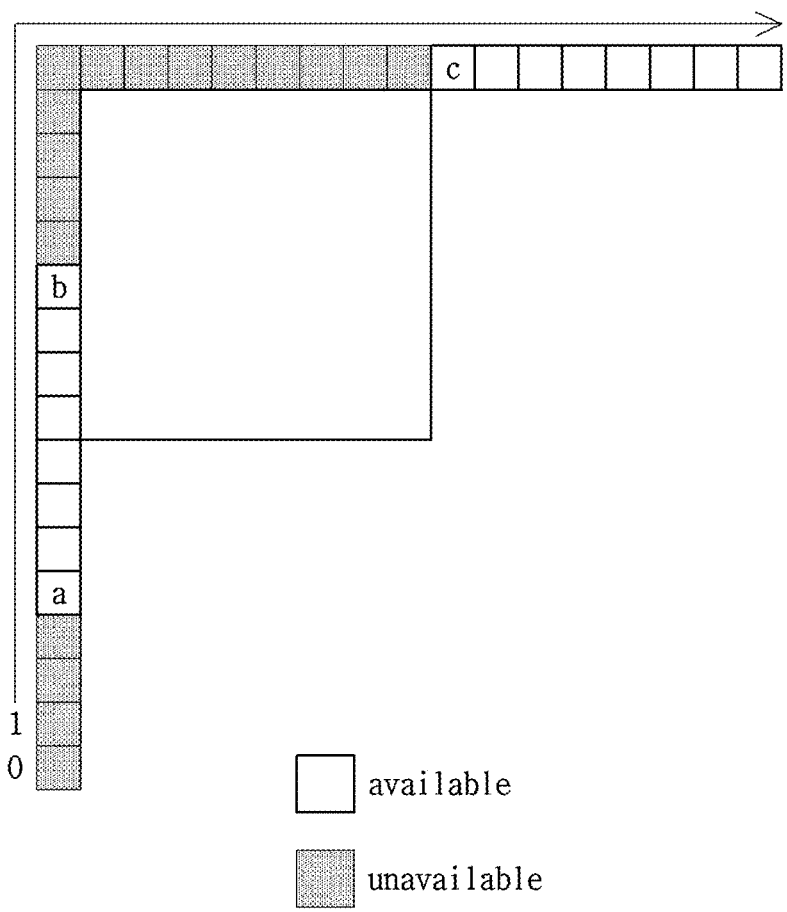
FIG. 10 is a diagram for describing a process of replacing an unavailable sample with an available sample.

FIG. 10 is a diagram for describing a process of replacing an unavailable sample with an available sample.

When it is determined that the reconstructed neighboring sample is not available, the unavailable sample may be replaced with a reconstructed neighboring sample, which is an available sample. For example, when there are both available samples and unavailable samples as illustrated in FIG. 10, one or more available samples can be used to replace one or more unavailable samples.

The sample values of the unavailable samples may be replaced with the values of the available samples in a predetermined order. The available samples used to replace the unavailable samples may be available samples located adjacent to the unavailable samples. When no available sample is adjacent to the unavailable sample, the earliest or closest available sample may be used to replace the unavailable sample. The replacing order of the unavailable samples may be, for example, from the bottom left to the top right. Alternatively, the replacing order may be from the top right to the bottom left. Specifically, the replacing order may be from the top left corner to the top right and/or to the bottom left. Alternatively, the replacing order may be from the top right and/or from the bottom left to the top left corner.

For example, filling the unavailable samples with the values of available samples may start from the position 0, which is the bottom left sample position. That is, the first four unavailable samples may be filled with a value of "a", and the subsequent 13 unavailable samples may be filled with a value of "b".

For example, the unavailable samples may be filled with a combined value of the available samples. For example, the unavailable samples may be filled with an average value or an interpolated value of the available samples respectively adjacent to both ends of a line of the unavailable samples. That is, the first four unavailable samples are filled with the value "a", and the next 13 unavailable samples may be filled with the average of a value of "b" and a value of "c", or may be filled by interpolating the value "b" and the value "c".

Alternatively, the 13 unavailable samples may be filled with an arbitrary intermediate value between the sample values "b" and "c" of the available samples. In this case, the unavailable samples may be filled with different respective values. For example, as the distance of an unavailable sample to the available sample having the value "a" decreases, the unavailable sample will be filled with a value that is closer to the value "a". For example, the closer an unavailable sample is to an available sample having the value "b", the closer the value that fills the unavailable sample is to the value "b". That is, the value of an unavailable sample may be determined based on the distance between the unavailable sample and the available sample having the value "a" or "b". To replace unavailable samples with available samples, one or more replacement methods including the methods described above may be adaptively used. The method of replacing unavailable samples with available samples may be signaled as information contained in a bitstream, or may be predetermined in the encoder/ decoder. Alternatively, a replacement method may be derived according to a predetermined determination method. For example, the replacement method may be determined based on the difference between the values "a" and "b" or based on the number of unavailable samples. More specifically, the replacement method may be determined by comparing the difference between the values of two available samples with a threshold value and/or by comparing the number of unavailable samples with a threshold value. For example, when the difference between the values of the two available samples is greater than the threshold value, and/or when the number of unavailable samples is greater than the threshold value, the unavailable samples may be replaced to have different values from each other. The selection of the method of replacing unavailable samples with available samples may be performed on a per-predetermined-unit basis. For example, the replacement may be selected on a per-video basis, a per-sequence basis, a per-picture basis, a per-slice basis, a per-slice group basis, a per-tile basis, a per-coding-tree-unit (CTU) basis, a per-coding-unit (CU) basis, a per-prediction-unit (PU) basis, a per-transform-unit (TU) basis, or a per-block basis. At this time, the selection of the method of replacing unavailable samples with available samples may be determined based on the information signaled on a per-predetermined-unit basis or may be derived on a per-predetermined-unit basis. Alternatively, the selection method for the replacement methods may be predetermined in the encoder/decoder.

When a reference sample is located at a predetermined position, padding may be automatically performed without determining whether a block including the reference sample is available or not. For example, referring to FIG. 15, when the position (x, y) of the top left corner sample of the current block is (0, 0), sample availability may not be determined for samples located at (x, y) in which the x coordinate or the y coordinate is equal to or greater than W+H (x=W+H or greater or y=W+H or greater), and the samples may be padded with neighboring reference samples.

For example, a sample ref [W+H, −2] may be padded with the value of a sample ref [W+H−1, −2] without performing the availability determination on the sample ref [W+H, −2]. As another example, a sample ref [W+H, −3] may be padded with the value of a sample ref [W+H−1, −3] without performing the availability determination on the sample [W+H, −3]. That is, the padding may be performed on the samples located at positions (x, y: x is equal to or greater than W+H or y is equal to or greater than W+H) by using the closest sample on the same sample line without performing the availability determination thereon.

When the position of the top left corner sample of the current block is (0, 0), for samples located at positions (x, y: x is equal to or greater than W and is less than W+H) among the samples located above the current block, the availability determination will be performed, and then the padding will be performed according to the result of the availability determination. For samples located at positions (x, y: y is equal to or greater than H and is less than W+H) among the samples located to the left of the current block, the availability determination will be performed, and the padding will be performed according to the availability determination.

For example, when the position of the top left corner sample of the current block is (0, 0), for samples corresponding to rec [x, −1] (x ranges from −1 to W+H−1) and/or samples corresponding to rec [−1, y] (y ranges from 0 to H+W−1), the availability determination and the padding may be performed.

For the padding, a plurality of reference sample lines may be used. For example, when the padding is performed on a first reference sample line adjacent to (that is, the closest to) the current block, a second reference sample line, which is the second closest to the current block, may be used. For example, the padding may be performed according to Equation 2. That is, the sample values of the first reference sample line may be derived by using the weighted average of samples selected from the first reconstructed reference sample line and samples selected from the second reconstructed reference sample line. In this case, the selected reconstructed sample may be one located at a current sample position or at a position adjacent to the current sample position.

$$\text{ref}[x,-1]=(rec[x,-2]+3\times rec[x,-1]+2)>>2, (x=0\sim H+W-1) \quad \text{[Equation 2]}$$

Hereinafter, a method of filtering reference samples used for intra-picture prediction will be described in detail.

Whether to perform the filtering is determined depending on at least one of a block size, a block shape, an intra-picture prediction mode, a block division depth (or a block partition depth), and a pixel component.

In one embodiment of the present invention, whether to perform filtering on reference samples is determined depending on the size of the current block. In this case, the size N of the current block (where N is a positive integer) is defined as the width W of the current block, the height H of the current block, the sum (W+H) of the width (W) and the height (H) of the current block, or the number of pixels (W×H) within the current block.

For example, the reference sample filtering is performed only when the size N of the current block is equal to or larger than a predetermined value T (where T is a positive integer).

Alternatively, for example, the reference sample filtering is performed only when the size N of the current block is equal to or smaller than a predetermined value T (where T is a positive integer).

Further alternatively, for example, the reference sample filtering is performed only when the size N of the current block is equal to or larger than a first predetermined value T1 and equal to or smaller than a second predetermined value T2. (Where T1 and T2 are positive integers and T2 is greater than T1 (T2>T1)).

Further alternatively, for example, the reference sample filtering is performed only when the size N of the current block is equal to or smaller than a first predetermined value T1 and is equal to or larger than a second predetermined value T2. (Where T1 and T2 are positive integers and T2 is greater than T1 (T2>T1)).

In one embodiment of the present invention, whether to perform the reference sample filtering is determined depending on the shape of the current block. Here, the shape of the current block is a square block or a non-square block. The non-square blocks are classified into a horizontally long non-square block having the width greater than the height and a vertically long non-square block having the height greater than the width.

For example, the reference sample filtering is performed only when the current block is a square block.

Alternatively, the reference sample filtering is performed only when the current block is a non-square block.

On the other hand, when the current block is a non-square block, whether to perform the filtering on the top and left reference samples is determined depending on the width (horizontal dimension) W of the current block or the height (vertical dimension) H of the current block.

For example, whether to perform the filtering on the top reference samples is determined depending on the width W of the current block, and whether to perform the filtering on the left reference samples is determined depending on the height H of the current block.

Alternatively, whether to perform the filtering on the top and left reference samples is determined depending on a larger one of the width W of the current block and the height H of the current block.

Further alternatively, whether to perform the filtering on the top and left reference samples is determined depending on a smaller one of the width W of the current block and the height H of the current block.

In one embodiment of the present invention, whether to perform the filtering on reference samples is determined depending on the intra-picture prediction mode of the current block.

For example, the reference sample filtering is performed when the intra-picture prediction mode of the current block is a non-directional mode, i.e., Planar mode or DC mode.

Alternatively, no filtering is performed when the intra-picture prediction mode of the current block is a non-directional mode, i.e., Planar mode or DC mode.

Further alternatively, no filtering is performed regardless of the block size when the intra-picture prediction mode of the current block is the vertical mode and/or the horizontal mode among directional modes.

In the case where the intra prediction mode of the current block is defined as CurMode, when the mode number or index of the horizontal mode is defined as Hor_Idx and the mode number or index of the vertical mode is defined as Ver_Idx, the reference sample filtering is performed only when the CurMode satisfies the expression "min {abs (CurMode-Hor_Idx), abs (CurMode-Ver_Idx)}>Th". In this case, the threshold value Th is an arbitrary positive integer and is a value adaptively determined depending on the size of the current block. For example, the larger the current block size, the smaller the threshold value Th. Since the reference sample filtering is performed when the expression "min {abs (CurMode-Hor_Idx), abs (CurMode-Ver_Idx)}>Th" is satisfied, the expression "min {abs (CurMode-Hor_Idx), abs (CurMode-Ver_Idx)}>Th" is referred to as an intra-picture prediction mode-dependent reference sample filtering execution condition. That is, for example, only when the above condition is satisfied, the reference sample filtering is performed.

Alternatively, whether to perform the reference sample filtering is determined depending on the division depth (or partition depth) of the current block.

Further alternatively, whether to perform the reference sample filtering is determined depending the pixel component of the current block. Here, the pixel components include a luminance component or any one of two chrominance components Cb and Cr.

For example, the reference sample filtering is performed on only the luminance component, and the reference sample filtering is not performed on the chrominance components.

Alternatively, the reference sample filtering is performed on all the components including the luminance component and the chrominance components.

As described above, whether to perform the filtering on the top and/or left reference samples of the current block is determined depending on any combination of the filtering execution conditions based on the size, the shape, the intra-picture prediction mode, the division depth (or partition depth), and the pixel component of the current block.

The type of a filter is determined depending on at least one of the characteristic of a picture, a block size, a block shape, an intra-picture prediction mode, a block division depth (or block partition depth), whether the intra-picture prediction mode-dependent reference sample filtering execution condition is satisfied, and a pixel component. Here, the filter type means a kind of filter.

The filter type is one of an n-tap filter, a linear filter, a non-linear filter, a bilateral filter, a smoothing filter, an edge-preserving filter, and an order-statistic filter. Depending on the filter type, at least one of a filter length, a filter tap count, and a filter coefficient is preset. In this case, n represents a positive integer.

The filter type is determined depending on the pixel component of the current block.

For example, the filter type of a chrominance component is set to be the same as the filter type of a luminance component corresponding to the chrominance component.

On the other hand, the filter type of the luminance component and the filter type of the chrominance component can be independently determined.

At least one of the filter length and the filter coefficient is determined according to the filter type. However, even though the filter type to be used for reference sample filtering is preliminarily determined, at least one of the filter length and the filter coefficient can be adaptively changed.

The filter length is determined depending on at least one of the characteristic of a picture, a block size, a block shape, an intra-picture prediction mode, a block division depth (or block partition depth), whether the reference sample filtering is to be performed, whether the intra-picture prediction mode-dependent reference sample filtering execution condition is satisfied, and a pixel component of a block. Here, the filter length means the number of taps of a filter.

In one embodiment of the present invention, the length of a filter used for the reference sample filtering is determined depending on the size of the current block. In this case, the size N of the current block (where N is a positive integer) is defined as the width W of the block, the height H of the block, the sum (W+H) of the width (W) and height (H) of the block, or the number of pixels (W×H) of the block. Here, the reference sample means at least one of the top reference sample and the left reference sample.

The filter length is adaptively determined depending on the block size N.

For example, filtering is performed with a filter having a length of L_1 when N is less than a threshold value Th_1: filtering is performed with a filter having a length of L_2 when N is greater than or equal to a first threshold value Th_1 and less than a second threshold value Th_2; and filtering is performed with a filter having a length of L–K when N is greater than Th_(K−1) and less than Th_K. The lengths L_1 to L_K are positive integers satisfying a relationship of L_1<L_2< . . . <L_K, and the threshold values Th_1 to Th_K are positive integers satisfying a relationship of Th_1<Th 2< . . . . Th_K. Alternatively, the lengths L_1 to L_K are positive integers satisfying a relationship of L_1<L_2< . . . <L_K, and the threshold values Th_1 to Th_K are positive integers satisfying a relationship of Th_K<Th_K–1< . . . <Th_1. Here, K is a positive integer.

On the other hand, the filter length is a fixed length regardless of the block size N.

When filtering is performed on a plurality of reference sample lines, the filter length determined in a manner described above is applied equally to all the reference sample lines, or different filter lengths are applied to respective sample lines.

For example, the length of a filter for the first top and/or left reference sample line is determined in a manner described above, and the length of a filter for the second and onward top and/or left reference sample lines is determined to be shorter than the length of the filter for the first top and/or left reference sample line. Conversely, the length of a filter for the second and onward top and/or left reference sample lines is determined to be longer than the length of a filter for the first top and/or left reference sample line.

According to one embodiment of the present invention, the length of a filter for the top and/or left reference sample is determined depending the shape of the current block.

For example, when the shape of the current block is square (that is, when the width W of the current block and the height H of the current block are the same), filters of an equal length are used for the top reference samples and the left reference samples. When the shape of the current block is non-square, filters of different lengths are used for the top reference samples and the left reference samples.

For example, when the current block has the width W longer than the height H, a filter for the top reference samples is longer than a filter for the left reference samples. On the other hand, when the current block has the width W shorter than the height H, a filter for the left reference samples is longer than a filter for the top reference samples.

Alternatively, for example, the length of a filter for the top reference samples and the length of a filter for the left reference samples are independently determined depending on the width W of the current block or the height H of the current block.

Even when the shape of the current block is non-square, filters of different lengths can be used to filter the top reference samples and the left reference samples.

Alternatively, a filter for the top reference samples and a filter for the left reference samples have an equal length regardless of the shape of the block.

According to one embodiment of the present invention, the length of a filter for the top reference samples and the length of a filter for the left reference samples are determined depending on the intra-picture prediction mode of the current block.

For example, when the intra-picture prediction mode of the current block is one of the vertical modes, a filter for the top reference samples is longer than a filter for the left reference samples. When the intra-picture prediction mode of the current block is one of the horizontal modes, a filter for the left reference samples is longer than a filter for the top reference samples.

Conversely, when the intra-picture prediction mode of the current block is one of the vertical modes, a filter for the left reference samples is longer than a filter for the top reference samples. When the intra-picture prediction mode of the current block is one of the horizontal modes, a filter for the top reference samples is longer than a filter for the left reference samples.

Alternatively, filters of an equal length are used for the top reference samples and the left reference samples regardless of the intra-picture prediction mode of the current block.

On the other hand, the filter length is determined depending on the pixel component of the current block.

For example, the filter length for the chrominance component is set to be equal to the filter length for the luminance component.

On the other hand, the filter length for the luminance component and the filter length for the chrominance component are independently determined.

The coefficients of a filter are determined depending on at least one of the characteristic of a picture, a block size, a block shape, an intra-picture prediction mode, a block division depth (or block partition depth), whether the reference sample filtering is performed, whether the intra-picture prediction mode-dependent reference sample filtering execution condition is satisfied, and a pixel component. Here, the filter coefficient means a set of coefficients.

Hereinafter, a method of filtering reference samples that are used for intra-picture prediction will be described in detail. The above methods regarding determination of whether to perform reference sample filtering, a filter type, a filter length, and a filter coefficient are similarly applied in other processes performed in the encoder illustrated in FIG. 1 or the decoder illustrated in FIG. 2 as well as the reference sample filtering. That is, the determination methods can be used for the following:

block boundary region filtering and interpolation filtering, which are performed by an intra-prediction unit;

interpolation filtering for generating a prediction block, interpolation filtering with respect to the generated prediction block, and block boundary region filtering for an inter-picture prediction block, all of which are performed by a motion compensation unit;

interpolation filtering for generating a prediction block, which is performed by a motion prediction unit;

de-blocking filtering, sample adaptive offset (SAO) filtering, and adaptive loop filtering (ALF), which are performed by a filter unit; and at least one of overlapped block motion compensation (OBMC), frame rate up conversion (FRUC), and bi-directional optical flow (BIO) which are performed to refine or fine-tune motion compensation in the encoder or the decoder.

Therefore, the term "filtering" in the following description means at least one of the reference sample filtering, the interpolation filtering, and the boundary region filtering, which are performed by the intra-prediction unit; the interpolation filtering for generating a prediction block, the interpolation filtering performed on the generated prediction block, and the boundary region filtering for the generated prediction block, which are performed by the motion prediction unit and the motion compensation unit; and the in-loop filtering performed by the filter unit; and the OBMC, the FRUC, and the BIO which are performed for refining motion information within the encoder and the decoder. According to one embodiment of the present invention, at least one of whether to perform filtering, a filter type, a filter length, and a filter coefficient is determined depending on at least one of a block size, a block shape, a prediction mode of a block, a local characteristic of a picture, a global characteristic of a picture, whether reference sample filtering is performed, whether an intra-picture prediction mode-dependent reference sample filtering execution condition is satisfied, a pixel component, and other coding parameters.

The filter coefficient is determined depending on at least one of the characteristic of a picture, a block size, a block shape, an intra-picture prediction mode of a block, a block division depth (or partition depth), whether reference sample filtering is performed, whether an intra-picture mode-dependent reference sample filtering execution condition is satisfied, and a pixel component of a block.

The filter coefficient used in the interpolation filtering performed by the intra-picture prediction unit is determined depending on at least one of the characteristic of a picture, a block size, a block shape, an intra-picture prediction mode of a block, a block division depth (or partition depth), whether reference sample filtering is performed, whether an intra-picture mode-dependent reference sample filtering execution condition is satisfied, and a pixel component of a block.

For example, when reference sample filtering is performed or when intra-picture prediction mode-dependent reference sample filtering execution condition is satisfied, a first filter coefficient set is used for interpolation filtering. On the other hand, when reference sample filtering is not performed or when intra-picture prediction mode-dependent reference sample filtering execution condition is not satisfied, a second filter coefficient set is used for interpolation filtering.

That is, the filter coefficient is selected from among one or more filter coefficient sets each including one or more coefficients, depending on whether reference sample filtering is performed or whether intra-picture prediction mode-dependent reference sample filtering execution condition is satisfied.

The filter coefficient set used for the interpolation filtering performed by the intra-prediction unit is the same filter coefficient set as the filter coefficient set used to generate a luminance or chrominance prediction block by the motion compensation unit.

In addition, when the interpolation filtering is not performed on filtering target reference samples by the intra-prediction unit, different interpolation filter coefficients are used depending on whether or not the intra-picture prediction mode-dependent reference sample filtering execution condition is satisfied.

As another example, when interpolation filtering is performed on the filtering target reference samples by the intra-picture prediction unit, different interpolation filter coefficients are used depending on whether or not the intra-picture prediction mode-dependent reference sample filtering execution condition is satisfied.

Here, the filter coefficient sets may include different numbers K of filter coefficients. Here, K is a positive integer. Further, the filter coefficient set or the filter coefficient represents an interpolation filter coefficient set or an interpolation filter coefficient.

In one embodiment of the present invention, filtering for at least one pixel component of the pixel components including a luminance component and two chrominance components Cb and Cr is performed by using any one method described below.

In one example, filtering is performed on the luminance component and is not performed on the chrominance components. Conversely, filtering is not performed on the luminance component and is performed on the chrominance components. Alternatively, filtering is performed on both the luminance component and the chrominance components.

For example, filtering methods applied to the luminance component and the chrominance components are the same. On the other hand, different filtering methods are applied to the luminance component and the chrominance components.

For example, the same filtering method is applied to both of the chrominance components Cb and Cr. On the other hand, different filtering methods are applied to the chrominance components Cb and Cr.

Hereinafter, filtering application directions, filtering application regions (pixel regions), and filtering application units (pixel units) according to one embodiment of the present invention are described.

The filtering application direction means a direction in which filtering is performed. The direction is any one of a horizontal direction, a vertical direction, and a diagonal direction having an arbitrary angular value.

In one embodiment of the present invention, the pixel region includes pixels located in parallel with a target pixel in a horizontal direction, pixels located in parallel with a target pixel in a vertical direction, pixels located in a plurality of horizontal lines including a target pixel, pixels located in a plurality of vertical lines including a target pixel, pixels located in a cross-shaped area including a target pixel, or pixels in a geometric area including a target pixel.

In one embodiment of the present invention, the filtering is performed on a per integer pixel (integer pel) basis and/or a per fractional pixel (fractional pel) basis. Here, the fractional pixel unit is a half-pel, quarter-pel, ⅛ pel, 1/16 pel, 1/32 pel, 1/64 pel, . . . , or a 1/N pel in which N is a positive integer.

Hereinafter, an n-tap filter, a smoothing filter, an edge-preserving filter, a one-dimensional filter, a two-dimensional filter, and an order-statistic filter according to one embodiment of the present invention will be described in detail. Here, n is a positive integer.

The filtering based on an n-tap filter according to an embodiment of the present invention is performed according to Equation 3. Here, the pixel (referred to as a target pixel) to be filtered is X, and the pixels (referred to as used pixels) used for filtering are $\{b_1, b_2, \ldots, b_n\}$, and the filter coefficients are $\{c_1, c_2, \ldots, c_n\}$, the after-filtering pixel value of the target pixel is X', and n is a positive integer.

$$X' = \left\{\sum_{i=1}^{n} c_i \cdot b_i + \left(\sum_{i=1}^{n} c_i \gg 1\right)\right\} / \sum_{i=1}^{n} c_i \qquad \text{[Equation 3]}$$

In one exemplary filtering method, when the target pixel is "$b_{0,0}$", and an 8-tap filter having a filter length of 8 and a filter coefficient of $\{-1, 4, -11, 40, 40, -11, 4, -1\}$ is used, the after-filtering value is obtained according to Equation 4.

$b_{(0,0)} = \{-1 \times A_{(-3,0)} + 4 \times A_{(-2,0)} - 11 \times A_{(-1,0)} + 40 \times A_{(0,0)} + 40 \times A_{(1,0)} - 11 \times A_{(2,0)} + 4 \times A_{(3,0)} - 1 \times A_{(4,0)} + 32\}/64$ [Equation 4]

On the other hand, when a part of the area to be used to filter the target pixel X is located outside the picture boundary, the block boundary, or the sub-block boundary; the filtering of the target pixel X is performed by any one manner described below.

No filtering is performed on the target pixel X.

Filtering is performed on the target pixel X by using only the area existing inside the picture boundary, the block boundary, or the sub-block boundary.

The length of the smoothing filter used in one embodiment of the present invention is an arbitrary positive integer. The coefficient (or filter coefficient) of the smoothing filter is determined in any one manner described below.

For example, the coefficients of the smoothing filter are derived through a Gaussian function. The one-dimensional and two-dimensional Gaussian functions are expressed by Equation 5.

$$g(x) = \frac{1}{\sqrt{2\pi} \cdot \sigma} \cdot e^{\frac{x^2}{2\sigma^2}} - 1D \qquad \text{[Equation 5]}$$

$$g(x, y) = \frac{1}{2\pi\sigma^2} \cdot e^{\frac{x^2+y^2}{2\sigma^2}} - 2D$$

$\sigma$: standard deviation

The filter coefficients are quantized values, derived according Equation 5, within a pixel range of from 0-$2^{Bit\_Depth}$.

For example, when filtering is performed using a one-dimensional Gaussian function with a 4-tap filter having a filter length of 4 on a per 1/32 pel basis, the filter coefficients applied to the target pixels located at integer pixel positions or fractional pixel positions are determined as illustrated in Table 1. In this case, in Table 1, 0 represents an integer pixel unit, and filter coefficients 17/32 to 31/32 can be derived to be symmetric with respect to filter coefficients 16/32 to 1/32, respectively.

TABLE 1

| Position | 0 (Integer-Pel) | 1/32 | 2/32 |
|---|---|---|---|
| filter coefficients | {47, 161, 47, 1} | {3, 161, 51, 1} | {40, 160, 54, 2} |
| Position | 3/32 | 4/32 | 5/32 |
| filter coefficients | {37, 159, 58, 2} | {34, 158, 62, 2} | {31, 156, 67, 2} |

TABLE 1-continued

| Position | 6/32 | 7/32 | 8/32 |
|---|---|---|---|
| filter coefficients | {28, 154, 71, 3} | {26, 151, 76, 3} | {23, 149, 80, 4} |
| Position | 9/32 | 10/32 | 11/32 |
| filter coefficients | {21, 146, 85, 4} | {19, 142, 90, 5} | {17, 139, 94, 5} |
| Position | 12/32 | 13/32 | 14/32 |
| filter coefficients | {16, 135, 99, 6} | {4, 131, 104, 7} | {13, 127, 108, 8} |
| Position | 15/32 | 16/32 | |
| filter coefficients | {11, 123, 113, 9} | {10, 118, 118, 10} | |

For example, when filtering is performed using a one-dimensional Gaussian function with a 4-tap filter having a filter length of 4 on a per 1/32 pel basis, the filter coefficients applied to the target pixels located at integer pixel positions or fractional pixel positions are determined as illustrated in Table 2.

TABLE 2

| Position | 0 (Integer-Pel) | 1/32 | 2/32 | 3/32 |
|---|---|---|---|---|
| filter coefficients | {16, 32, 16, 0} | {15, 29, 17, 3} | {15, 29, 17, 3} | {14, 29, 18, 3} |
| Position | 4/32 | 5/32 | 6/32 | 7/32 |
| filter coefficients | {13, 29, 18, 4} | {13, 28, 19, 4} | {13, 28, 19, 4} | {12, 28, 20, 4} |
| Position | 8/32 | 9/32 | 10/32 | 11/32 |
| filter coefficients | {11, 28, 20, 5} | {11, 27, 21, 5} | {10, 27, 22, 5} | {9, 27, 22, 6} |
| Position | 12/32 | 13/32 | 14/32 | 15/32 |
| filter coefficients | {9, 26, 23, 6} | {9, 26, 23, 6} | (8, 25, 24, 7} | (8, 25, 24, 7} |
| Position | 16/32 | 17/32 | 18/32 | 19/32 |
| filter coefficients | {8, 24, 24, 8} | {7, 24, 25, 8} | {7, 24, 25, 8} | {6, 23, 26, 9} |
| Position | 20/32 | 21/32 | 22/32 | 23/32 |
| filter coefficients | (6, 23, 26, 9} | {6, 22, 27, 9} | {5, 22, 27, 10} | {5, 21, 27, 11} |
| Position | 24/32 | 25/32 | 26/32 | 27/32 |
| filter coefficients | {5, 20, 28, 11} | [4, 20, 28, 12} | {4, 19, 28, 13} | {4, 19, 28, 13} |
| Position | 28/32 | 29/32 | 30/32 | 31/32 |
| filter coefficients | {4, 18, 29, 13} | {3, 18, 29, 14} | {3, 17, 29, 15} | {3, 17, 29, 15} |

In Table 2, the sum of the filter coefficients is represented in M bits. Here, the sum of the filter coefficients does not exceed 2<<M. For example, M is 6 or any positive integer. When M is 6, the sum of the filter coefficients does not exceed 64, which is 2<<6.

At least one of the filter coefficients in Table 2 means at least one of the filter coefficients in the first filter coefficient set.

However, the filter coefficients that can be derived by using the Gaussian function are not limited to the specific values listed in Table 1 or Table 2. The filter coefficients can be determined on the basis of at least one of a block size, a block shape, a prediction mode (i.e., intra or inter), a local characteristic of a picture, a global characteristic of a picture, whether or not reference sample filtering is performed, whether or not an intra-picture prediction mode-dependent reference sample filtering execution condition is satisfied, a pixel component, and other coding parameters.

The filter coefficients in Tables 1 and 2 are an example of an M-tap filter coefficient set in which M is 4 or any other positive integer.

Therefore, the filter coefficients derived by using the Gaussian function are used for at least one of the followings: reference sample filtering, interpolation filtering, and boundary region filtering, which are performed by the intra-prediction unit; interpolation filtering for generating a prediction block, interpolation filtering performed on the generated prediction block, and boundary region filtering for the generated prediction block, which are performed by the motion prediction unit and the motion compensation unit; in-loop filtering performed by the filter unit; and OBMC, FRUC, and BIO for refining motion information, which are performed in the encoder and the decoder.

As another example, the coefficients of the smoothing filter are derived by using a DCT-based function. The DCT transform of the forward and backward directions (including the fractional pel units) can be expressed by Equation 6.

$$F(u) = c(u)\sum_{l=0}^{N-1} p(l)\cos\left(\frac{(2l+1)u\pi}{2N}\right) \text{ – forward direction} \quad \text{[Equation 6]}$$

$$p(x) = \sum_{l=0}^{N-1} c(u)F(u)\cos\left(\frac{(2x+1)u\pi}{2N}\right) \text{ – reverse direction}$$

$$p(\alpha') = \sum_{u=0}^{N-1} c(u)F(u)\cos\left(\frac{(2\alpha'+1)u\pi}{2N}\right) \text{ – reverse direction}$$

$$N = \text{Tap length } \alpha' = \alpha + \left(\frac{N}{2}-1\right) c(0) = \frac{1}{\sqrt{N}},$$

$$c(k) = \sqrt{\frac{2}{N}}, k = 1, \ldots, N-1$$

α: Fractional Point

The filter coefficients are quantized values, derived according to Equation 6, within a pixel range of from 0 to $2^{BitDepth}$.

For example, in FIG. 13, filter coefficients applied to fractional pixel positions such as ¼, ½, and ¾ are as follows.

$$h_a^y(n) = [-1, 4, -10, 58, 17, -5, 1], n = -3, \ldots 3$$

$$h_b^y(n) = [-1, 4, -11, 40, 40, -11, 4, -1], n = -3, \ldots 4$$

$$h_c^y(n) = h_d^y(-n)$$

As another example, when filtering is performed using the DCT-based function with a 4-tap filter having a filter length of 4 on a per 1/32 pel basis, the filter coefficients applied to the target pixels at integer pixel positions or fractional pixel positions are determined as illustrated in Table 3.

TABLE 3

| Position | 0 (Integer-Pel) | 1/32 | 2/32 | 3/32 |
|---|---|---|---|---|
| filter coefficients | (0, 64, 0, 0} | {−1, 63, 2, 0} | (−2, 62, 4, 0} | (−2, 60, 7, −1} |
| Position | 4/32 | 5/32 | 6/32 | 7/32 |
| filter coefficients | {−2, 58, 10, −2} | {−3, 57, 12, −2} | {−4, 56, 14, −2} | {−4, 55, 15, −2} |
| Position | 8/32 | 9/32 | 10/32 | 11/32 |
| filter coefficients | {−4, 54, 16, −2} | {−5, 53, 18, −2} | {−6, 56, 20, −2} | {−6, 49, 24, 3} |
| Position | 12/32 | 13/32 | 14/32 | 15/32 |
| filter coefficients | {−6, 46, 28, −4} | {−5, 44, 29, −4} | {−4, 42, 30, −4} | {−4, 39, 33, −4} |
| Position | 16/32 | 17/32 | 18/32 | 19/32 |
| filter coefficients | {−4, 36, 36, −4} | {−4, 33, 39, −4} | {−4, 30, 42, −4} | {−4, 29, 44, −5} |
| Position | 20/32 | 21/32 | 22/32 | 23/32 |
| filter coefficients | (−4, 28, 46, −6} | {−3, 24, 49, −6} | {−2, 20, 52, −6} | {−2, 18, 53, −5} |

TABLE 3-continued

| Position | 24/32 | 25/32 | 26/32 | 27/32 |
|---|---|---|---|---|
| filter coefficients | {−2, 16, 54, −4} | {−2, 15, 55, −4} | {−2, 14, 56, −4} | {−2, 12, 57, −3} |
| Position | 28/32 | 29/32 | 30/32 | 31/32 |
| filter coefficients | {−2, 10, 58, −2} | {−2, 10, 58, −2} | {0, 4, 62, −2} | {0, 2, 63, −1} |

In Table 3, the sum of the filter coefficients can be represented in M bits. Here, the sum of the filter coefficients does not exceed 2<<M. For example, M is 6 or any positive integer. When M is 6, the sum of the filter coefficients does not exceed 64, which is 2<<6.

At least one of the filter coefficients in Table 3 means at least one of the filter coefficients in the second filter coefficient set.

However, the filter coefficients that can be derived by using the DCT-based function are not limited to the specific values listed above or in Table 4. The filter coefficients can be determined on the basis of at least one of a block size, a block shape, a prediction mode (i.e., intra/inter) of a block, a local characteristic of a picture, a global characteristic of a picture, whether or not reference sample filtering is performed, whether or not an intra-picture prediction mode-dependent reference sample filtering execution condition is satisfied, a pixel component, and other coding parameters.

The filter coefficients in Table 3 are an example of an M-tap filter coefficient set in which M is 4 or any other positive integer.

Therefore, the filter coefficients derived by using the DCT-based function are used for at least one of the followings: reference sample filtering, interpolation filtering, and boundary region filtering, which are performed by the intra-prediction unit: interpolation filtering for generating a prediction block, interpolation filtering performed on the generated prediction block, and boundary region filtering for the generated prediction block, which are performed by the motion prediction unit and the motion compensation unit: in-loop filtering performed by the filter unit; and OBMC, FRUC, and BIO for refining motion information, which are performed in the encoder and the decoder.

Filtering may be performed on one or more reference samples among the samples constructed as above. The filtering may be adaptively performed based on at least one of the intra prediction mode of the current block, the size of the current block, and the shape of the current block. For example, at least one of a determination of whether to apply filtering, a filter type, a filter strength, and a filter coefficient may be adaptively determined.

For example, whether to apply the filtering may be determined for each of the plurality of reference sample lines. For example, the filtering may be applied to the first reference sample line adjacent to the current block, and may not be applied to the second reference sample line. For example, both a filtered value and an unfiltered value may be used for the same reference sample.

For example, at least one of a 3-tap filter, a 5-tap filter, a 7-tap filter, and an N-tap filter may be selectively applied according to at least one of the intra prediction mode of the current block, the size of the current block, and the shape of the current block. In this case, M is an integer equal to or greater than 3.

Figure 11:
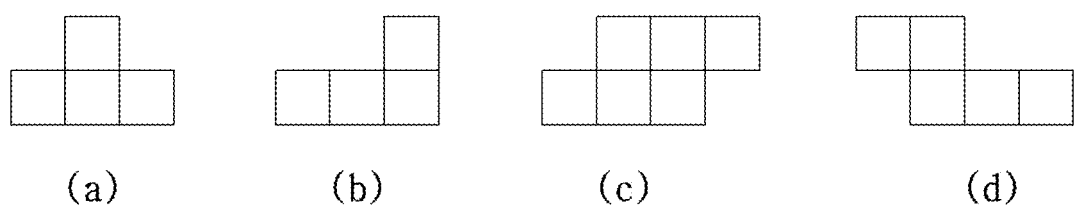
FIG. 11 illustrates various filter shapes.

For example, filters having different shapes may be selectively used according to at least one of the intra prediction mode, the size, and the shape of the current block. FIG. 11 illustrates various filter shapes.

The shape of the current block may be determined by comparing the width (horizontal dimension) of the current block with the height (vertical dimension) of the current block. For example, at least one of a decision of whether to apply a filter, a filter type, a filter strength, and a filter coefficient may be adaptively determined according to whether the current block is a horizontally oblong block or a vertically oblong block. Alternatively, at least one of a decision of whether to apply filtering, a filter type, a filter strength, and a filter coefficient may be adaptively determined according to whether the current block is a rectangular block or a square block.

For example, an intra-picture prediction is performed using at least one of the after-filtering value and before-filtering value (original pixel value) of the same reference sample.

For example, when the intra-picture prediction mode "intra_pred_mode" of the current block is a directional intra-picture prediction mode, a smaller value among a difference value with the vertical mode and a difference value with the horizontal mode is derived. When the derived value is larger than a threshold value assigned to a certain block size, the filtering is performed. Conversely, when the derived value is less than or equal to the threshold value, the filtering is not performed.

In another embodiment regarding the filtering, bi-linear interpolation filtering is performed on a current block having a predetermined size or larger. For example, quadratic differential values in a vertical direction and a horizontal direction for a current block are obtained. When this value is smaller than a specific threshold value, bilinear interpolation filtering is performed on the reference sample.

In order to reduce the noise of the reference sample and reduce the amount of the residual signal generated after the intra-picture prediction, the number of filtering operations performed on the reference sample varies according to at least one of the intra-picture prediction mode of the current block, the size of the current block, and the shape of the current block, the filter coefficients, and the filter shape, and the number of filter taps.

For example, when the intra-picture prediction mode is a non-directional intra-picture prediction mode, the number of filtering operations to be performed is determined to be N. For example, when the intra-picture prediction mode is a directional intra-picture prediction mode, the number of filtering operations to be performed is determined to be N. For example, when the size of the current block is 8×8 or larger, the number of filtering operations is determined to be N. For example, when the size of the current block is 16×16 or smaller, the number of filtering operations is determined to be N. For example, when the block shape of the current block is square, the number of filtering operations is determined to be N. For example, when the block shape of the current block is non-square such that the height is greater than the width, the number of filtering operations to be performed on at least one of the left reference samples is determined to be N. For example, when the block shape of the current block shape is non-square such that the width is greater than the height, the number of filtering operations to be performed on at least one of the top reference samples is determined to be N. In these cases, N is a positive integer.

For example, the number of filtering operations to be performed on the reference samples varies for each reference sample line. For example, the number of filtering operations to be performed on a first reconstructed sample line 1 is determined to be N and the number of filtering operations to be performed on a second reconstructed sample line 2 is determined to be M. Here, N is a positive integer greater than or equal to 2, and M is a positive integer less than N. For example, M is 1. For example, the shorter the distance between the reconstructed sample line and the current block is, the greater the number of filtering operations. Alternatively, the reference sample filtering is performed only on the first reconstructed sample line 1, and is not performed on the second reconstructed sample line 2 and the onward reconstructed sample lines.

Information on the number of times that filtering is performed on the reference samples is entropy-encoded/entropy-decoded. Alternatively, the number of times that filtering is performed on the reference samples is determined according to a criterion present in the encoder and the decoder. Alternatively, the number of times that filtering is performed on the reference samples is adaptively determined according to at least one of the coding parameters (the block size, the block shape, the intra-picture prediction mode, the filter coefficient, the filter shape, the filter tap count, etc.) of at least one of the current block and the neighboring blocks adjacent to the current block.

Intra prediction for the current block may be performed based on the derived intra prediction mode and the constructed reference sample.

For example, non-directional intra prediction may be performed for the current block. The mode of the non-directional intra prediction may be at least one of a DC mode, a planar mode and an LM mode.

For the DC mode, prediction may be performed using the average value of one or more reference samples among the constructed reference samples. In this case, filtering may be applied to one or more prediction samples (also referred to as predicted samples) located at the boundary of the current block. The DC prediction may be adaptively performed based on at least one of the size of the current block and the shape of the current block. Further, the range of the reference samples used in the DC mode can be determined based on at least one of the size and the shape of the current block.

Figure 12:
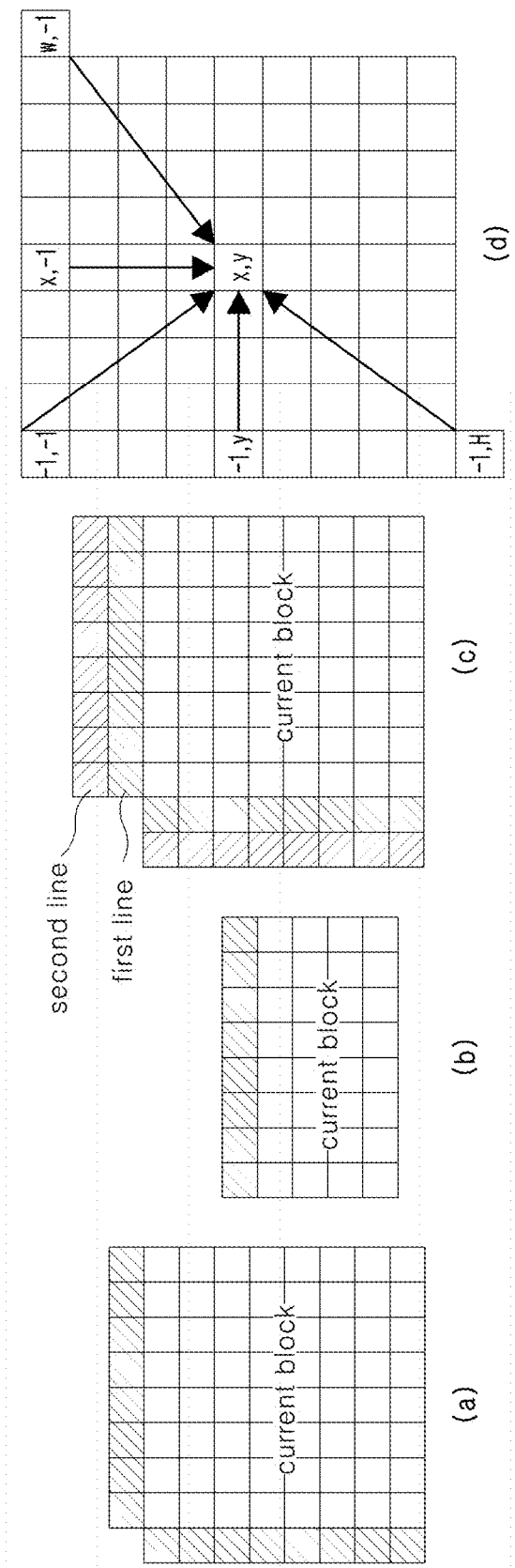
FIG. 12 is a diagram for describing intra prediction according to the shapes of the current block.

FIG. 12 is a diagram for describing intra prediction according to the shapes of the current block.

For example, when the current block is a square block, as illustrated in (a) of FIG. 12, DC prediction may be performed by using the average value of the reference sample located above the current block and the reference sample located to the left of the current block.

For example, when the current block is a non-square block, neighboring samples adjacent to the left end and the upper end of the current block may be selectively used. When the current block is a rectangular block, as illustrated in (b) of FIG. 12, the prediction may be performed using the average value of the reference samples adjacent to a longer side among the left side and the upper side of the current block. In this case, a boundary filtering may be performed for a prediction sample inside the current block adjacent to the shorter side among sizes of width and height of the current block. The boundary filtering may be performed for at least one prediction sample included in N numbers of columns inside the current block adjacent to a left reference sample and/or at least one prediction sample included in M numbers of rows inside the current block adjacent to an upper reference sample. In this case, N and M may be a positive integer or 0. Or a prediction may be performed by using a weighted sum of a reference sample adjacent to the longer side and a reference sample adjacent to the shorter side, among sizes of width and height of the current block. In this case, a relatively bigger weight may be assigned to a reference sample adjacent to the longer side for performing the weighted sum.

For example, when the size of the current block corresponds to a predetermined size or falls within a predetermined range, a predetermined number of reference samples, among the reference samples located above or to the left of the current block, are selected, and the prediction is performed using the average value of the selected reference samples. The predetermined size may be a fixed size of N×M, which is preset in the encoder/decoder. In this case, N and M are integers greater than 0, and N and M may be the same or different from each other. The predetermined range may mean a threshold value for selecting the reference samples for prediction of the current block. The threshold value may be set with at least one of a minimum value and a maximum value. The minimum value and/or the maximum value may be a fixed value or fixed values preset in the encoder/decoder, or a variable value or variable values that is/are encoded and then signaled by the encoder.

For example, one or more average values may be used to perform the prediction. When the current block is a square block or a non-square block, at least one of a first average value or a second average value may be used, in which the first average value is the average of the reference samples located above the current block and the second average value is the average of the reference samples located to the left of the current block. The DC prediction value of the current block may be the first average value or the second average value. Alternatively, the DC prediction value of the current block may be a weighted sum obtained by weighting the first average value and the second average value. For example, the weights for the first and second average values may be the same (that is, 1:1).

A range of predetermined reference samples used for calculating DC value may differ according to a block size and/or shape when the current block is W×H. For example, in case W, H, W*H and/or W+H is equal to or smaller than the first size, reference samples of the first group may be used. Or, in case W, H, W*H and/or W+H is equal to or bigger than the second size, reference samples of the second group may be used. The reference samples of the first group and/or the reference samples of the second group may include at least one reference sample selected from reference samples of a left side, an upper side, a lower side and a right side. The calculated DC value may be assigned as a sample value of an intra prediction block of the current block.

According to the above method, a shift operation can be used to calculate all of the DC values. For example, the method can be used even for the case where a sample length, which represents the width, the height, or the sum of the width and height of the current block, is not the power of two. The method may be applied to both luma DC prediction and chroma DC prediction. Alternatively, the method may be applied either to luma DC prediction or to chroma DC prediction.

For example, when the current block is a non-square block, the prediction may be performed based on either the width or the height of the current block. For example, a predicted value may be obtained by dividing the sum of the values of the upper reference sample and the left reference sample by the length of a longer side (namely, the width or the height) of the current block. In this case, the division operation using the value corresponding to the longer one among the width and the height may be performed by a shift operation.

In another embodiment, the accuracy of the intra-picture prediction can be improved by generating a prediction block of the current block from the sample values of a block having a high correlation with the current block among the left neighboring block and the top neighboring block of the current block.

The correlation between the neighboring block and the current block is determined on the basis of at least one of the coding parameters (including the size, shape, division depth, prediction mode (inter or intra), and intra-picture prediction mode) of the current block and/or the coding parameters of the neighboring blocks. For example, the neighboring block adjacent to a longer one between the height and the width of the current block is considered to have a higher correlation. Alternatively, the neighboring block that is intra-predicted is considered to have a higher correlation. Alternatively, the neighboring block that is intra-predicted with an intra-picture prediction mode having a similar direction to the intra-picture prediction mode of the current block is considered to have a higher correlation. When the current block is intra-predicted with a non-directional mode, the neighboring block that is intra-predicted with a non-directional mode is considered to have a higher correlation.

When the current block is a square block, the prediction is performed using the average value of the reference samples located on the left side of the current block. In this case, the reference sample filtering is performed only on the reference samples located above the current block. Additionally, the reference sample filtering is performed on the reference samples located on the left side of the current block. In this case, boundary filtering is performed on the top boundary in the prediction block of the current block. Additionally, the boundary filtering is performed on the left boundary in the prediction block of the current block.

Alternatively, when the current block is a square block, the prediction is performed using the average value of the reference samples located above the current block. In this case, the reference sample filtering is performed only on the reference samples located on the left side of the current block. Additionally, the reference sample filtering is performed on the reference samples located above the current block. In this case, the boundary filtering is performed on the left boundary of the prediction block of the current block. Additionally, the boundary filtering is performed on the top boundary of the prediction block of the current block.

Whether to perform DC mode-based prediction is determined according to least one of the coding parameters of the current block and the neighboring blocks.

When filtering is performed on the left reference samples and the top reference samples, at least one of the following factors differs between the left reference samples and the top reference samples: whether or not the filtering is performed, filter coefficients, a filter shape, and a filter tap count.

For example, depending on the size of the current block, the reference sample filtering for the left reference samples and the reference sample filtering for the top reference samples differ in terms of at least one factor among whether filtering is performed, the filter coefficients, the filter shape, and the filter tap count.

For example, depending on the shape of the current block, the reference sample filtering for the left reference sample and the reference sample filtering for the top reference sample differ in terms of at least one of the following factors: whether filtering is performed, the filter coefficient, the filter shape, and the filter tap count.

The boundary filtering for the left boundary within the prediction block of the current block and the boundary filtering for the top boundary within the prediction block of the current block differ in terms of at least one of the following factors: whether the filtering is performed, the filter coefficient, the filter shape, and the filter tap count.

For example, depending on the size of the current block, the boundary filtering for the left boundary within the prediction block of the current block and the boundary filtering for the top boundary within the prediction block of the current block differ in terms of at least one of the following factors: whether or not the filtering is performed, the filter coefficient, the filter shape, and the filter tap count.

For example, depending on the shape of the current block, the boundary filtering for the left boundary in the prediction block of the current block and the boundary filtering for the top boundary in the prediction block of the current block differ in terms of at least one of the following factors: whether or not the filtering is performed, the filter coefficient, the filter shape, and the filter tap count.

The boundary filtering is performed on at least one sample included in N columns adjacent to the left reference samples and/or at least one sample included in M rows adjacent to the top reference samples, within the prediction block of the current block. In this case, each of N and M is zero or a positive integer.

For example, the DC prediction may be performed using a plurality of reference sample lines. For example, the prediction may be performed using two reference sample lines, as illustrated in (c) of FIG. 12.

For example, the average value of the reference samples included in the two reference sample lines may be determined as the DC prediction value of the current block.

Alternatively, different weights may be applied to the reference samples of the first adjacent line and the reference samples of the second adjacent line of the current block. For example, a weighted average of each sample in the first reference sample line and each sample in the second reference sample line is calculated by applying the weights 3:1 to each sample in the first reference sample line and each sample in the second reference sample line (that is, (3×the first line reference sample+the second line reference sample+2)>>2), and the average of the weighted averages may be determined as the DC prediction value of the current block. Alternatively, the resultant value of ((3× the first line reference sample—the second line reference sample)>>1) may be obtained, and the average of these values may be determined as the DC prediction value of the current block. The weights are not limited to the above example, and any weights may be used. In this case, the closer to the current block the reference sample line is, the larger the weight that is applied to the reference sample line. The number of reference sample lines that can be used is not limited to two, and three or more reference sample lines may be used for prediction.

For the planar mode, prediction may be performed with a weighted sum as a function of the distance from at least one reference sample to an intra prediction target sample located in the current block.

Filtering may be performed on reference samples of the current block or prediction samples (that is, predicted samples) of the current block. For example, after filtering is applied to reference samples, planar prediction may be performed, and then filtering may be performed on one or more prediction samples. Among the prediction samples, filtering may be performed on samples in one, two, or N sample lines located at the top boundary or the left boundary of the current block.

To perform the planar prediction, a weighted sum of one or more reference samples may be used. For example, five reference samples may be used, as illustrated in (d) of FIG. 12. For example, to generate a prediction sample for a target position [x, y], the reference samples r[−1, −1], r[x, −1], r[−1, y], r[W, −1], and r[−1, H] may be used. In this case, W and H are the width and the height of the current block, respectively. For example, prediction samples pred[x, y] can be generated using Equation 7. In Equation 3, a, b, c, d, and e represent weights. N may be $\log_2(a+b+c+d+e)$.

$$\text{pred}[x,y] = (a \times r[-1,-1] + b \times r[x,-1] + c \times r[-1,y] + d \times r[W,-1] + e \times r[-1,H]) >> N \quad \text{[Equation 7]}$$

According to another embodiment of the present invention, in order to improve the accuracy of the intra-picture prediction, in the case of Planar mode, the intra-picture prediction is performed by calculating the weighted sum of a one-dimensional horizontal prediction block and a one-dimensional vertical prediction block while applying different weights to the respective prediction blocks. In one embodiment of the present invention, whether the Planar mode-based intra-picture prediction is performed is determined according to at least one of the coding parameters of the current block and the neighboring blocks.

FIG. 13 is a view illustrating one-dimensional horizontal prediction based on Planar mode, according to one embodiment of the present invention.

As illustrated in FIG. 13, a one-dimensional horizontal prediction block (consisting of samples PH0 to PH15) for a 4×4 current block is generated. In FIG. 13, a block demarcated by a bold line represents a current block, and samples located outside the bold line represent neighboring reference samples. That is, TL, TR, and BL refer to neighboring reference samples of the current block. Bilinear interpolation is used as an interpolation method for generating a one-dimensional horizontal prediction block. That is, a one-dimensional horizontal prediction block is constructed by performing a weighted sum operation with weights determined according to the distance between samples.

The samples PH0 to PH3 located between the reference sample L0 and the reference sample TR are generated by interpolating the value of the reference sample L0 and the value of the reference sample TR. The samples PH4 to PH7 located between the reference sample L1 and the reference sample TR are generated by interpolating the value of the reference sample L1 and the value of the reference sample TR. The samples PH8 to PH11 located between the reference sample L2 and the reference sample TR are generated by interpolating the values of the reference sample L2 and the value of the reference sample TR. The samples PH12 to PH15 located between the reference sample L3 and the reference sample TR are generated by interpolating the value of the reference sample L3 and the value of the reference sample TR.

FIG. 14 is a view illustrating one-dimensional vertical prediction based on Planar mode, according to one embodiment of the present invention.

As illustrated in FIG. 14, a one-dimensional vertical prediction block (consisting of samples PV0 to PH15) for a 4×4 current block is generated. In FIG. 14, a block demarcated by a bold line represents a current block, and samples located outside the bold line represent neighboring reference samples adjacent to the current block. That is, TL, TR, and BL refer to neighboring reference samples of the current block. Bilinear interpolation is used as an interpolation method for generating a one-dimensional vertical prediction block. That is, a one-dimensional vertical prediction block is constructed by performing a weighted sum operation with weights determined according to the distance between samples.

The samples PV0 to PV3 located between the reference sample T0 and the reference sample BL are generated by interpolating the value of the reference sample T0 and the value of the reference sample BL. The samples PV4 to PV7 located between the reference sample T1 and the reference sample BL are generated by interpolating the value of the reference sample T1 and the value of the reference sample BL. The samples PV8 to PV11 located between the reference sample T2 and the reference sample BL are generated by interpolating the value of the reference sample T2 and the value of the reference sample BL. The samples PV12 to PV15 located between the reference sample T3 and the reference sample BL are generated by interpolating the value of the reference sample T3 and the value of the reference sample BL.

In the intra-picture prediction based on Planar mode according to the present invention, an intra-picture prediction block is generated by generating a one-dimensional horizontal prediction block and a one-dimensional vertical prediction block and calculating the weighted sum of the generated prediction blocks. In this case, the weight used for the calculation of the weighted sum varies for each prediction block. For each sample in the generated one-dimensional horizontal prediction block and each sample in the one-dimensional vertical prediction block, an intra-picture prediction block is generated by calculating the average value, the weighted average value, or the weighted sum by applying different weights according to sample positions within the respective blocks. In this case, the weighted sum is calculated in units of at least one of a sample, a sample group, a line, and a block.

In addition, the weighted sum operation is applied to the boundary region within the intra-picture prediction block. In this case, the boundary region includes N columns adjacent to the left reference samples and M rows adjacent to the top reference samples, within the intra-picture prediction block. In this case, each of N and M is zero or a positive integer. In addition, N and M are different positive integers or the same positive integer. At least one of N and M is determined on the basis of at least one of a block size and a block shape. Alternatively, information of N and M is inserted into a bitstream and signaled. Alternatively, N and M are preset in the encoder and the decoder.

The weights vary according to at least one of the size of the current block, the shape of the current block, and the sample position within the current block. The weights are determined on the basis of at least one coding parameter of the coding parameters of the current block and the neighboring blocks. For example, the weights are {½, ½}, {¾, ¼}, {⅛, ⅞}, {⅜, ⅝}, or the like.

Alternatively, the weights are determined according to the sample values of the neighboring blocks.

For example, by comparing the difference between the value of the reference sample TL and the value of the reference sample TR (the difference between the reference sample values arranged in the horizontal direction) and the difference between the value of the reference sample TL and the value of the reference sample BL (the difference between the reference sample values arranged in the vertical direction), a relatively large weight is applied to a one-dimensional prediction block with a smaller difference. Where at least one of the top reference samples can be used instead of the same TR. Alternatively, at least one of the left reference samples can be used instead of the sample BL. For example, when the difference between the sample values arranged in the vertical direction is smaller than the difference between sample values arranged in the horizontal direction, a relatively large weight is applied to the one-dimensional vertical prediction block.

Conversely, when the difference between the sample values arranged in the vertical direction is smaller than the difference between the sample values arranged in the horizontal direction, a relatively small weight is applied to the one-dimensional vertical prediction block.

Alternatively, the weights are determined according to the intra-picture prediction mode of the neighboring block.

For example, an intra-picture prediction block is generated by comparing the difference between the intra-picture prediction mode of the block to which the sample TL belongs and the intra-picture prediction mode of the block to which the sample TR belongs (i.e., the difference between the intra-picture prediction modes of the samples arranged in the horizontal direction) and the difference between the intra-picture prediction mode of the block to which the sample TL belongs and the intra-picture prediction mode of the block to which the sample BL belongs (i.e., the difference between the intra-picture prediction modes of the samples arranged in the vertical direction), and by applying a larger weight to a one-dimensional intra-picture prediction block with a smaller difference. Here, at least one of the top reference samples can be used instead of the sample TR. Alternatively, at least one of the left reference samples can be used instead of the sample BL. For example, when the difference between the sample values arranged in the vertical direction is smaller than the difference between sample values arranged in the horizontal direction, a relatively large weight is applied to the one-dimensional vertical prediction block.

Alternatively, when the difference between the sample values arranged in the vertical direction is smaller than the difference between the sample values arranged in the horizontal direction, a relatively small weight is applied to the one-dimensional vertical prediction block.

As another exemplary method of determining the weights for calculation of a weighted sum, a one-dimensional prediction block having the most similar direction to the direction of an intra-picture prediction mode (which is at least one of the vertical mode, the horizontal mode, one of the non-directional modes, and any specific direction mode of the directional modes), among an intra-picture prediction mode of the block to which the sample TL belongs, an intra-picture prediction mode of the block to which the sample TR belongs, and an intra-picture prediction mode of the block to which the sample BL belongs, are allocated a relatively large weight. Where at least one of the top reference samples can be used instead of the sample TR. Alternatively, at least one of the left reference samples can be used instead of the sample BL. For example, when the intra-picture prediction mode of the block to which the sample TR belongs and the intra-picture prediction mode of the block to which the sample BL belongs are both vertical modes, a relatively large weight is applied to a one-dimensional vertical prediction block. In addition, at least one of the reference samples of the current block can be used instead the sample TR. Here, the similarity of the direction of the intra-picture prediction mode is determined through comparison with a threshold value. For example, when the direction of the intra-picture prediction mode is smaller than a predetermined threshold, the direction of the intra-picture prediction mode is determined to be similar to a specific direction. Alternatively, when the difference between the direction of the intra-picture prediction mode and a specific direction falls within a predetermined threshold value range, the direction of the intra-picture prediction mode is determined to be similar to the specific direction.

Alternatively, when one of the intra-picture prediction mode (vertical direction) of the block to which the sample TR belongs and the intra-picture prediction mode (horizontal direction) of the block to which the sample BL belongs is a directional mode and the other is a non-directional mode, a relatively large weight is applied to a one-dimensional prediction block corresponding to the directional mode. Here, at least one of the top reference samples can be used instead of the sample TR. Alternatively, at least one of the left reference samples can be used instead of the sample BL. For example, when the intra-picture prediction mode of the block to which the sample TR belongs is DC mode, a relatively large weight is applied to a one-dimensional horizontal prediction block. In addition, at least one of the reference samples of the current block can be used instead the sample TL.

Conversely, a relatively small weight is applied to a one-dimensional prediction block corresponding to the direction of the directional mode.

An intra-picture prediction block is constructed by calculating the weighted sum of an intra-picture prediction block generated using a predetermined non-directional intra-picture prediction mode or a predetermined directional intra-picture prediction mode and a one-dimensional vertical prediction block or a one-dimensional horizontal prediction block. In this case, the weighted sum is calculated in units of at least one of a sample, a sample group, a line, and a block.

In addition, the weighted sum operation is applied to the boundary region of the intra-picture prediction block. In this case, the boundary region includes N columns adjacent to the left reference samples and M rows adjacent to the top reference samples, within the intra-picture prediction block. In this case, each of N and M is zero or a positive integer. N and M have different values or the same value. At least one of N and M is determined depending on at least one of a block shape and a block size. Alternatively, information on N and M is included in a bitstream and signaled. Alternatively, N and M are preset in the encoder and the decoder.

The weights are differently set according to at least one of the intra-picture prediction mode, the size, the shape, and the sample position of the current block.

Information on whether the weighted sum operation is performed is entropy-encoded/entropy-decoded. For example, whether to perform the weighted sum operation is determined according to a criterion that is preset in the encoder and the decoder. For example, whether to perform the weighted sum operation is adaptively determined on the basis of at least one of the coding parameters (i.e., a block size, a block shape, and an intra-picture prediction mode) of at least one of the current block and the neighboring blocks.

In the case of planar mode, boundary filtering is performed on at least one of the left boundary and the top boundary of the prediction block. The boundary filtering is performed on the basis of at least one of the intra-picture prediction mode, the block size, the block shape, the filter coefficient, the filter shape, and the filter tap count.

The boundary filtering is performed on at least one sample included in N columns adjacent to the left reference samples and/or at least one sample included in M rows adjacent to the top reference samples, within the prediction block. In this case, each of N and M is zero or a positive integer. Here, N and M have different values or the same value. At least one of N and M is determined on the basis of at least one of a block size and a block shape. Alternatively, information on N and M is included in a bitstream and signaled. Alternatively, N and M are preset in the decoded and the decoder.

The intra-picture prediction mode indicating at least one of a one-dimensional horizontal prediction block and a one-dimensional vertical prediction block is used as one of the intra-picture prediction mode of the luminance component and the intra-picture prediction mode of the chrominance component. That is, the prediction block of the current block is generated by using at least one of the one-dimensional horizontal prediction block and the one-dimensional vertical prediction block.

As another embodiment, intra-picture prediction is performed using a sample-based weighted sum operation to improve the accuracy of intra-picture prediction in Planar mode. Whether to perform intra-picture prediction with Planar mode using the sample-based weighted sum operation is determined on the basis of at least one of the coding parameters of the current block and the neighboring blocks.

FIG. 15 is a view illustrating a planar mode-based intra-picture prediction process using a sample-based weighted sum operation, according to one embodiment of the present invention.

As illustrated in FIG. 15, an intra-picture prediction block is generated by performing an intra-picture prediction process on a 4×4 current block by using a sample-based weighted sum operation. In FIG. 15, a block demarcated by a bold line represents the current block, and samples located outside the bold line represent reference samples adjacent to the current block. That is, TL, TR, and BL refer to reference samples of the current block. Here, WT, WL, WTR, and WBL represent weights. Each of the sample values within the intra-picture prediction block of the current block is calculated by performing a weighted sum operation on the reference samples adjacent to the current block. The reference samples and weights used in the weighted sum operation are determined according to the sample positions within the current block.

In this case, the weighted sum is calculated in units of at least one of a sample, a sample group, a line, and a block.

In addition, the weighted sum operation is performed on boundary regions of the intra-picture prediction block. In this case, the boundary region includes N columns adjacent to the left reference samples and M rows adjacent to the top reference samples, within the intra-picture prediction block. In this case, each of N and M is zero or a positive integer. In addition, N and M have different values or the same value. At least one of N and M is determined on the basis of at least one of a block size and a block shape. Alternatively, information on N and M is included in a bitstream and signaled. Alternatively, N and M are preset in the encoder/decoder.

The weights are differently set according to at least one of the intra prediction mode, the size, and the shape of the current block and the sample position in the current block.

Alternatively, the weights are determined on the basis of the distance between the samples. In this case, the weights are determined on the basis of at least one coding parameter of the coding parameters of the current block and the neighboring blocks.

In the planar mode, boundary filtering is performed on at least one of the left and top boundaries of the intra-picture prediction block of the current block, depending on an intra-picture prediction mode, a block size, a block shape, a filter coefficient, a filter shape, and a filter tap count.

The boundary filtering is performed on at least one sample included in N columns adjacent to the left reference samples and/or at least one sample included in M rows adjacent to the top reference samples, within the intra-picture prediction block. In this case, each of N and M is zero or a positive integer. In addition, N and M have different values or the same value. At least one of N and M is determined on the basis of at least one of a block size and a block shape. Alternatively, information on N and M is included in a bitstream and signaled. Alternatively, N and M are preset in the encoder/decoder.

In order to improve the prediction accuracy of an intra-picture prediction block that is generated with the planar mode, an offset value is be added to the intra-picture prediction block that is generated with the planar mode. The offset value is added to an intra prediction block that is generated with the planar mode in units of at least one of a sample, a sample group, a line, and a block. Specifically, the offset value is added to the boundary region of the intra-picture prediction block. In this case, the boundary region includes N columns adjacent to the left reference samples and M rows adjacent to the top reference samples, within the intra-picture prediction block. In this case, each of N and M is zero or a positive integer. In addition, N and M have different values or the same value. At least one of N and M is determined on the basis of at least one of a block size and a block shape. Alternatively, information on N and M is included in a bitstream and signaled. Alternatively, N and M are preset in the encoder/decoder.

The offset value is set to a difference value between at least one sample value of the sample values within the intra-picture prediction block that is generated with the planar mode or a statistic value of the sample values and at least one sample value of the sample values of the reference samples adjacent to the current block or a statistic value of the sample values of the reference samples.

For example, the offset value is set to a difference value between the average value of all the samples within an intra-picture prediction block that is generated with the planar mode and the average value of all the reference samples adjacent to the current block.

For example, the offset value is set to a difference value between the average value of the samples located at the top boundary and the left boundary in an intra-picture prediction block that is generated with the planar mode and the average value of the top and left reference samples of the current block. In this case, the offset value is added to the samples located at the top boundary and the left boundary in an intra-picture prediction block that is generated with the planar mode.

For example, the difference between the average value of the top boundary samples within the intra-picture prediction block that is generated with planar mode and the average value of the top reference samples adjacent to the top boundary of the current block is determined as the offset value. In this case, the offset value is added to the samples located at the top boundary within the intra-picture prediction block that is generated with the planar mode.

For example, the difference between the average value of the left boundary samples within the intra-picture prediction block that is generated with the planar mode and the average value of the left reference samples adjacent to the left boundary of the current block is determined as the offset value. In this case, the offset value is added to the samples located at the left boundary within the intra-picture prediction block that is generated with the planar mode.

In the embodiment described above, the average value corresponds to the statistical value, but other various statistical values described above can be used to obtain the offset value.

Whether to add an offset value to the intra-picture prediction block that is generated with the planar mode is determined on the basis of at least one of the coding parameters of the current block and the neighboring blocks. Alternatively, information on whether to add an offset value or on an offset type meaning which offset value is added is included in a bitstream and signaled.

In the planar mode, the boundary filtering is performed on at least one of the left boundary and the top boundary of the intra-picture prediction block of the current block, depending on an intra-picture prediction mode, a block size, a block shape, a filter coefficient, a filter shape, and a filter tap count.

The boundary filtering is performed on at least one sample included in N columns adjacent to the left reference samples and/or at least one sample included in M rows adjacent to the top reference samples, within an intra-picture prediction block. In this case, each of N and M is zero or a positive integer. In addition, N and M have different values or the same value. At least one of N and M is determined on the basis of at least one of a block size and a block shape. Alternatively, information on N and M is included in a bitstream and signaled. Alternatively, N and M are preset in the encoder/decoder.

The embodiment in which an offset value is added to an intra-picture prediction block that is generated with planar mode to improve the prediction accuracy can be applied to any other intra prediction modes. In this case, the planar mode needs to be replaced with a directional mode or DC mode throughout the description regarding the embodiment.

As another example, the planar prediction may be performed using a plurality of reference sample lines. For example, the planar prediction may be performed using a weighted sum of two reference sample lines. As another example, the planar prediction may be performed using a weighted sum of reference samples in the two reference sample lines. In this case, the reference samples selected from the second reference sample line may be samples adjacent to the reference samples selected from the first reference sample line. That is, when the reference sample located at the position (−1, −1) is selected, the reference sample located at the position (−2, −2) may be selected. The planar prediction may be performed by calculating a weighted sum of the selected reference samples, and in this case the same weights as those used for the DC prediction may be used.

A directional prediction mode refers to at least one of a horizontal mode, a vertical mode, and an angular mode having a predetermined angle.

In the horizontal mode or the vertical mode, prediction is performed using one or more reference samples arranged in a linear direction, i.e., in the horizontal direction or the vertical direction. A plurality of reference sample lines may be used. For example, when two reference sample lines are used, prediction may be performed using two reference samples arranged in a horizontal line or a vertical line. Similarly, when N reference sample lines are used, N reference samples in a horizontal line or a vertical line may be used.

For the vertical mode, the statistics of a first reference sample (e.g., r[x, −1]) on a first reference sample line and a second reference sample (e.g., r[x, −2]) on a second reference sample line may be used to perform the directional prediction.

For example, the predicted value of the vertical mode can be determined by calculating the result value of (3×r[x, −1]+r[x, −2]+2)>>2. Alternatively, the predicted value of the vertical mode can be determined by calculating the result value of (3×r[x, −1]−r[x, −2]+1)>>1. In yet another alternative, the predicted value of the vertical mode can be determined by calculating the value of (r[x, −1]+r[x, −2]+1)>>1.

For example, the change between each of the sample values on the vertical line may be considered. For example, the predicted value of the vertical mode can be determined by calculating the result value of (r[x, −1]+ (r[x, −1]−r[x, −2])>>1). In this case, N may be an integer equal to or greater than 1. As N, a fixed value may be used. Alternatively, N may increase with an increase in the y coordinate of a prediction target sample. For example, N=y+1.

Even for the horizontal mode, one or more methods used for the vertical mode can be used.

For an angular mode of a certain angle, prediction may be performed using one or more reference samples arranged in an oblique direction from an intra prediction target sample of the current block, or one or more samples neighboring the reference samples located in the oblique direction. In this case, a total of N reference samples may be used, wherein N may be 2, 3, 4, 5, or 6. It is also possible to perform prediction by applying at least one of an N-tap filter to the N reference samples. Examples of the N-tap filter include a 2-tap filter, a 3-tap filter, a 4-tap filter, a 5-tap filter, and a 6-tap filter. At this time, at least one of the reference samples may be located above the current block and the rest may be located to the left of the current block. The reference samples located above the current block (or the reference samples located to the left of the current block) may be located in the same line or in different lines.

According to another embodiment, intra prediction may be performed based on position information. In this case, the position information may be encoded/decoded, and a reconstructed sample block located at the position described above may be derived as an intra predicted block of the current block. Alternatively, a block similar to the current block may be searched for by the decoder, and the found block may be derived as the intra predicted block of the current block. The searching for a similar block may be performed in an encoder or a decoder. The range (search range) in which the search is performed may be limited to a predetermined range. For example, the search range may be limited to reconstructed sample blocks within a picture in which the current block is included. Alternatively, the search range may be limited to a CTU in which the current block is included or to a predetermined CU. That is, location information-based intra prediction may be performed by searching for a block similar to the current block among reconstructed samples within a CTU. The searching may be performed using a template. For example, one or more reconstructed samples adjacent to the current block are taken as a template, and a CTU is searched for samples similar to the template.

The location information-based intra prediction may be performed when the CTU consists of only intra coding modes or when the luminance block and the chrominance block have different partition structures. For example, for an inter prediction available slice (e.g., P or B slice), information indicating that the current CTU consists of only intra coding modes may be signaled. In this case, when the information indicates that a current CTU consists of only intra coding modes, the location information-based intra prediction may be performed. Alternatively, when the luminance block and the chrominance block in the current CTU have different partition structures (for example, when dual_tree or separate_tree is a value of 1), the location information-based intra prediction may be available. On the other hand, when a CTU includes intra coding blocks and inter coding blocks or when the luminance block and the chrominance block have the same partition structure, location information-based intra prediction may not be available.

According to a further embodiment, inter color component intra prediction is performed. For example, it is possible to intra-predict chroma components from the corresponding reconstructed luma component of the current block. Alternatively, it is possible to intra-predict one chroma component Cr from the corresponding reconstructed chroma component Cb of the current block.

An inter color component intra prediction includes a color component block restructuring step, a prediction parameter deriving step, and/or an inter color component prediction execution step. The term 'color component' may refer to at least any one of a luma signal, a chroma signal, Red, Green, Blue, Y, Cb, and Cr. A prediction of a first color component can be performed by using at least any one of a second color component, a third color component, and a fourth color component. The signals of the color components used for the prediction may include at least any one of an original signal, a reconstructed signal, a residual signal, and a prediction signal.

When performing an intra prediction for a second color component target block, a sample of a first color component block corresponding block that corresponds to the second color component target block, a sample of a neighbor block of the first color component corresponding block, or both of the samples may be used. For example, when performing an intra prediction for a chroma component block Cb or Cr, a reconstructed luma component block Y corresponding to the chroma component block Cb or Cr may be used.

When predicting the chroma components on the basis of the luma component, the prediction may be performed according to Equation 8.

$$\mathrm{Pred}_C(i,j) = \alpha \cdot rec_L'(i,j) + \beta \quad \text{[Equation 8]}$$

In Equation 8, $\mathrm{Pred}_C(i, j)$ represents a predicted chroma sample of the current block, and $rec_L(i, j)$ represents a reconstructed luma sample of the current block. At this time, $rec_L'(i, j)$ may be a down-sampled reconstructed luma sample. Parameters $\alpha$ and $\beta$ may be derived by minimizing a regression error between the reconstructed neighboring luma sample and the reconstructed neighboring chroma sample around the current block.

There are two modes for predicting the chroma components using the luma component. The two modes may include a single-model mode and a multiple-model mode. The single-model mode may use one linear model when predicting the chroma components from the luma components for the current block. The multiple-model mode may use two linear models.

In the multiple-model mode, the samples adjacent to the current block (that is, adjacent luma samples and adjacent chroma samples) may be classified into two groups. That is, the parameters $\alpha$ and $\beta$ for each of the two groups may be derived. Further, the luma samples of the current block may be classified according to the rules used for classification of the luma samples adjacent to the current block.

Figure 16:
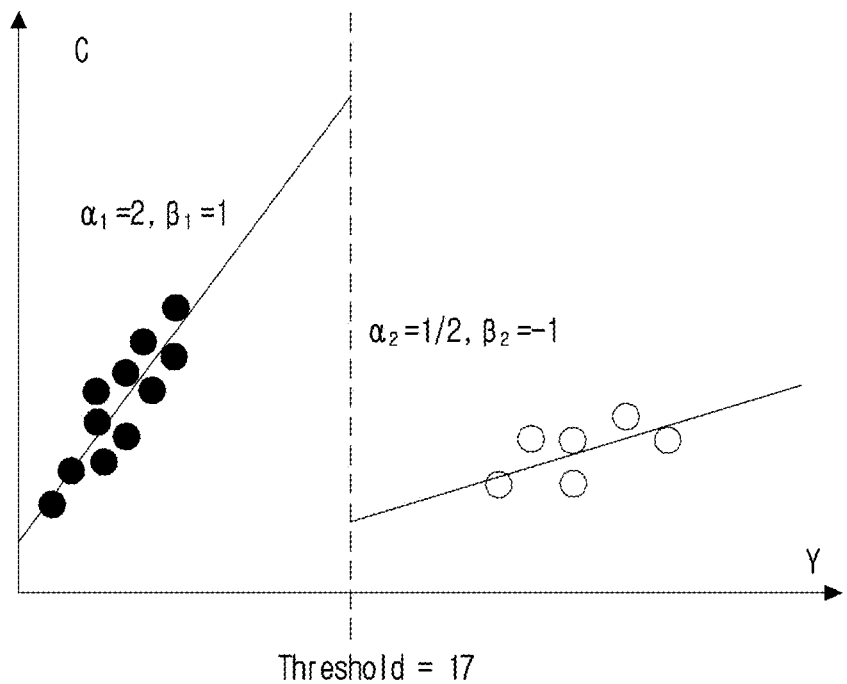
FIG. 16 is a view for explaining an embodiment classifying adjacent samples into two groups.

FIG. 16 is a view for explaining an embodiment classifying adjacent samples into two groups.

In FIG. 16, for example, a threshold value for classifying the adjacent samples into two groups may be calculated. The threshold value may be calculated using an average value of the reconstructed adjacent luma samples. However, the calculation of the threshold value is not limited thereto. At least one of various statistical values recognized in the present specification may be used instead of the average value. When the values of the adjacent samples are larger than the threshold value, the adjacent samples may be classified into a first group. Otherwise, the adjacent samples may be classified into a second group. For example, predicted chroma sample (PredC[x, y]) may be derived by Equation 9 below according to whether neighboring luma sample (Rec'L[x, y]) is greater than Threshold or not.

$$\mathrm{Pred}_C[x,y] = \alpha_1 \times Rec'_L[x,y] + \beta_1, \text{ if } Rec'_L[x,y] \leq \text{Threshold}$$

$$\mathrm{Pred}_C[x,y] = \alpha_2 \times Rec'L[x,y] + \beta_2, \text{ if } Rec'_L[x,y] > \text{Threshold} \quad \text{[Equation 9]}$$

Although it is described that the multiple-model mode uses two linear modes in the embodiment described above, the present invention is not limited thereto, and may cover other cases in which two or more linear models are used. When N linear models are used, samples may be classified into N groups. To do so, N−1 threshold values may be calculated.

As described above, when predicting a chroma component from a luma component, a linear model can be used. In this case, the linear model may include a simple linear model (hereinafter referred to as "LM1"), a complex linear model (hereinafter referred to as "LM2"), and a complex filter linear model (hereinafter, referred to as "LM3"). Parameters of the models described above may be derived by minimizing regression error between the reconstructed luma samples around the current block and the corresponding reconstructed chroma samples around the current block.

Figure 17:
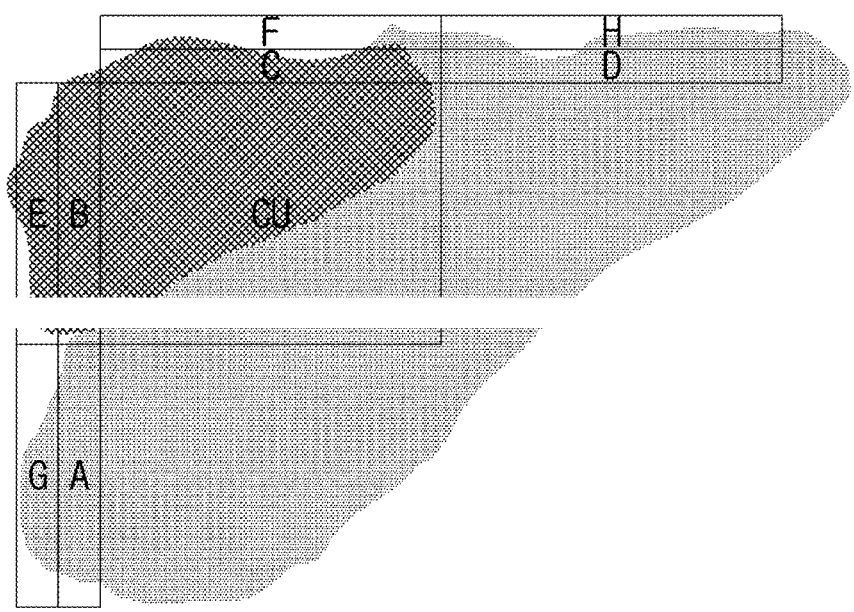
FIG. 17 is a diagram for describing neighboring samples of a current block used to derive the parameters of the models.

FIG. 17 is a diagram for describing "neighboring samples of a current block" (hereinafter referred to as "adjacent data set") used to derive the parameters of the models.

The adjacent data set for deriving the parameters of the LM1 may be composed of a pair of samples comprising a luma sample and a chroma sample in each of a line area B and a line area C illustrated in FIG. 17. The adjacent data set for deriving the parameters of the LM2 and LM3 may be composed of a pair of samples comprising a luma sample and chroma sample in each of a line area B, a line area C, a line area E, and a line area F illustrated in FIG. 17.

However, the adjacent data set is not limited to the examples described above. For example, to cover various linear relationships between luma and chroma samples in the current block, N adjacent data sets may be used for each mode. For example, N may be an integer of 2 or more, and specifically 3.

A plurality of adjacent data sets may be, for example, at least one among T0={B, C}, T1={B, C, E, F}, T2={A, B, C, D}, T3={C, D, F, H} and T4={A, B, E, G}. For example, T0 may be used as an adjacent data set for LM1. Also, T1 or T2 may be used as an adjacent data set for LM2 or LM3.

As another embodiment of LM1, final predicted chroma sample P(x, y) may be generated by combination (for example, a statistical value) of linear predicted sample $P_0$(x, y) and linear predicted sample $P_1$(x, y), obtained by predicting in a DC, Planar or directional mode. For example, following Equation 10 below may be used.

$$P(x,y)=(P_0(x,y)+P_1(x,y))/2 \quad \text{[Equation 10]}$$

An another embodiment, LM1 and/or LM2 may be used in a directional linear prediction. In case the current chroma block is encoded in a directional linear mode, a flag indicating a corresponding mode among LM1 and LM2 may be signaled.

The parameters of the linear model may be calculated using both an upper template and a left template. Alternatively, there are two LM modes (an LM_A mode and an LM_L mode), and the upper template and the left template may be used in the LM_A mode and the LM_L mode, respectively. That is, in the LM_A mode, the linear model parameters may be obtained using only the upper template (or upper reconstructed sample). When the position of the upper left corner sample of the current block is (0, 0), the upper template may be extended to a range from (0, −n) to (W+H−1, −n) or (2×W−1, −n). That is, the upper template may be configured with samples corresponding to two times for a size of width of the current block. In this case, n is an integer equal to or greater than 1. That is, in the LM_L mode, the linear model parameters may be obtained using only the left template (or left reconstructed sample). The left template may be extended to a range from (−n, 0) to (−n, H+W−1) or (−n, 2×H−1). That is, the left template may be configured with samples corresponding to two times for a size of height of the current block. In this case, n is an integer equal to or greater than 1. Here, W and H may mean sizes of width and length of the current block, respectively.

A power of two numbers of samples can be used to derive the parameters of the linear model. When the current chroma block is a non-square block, the samples used to derive the parameters of the linear model may be determined based on the number of samples on a shorter side, among the horizontal side and the vertical side of the current block. According to one embodiment, when the size of the current block is n×m (where n>m), m samples of the n adjacent samples adjacent to the top boundary of the current block may be selected, for example, by performing sub-sampling uniformly. In this case, the number of samples used to derive the parameters of the linear model may be 2 m. As another example, when the size of the current block is n×m (where n>m), m samples of the n adjacent samples adjacent to the top boundary of the current block may not be used. For example, of the n samples, m samples that are farthest from the shorter one of the horizontal side and the vertical side of the current block may not be used. In this case, the number of samples used to derive the parameters of the linear model may be n (n-m samples adjacent to the top boundary of the current block+m samples adjacent to the left boundary of the current block).

Alternatively, when the current block is a non-square block, a certain number (for example, n−W−H) of additional samples are extracted from some of the samples which are selected at a predetermined interval. Here, n refers to the number of reference samples used to compute the prediction parameters of a linear model. Here, n is the smallest integer not less than W+H and has the value of the power of two.

As described above, the number of samples required to derive the prediction parameter is the power of two.

FIG. 18 is a diagram illustrating exemplary reference samples used to derive prediction parameters when the current block is a non-square block.

According to one embodiment, when the current block is a non-square block, as illustrated in (a) of FIG. 18, neighboring reference samples located along the longer side of a current block are subsampled at regular intervals so that the number of the resulting neighboring sub-samples is equal to the number of neighboring reference samples located along the shorter side of the current block.

According to another embodiment, as illustrated in (b) of FIG. 18, among neighboring reference samples located along the longer side of the current block, a reference neighboring sample farthest from the shorter side is not used. Among the neighboring reference samples located along the longer side of the current block, the number of unused neighboring reference samples is the same as the number of neighboring reference samples located along the shorter side of the current block.

That is, by using the embodiment described with reference to FIG. 18, it is possible to produce a certain number (for example, the power of two) of reference samples needed to derive the prediction parameters.

The encoder transmits information on whether a linear model is applied. The information on whether a linear model is applied is transmitted as data included in a sequence parameter set (SPS). When a linear model is applied, the encoder transmits information on whether at least one of the LM_A mode and the LM_L mode is applied on a per chroma block basis. When at least one of the LM_A mode and the LM_L mode is applied, the encoder transmits information indicating one of the two modes. The information is transmitted as index information listed in a lookup table. The lookup table is used to derive the intra prediction mode of a chrominance block. The lookup table includes not only information on the LM_A mode and the LM_L mode but also information on the LM mode using both a top template and a left template.

When the LM_A mode or the LM_L mode is signaled, a bin string having a longer length than a cross component linear model (CCLM) mode that calculates the parameters of a linear model using both the top template and the left template is allocated.

For example, when the intra-picture prediction mode of the chrominance block is a CCLM mode for calculating the parameters of a linear model using both the top template and the left template, entropy-encoding/entropy-decoding is performed using M bins.

For example, when the intra-picture prediction mode of the chrominance block is the LM_A mode or the LM_L mode, entropy-encoding/entropy-decoding is performed using N bins.

Here, M is less than or equal to N, and is a positive integer. For example, M is 1 or 2, and N is 3 or 4.

In addition, a flag indicating the CCLM mode that calculates the prediction parameters of a linear using both the top template and the left template is entropy-encoded/entropy-decoded. When the flag has a predetermined value, an additional flag or an index indicating the LM_A mode or the LM_L mode is entropy-encoded/entropy-decoded.

In another embodiment regarding an inter-color intra-picture prediction operation, a left linear model mode, a top linear model mode, a CbCr linear model mode, or a fusion linear model mode is used.

The left linear model mode, the top linear model mode, and the CbCr linear model mode are methods of deriving the prediction parameters of the inter-color linear model.

In the case of the left linear model mode, the prediction parameters of the linear model between the reconstructed neighboring luminance component and the reconstructed neighboring chrominance component Cb are determined using reconstructed samples included in two left-hand columns adjacent to the current block.

In the case of the top linear model mode, the prediction parameters of the linear model between the reconstructed neighboring luminance component and the reconstructed neighboring chrominance component Cb are determined using reconstructed samples included in two top columns adjacent to the current block.

The left linear model mode and the top linear model mode are implicitly used when the reconstructed top neighboring samples or the reconstructed left neighboring samples are not available.

For the CbCr linear model mode, two linear models are derived. One of the two linear models is a linear model between the reconstructed luminance component and the reconstructed chrominance component Cb and the other is a linear model between the reconstructed Cb component and the reconstructed Cr component.

The fusion linear model mode is a combination of prediction using a linear model and prediction using other mode. This is a prediction mode in which prediction is performed by using a weighted sum of an intra-picture prediction block generated based on a linear model and an intra-picture prediction block generated based on another model. The another mode is any one of a derived mode (DM) mode, a DC mode, a planar mode, a vertical mode, a horizontal mode, and a directional mode.

Alternatively, when performing an intra prediction for a chroma component block Cr, a chroma component block Cb may be used. Alternatively, when performing an intra prediction for a fourth color component block, at least one of a first color component block, a second color component block, and a third color component, all of which correspond to the fourth color component block, may be used.

Whether or not to perform an inter color component intra prediction may be determined based on at least any one of the size and the shape of a current target block. For example, when the size of the target block is equal to that of a coding tree unit (CTU), larger than a predetermined size, or within a predetermined size range, the inter color component intra prediction for the target block can be performed. Alternatively, when the shape of the target block is a predetermined shape, the inter color component intra prediction for the target block can be performed. The predetermined shape may be a square shape. In this case, when the target block has an oblong shape, the inter color component intra prediction for the target block may not be performed. Meanwhile, when the predetermined shape is an oblong shape, the embodiment described above inversely operates.

Alternatively, whether or not to perform an inter color component intra prediction for a prediction target block may be determined based on a coding parameter of at least any one block selected from among a corresponding block corresponding to the prediction target block and neighbor blocks of the corresponding block. For example, when the corresponding block has been predicted through an intra prediction method in a constrained intra prediction (CIP) environment, an inter color component intra prediction for the prediction target block may not be performed. Alternatively, when the intra prediction mode of the corresponding block is a predetermined mode, an inter color component intra prediction for the prediction target block can be performed. Further alternatively, whether or not to perform an inter color component intra prediction may be determined on the basis of at least any one of CBF information of the corresponding block and CBF information of the neighbor blocks thereof. The coding parameter is not limited to a prediction mode of a block but various parameters that can be used for encoding/decoding may be used.

The color component block restructuring step will be described below.

When predicting a second color component block by using a first color component block, the first color component block may be restructured. For example, when an image has an YCbCr color space and when a sampling ratio of color components is one of 4:4:4, 4:2:2, and 4:2:0, the block sizes of color components may differ from each other. Therefore, when predicting a second color component block using a first color component block having a different size from the second color component block, the first color component block may be restructured such that the block sizes of the first color component and the second color component are equalized. The restructured block may include at least any one of a sample in the first color component block that is a corresponding block and a sample in a neighbor block of the first color component block.

FIG. 19 is an exemplary diagram illustrating a process of restructuring a color component block.

In FIG. 19(a), p1[x, y] represents a sample at a position (x, y) in the first color component block. In FIG. 19(b), p1'[x, y] represents a sample at a position (x, y) in the restructured block that is produced by restructuring the first color component block.

When the first color component block has a larger size than the second color component block, the first color component block is down-sampled to have a size equal to that of the second color component block. The down-sampling may be performed by applying an N-tap filter to one or more samples (N is an integer equal to or larger than 1). For the down-sampling, at least any one equation of Equation 11 to Equation 15 may be used. In the case in which any one down-sampling method among various down-sampling methods is selectively used, an encoder may select one down-sampling method as a predetermined down-sampling method. For example, the encoder may select a down-sampling method having optimal effects. The selected down-sampling method is encoded and signaled to a decoder. The signaled information may be index information indicating the down-sampling method.

$$p1'[x,y]=(p1[2x,2y]+p1[2x,2y+1]+1)\gg1 \qquad \text{[Equation 11]}$$

$$p1'[x,y]=(p1[2x+1,2y]+p1[2x+1,2y+1]+1)\gg1 \qquad \text{[Equation 12]}$$

$$p1'[x,y]=(p1[2x-1,2y]+2\times p1[2x,2y]+p1[2x+1,2y]+2)\gg2 \qquad \text{[Equation 13]}$$

$$p1'[x,y]=(p1[2x-1,2y+1]+2*p1[2x,2y+1]+p1[2x+1,2y+1]+2)\gg2 \qquad \text{[Equation 14]}$$

$$p1'[x,y]=(p1[2x-1,2y]+2*p1[2x,2y]+p1[2x+1,2y]+p1[2x-1,2y+1]+2*p1[2x,2y+1]+p1[2x+1,2y-1]+4)\gg3 \qquad \text{[Equation 15]}$$

The down-sampling method performed with respect to two or more samples is not limited to any one of the examples of Equation 11 to Equation 15. For example, two or more samples used to calculate a down-sampled value p1'[x, y] may be selected from a sample group consisting of a sample p1[2x, 2y] and neighbor samples thereof. The neighbor samples may be ones selected among p1[2x−1, 2y−1], p[2x−1, 2y], p1[2x−1, 2y+1], p1[2x, 2y−1], p1[2x, 2y+1], p1[2x+1, 2y−1], p1[2x+1, 2y], and p1[2x+1, 2y+1]. The down-sampling can be performed by calculating the average or the weighted average of two or more samples.

Alternatively, the down-sampling may be performed in a manner of selecting a specific sample among one or more samples. In this case, at least any one of the following equations, Equation 16 to Equation 19, may be used for the down-sampling.

$$p1'[x,y]=p1[2x,2y] \qquad [\text{Equation 16}]$$

$$p1'[x,y]=p1[2x,2y+1] \qquad [\text{Equation 17}]$$

$$p1'[x,y]=p1[2x+1,2y] \qquad [\text{Equation 18}]$$

$$p1'[x,y]=p1[2x+1,2y+1] \qquad [\text{Equation 19}]$$

When the first color component block has a smaller size than the second color component block, the first color component block is up-sampled to be restructured such that the sizes of the first color component block and the second color component block are equalized.

In this case, the up-scaling is performed according to Equation 20.

$$p1'[2x,2y]=p1[x,y],$$

$$p1'[2x+1,2y]=(p1[x,y]+p1[x+1,y]+1)\gg 1,$$

$$p1'[2x,2y+1]=(p1[x,y]+p1[x,y+1]+1)\gg 1,$$

$$p1'[2x+1,2y+1]=(p1[x+1,y]+p1[x,y+1]+1)\gg 1 \qquad [\text{Equation 20}]$$

In the restructuring process, a filter may be applied to one or more samples. For example, the filter may be applied to one or more samples included in at least any one of the first color component block (i.e. corresponding block), neighbor blocks of the corresponding block, the second color component block (i.e. target block), and neighbor blocks of the target block.

In the reference sample restructuring step described above, an indicator corresponding to a predetermined reference sample line among a plurality of reference sample lines may be signaled. In this case, in the restructuring process, the restructuring is performed using the predetermined reference sample line corresponding to the signaled indicator. For example, when the indicator mrl_index has a value of 0, the reconstruction process is performed using the first and second reference sample lines adjacent to a first color component corresponding block. Alternatively, when the indicator mrl_index has a value of 1, the reconstruction process is performed using the second and third reference sample lines adjacent to the first color component corresponding block. Alternatively, when the indicator mrl_index has a value of 3, the reconstruction process is performed using the third and fourth reference sample lines adjacent to the first color component corresponding block. A reference sample line indicated by the indicator mrl_index may be used for a second color component target block.

In the restructuring process, when a boundary of the second color component block (target block) or a boundary of the first color component block (corresponding block) is a boundary of a predetermined region, the reference samples used for the restructuring may be differently selected. In this case, the number of reference sample lines at the upper side may differ from the number of reference sample lines at the left side. The predetermined region may be at least any one of a picture, a slice, a tile group, a tile, a CTU, and a CU.

For example, when the upper boundary of the first color component corresponding block is the boundary of the predetermined region, the reference samples at the upper side may not be used for the restructuring but only the reference samples at the left side may be used for the restructuring. When the left boundary of the first color component corresponding block is the boundary of the predetermined region, the reference samples at the left side may not be used for the restructuring but only the reference samples at the upper side may be used for the restructuring. Alternatively, both of N reference sample lines at the upper side and M reference sample lines at the left side may be used for the restructuring, in which N may be smaller than M. For example, when the upper boundary corresponds to the boundary of the predetermined region, N may be 1. Meanwhile, when the left boundary corresponds to the boundary of the predetermined region, M may be 1.

Alternatively, the restructuring may be performed by using N reference sample lines at the upper side and M reference left sample lines at the left side of the first color component corresponding block, regardless of whether the boundary of the predetermined region is the upper boundary or the left boundary of the first color component block.

FIG. 20 is a diagram illustrating an embodiment performing restructuring by using a plurality of upper-side reference sample lines and/or a plurality of left-side reference sample lines.

As illustrated in FIG. 20(*a*), the restructuring may be performed using four upper-side reference sample lines and four left-side reference sample lines.

For example, when the upper boundary or the left boundary of the first color component corresponding block is the boundary of the predetermined region, the number of the upper-side reference sample lines and the number of the left-side reference sample lines used for the restructuring may differ from each other. For example, as illustrated in FIGS. 20(*b*) to 20(*d*), any of the following combinations may be used for the restructuring: two upper-side reference sample lines and four left-side reference sample lines: one upper-side reference sample line and three left-side reference sample lines; and one upper-side reference sample line and two left-side reference sample lines.

The number of reference sample lines used for the restructuring is not limited to the above combinations. That is, N upper-side reference samples lines and M left-side reference sample lines may be used in which N and M are equal to or different from each other. When both of the upper boundary and the left boundary of the corresponding block correspond to the boundary of the predetermined region, N and M may be equal to each other. That is, N and M may be both 1. Alternatively, N may be set smaller than M under the same condition. This is because more resources (memory) are required for the upper-side reference sample lines than for the left-side reference sample lines.

Alternatively, as illustrated in FIG. 20(*e*), one or more reference samples within a region having a vertical length and a horizontal length not larger than those of the first color component corresponding block may be used for the restructuring.

When performing the restructuring process, the reference samples of the first color component corresponding block may be differently set depending on any one of the block size, the block shape, and the coding parameter of at least any one block selected among the first color component corresponding block, neighbor blocks thereof, the second color component target block, and neighbor blocks thereof.

For example, among samples in the first color component corresponding block and the neighbor blocks thereof, samples in blocks whose encoding mode is an inter frame encoding mode are not used but only samples in blocks whose encoding mode is an intra encoding mode are used for the restructuring.

FIG. 21 is an exemplary diagram illustrating reference samples used for the restructuring in accordance with an intra prediction mode or a coding parameter of a corresponding block.

The restructuring of the reference samples of the first color component block may be differently performed in accordance with the intra prediction modes of the first color component corresponding block. For example, when the intra prediction mode of the corresponding block is a non-angular mode, such as a DC mode and a planar mode, or an angular mode in which both of the upper-side reference samples and the left-side reference samples are used, as illustrated in FIG. 21(a), at least one sample group of the upper-side reference samples and the left-side reference samples is used for the restructuring. Alternatively, when the intra prediction mode of the corresponding block is an angular mode in which both of the upper-side reference samples and the left-side reference samples of the corresponding block are used, as illustrated in FIG. 21(b), the restructuring of the corresponding block is performed using at least one sample group of the upper-side reference samples and the left-side reference samples. Alternatively, when the intra prediction mode of the corresponding block is an angular mode in which both of the left-side reference samples and the upper-side reference samples are used, as illustrated in FIG. 21(c), the corresponding block may be restructured using at least any one sample group of the left-side reference samples and the lower left-side reference samples.

Alternatively, the reference samples used to restructure the first color component corresponding block are differently selected in accordance with the quantization parameter of at least any one of the first color component corresponding block and the neighbor blocks thereof. For example, as illustrated in FIG. 21(d), reference samples in an upper block that is disposed at the upper side of the corresponding block and whose neighbor blocks have a relatively small quantization parameter value QP are used for the restructuring of the corresponding block.

Alternatively, when the second color component target block has an oblong shape, reference samples disposed around a first color component corresponding block having a square shape are used for the restructuring.

Alternatively, when the second color component target block is partitioned into two sub-blocks (for example, two 16×8-size sub-blocks) and when the first color component corresponding block is a 32×16-size block, reference samples disposed around a 32×32-size block are used for the restructuring of the corresponding block. In this case, as reference samples of the first color component block corresponding to a second 16×8-size sub-block disposed at a lower side among the partitioned two sub-blocks of the second color component corresponding block, reference samples around a restructured 32×32-size block may be shared.

Hereinbelow, the prediction parameter deriving step will be described.

A prediction parameter can be derived using at least any one of reference samples of the restructured first color component corresponding block and reference samples of the second color component prediction target block. Hereinafter, the terms 'first color component' and 'first color component block' may respectively refer to a restructured first color component and a restructured first color component block.

Figure 22:
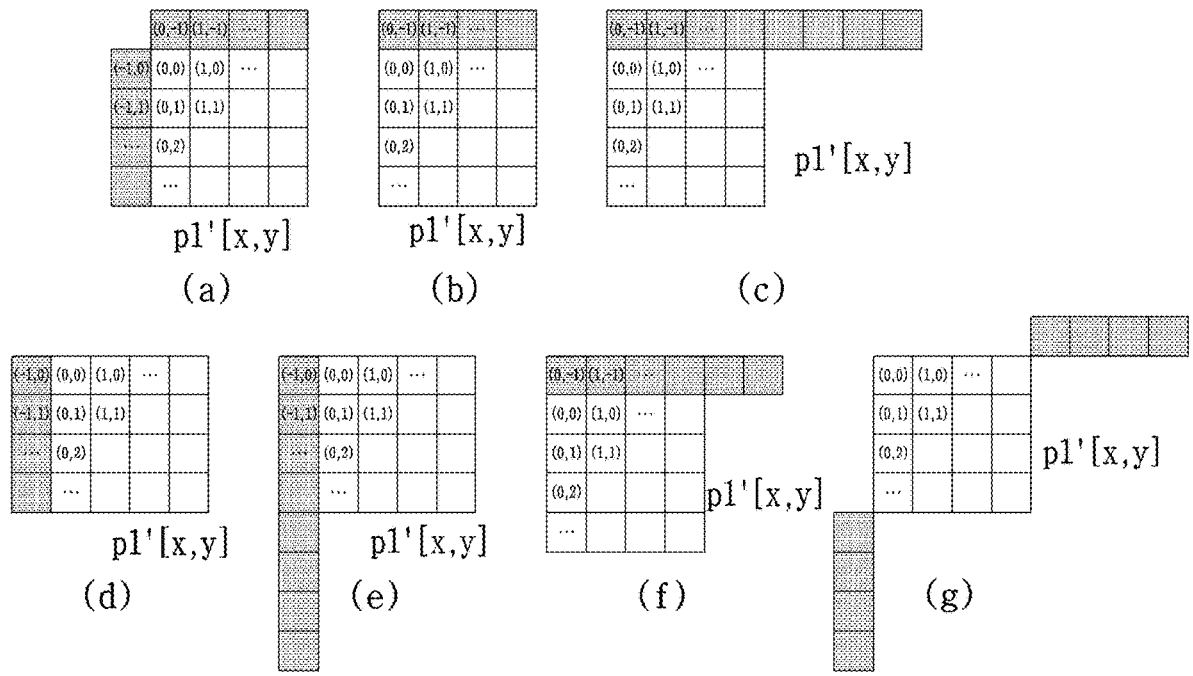
FIG. 22 is a diagram illustrating an exemplary restructured first color component corresponding block when a second color component prediction target block is a 4×4 block.

FIG. 22 is a diagram illustrating an exemplary restructured first color component corresponding block when a second color component prediction target block is a 4×4 block. In this case, the number of reference sample lines may be N.

The prediction parameter may be derived using reference samples disposed at the upper side and the left side of the restructured first color component corresponding block or of the second color component prediction target block as illustrated in the FIG. 22(a). For example, the prediction parameter can be derived by adaptively using the reference samples of the restructured first color component, on the basis of the intra prediction mode of the first color component corresponding block. In this case, the reference samples of the second color component can be adaptively used on the basis of the intra prediction mode of the first color component corresponding block.

When the intra prediction mode of the first color component corresponding block is a non-angular mode such as a DC mode or a planar mode, or an angular mode in which both of upper-side reference samples and left-side reference samples are used, reference samples at the upper side and the left side of the first color component corresponding block can be used as illustrated in FIG. 22(a).

When the intra prediction mode of the first color component corresponding block is a non-angular mode in which upper-side reference samples are used, reference samples at the upper side of the first color component corresponding block may be used as illustrated in FIG. 22(b) or 22(c).

When the intra prediction mode of the first color component corresponding block is an angular mode in which left side reference samples are used, reference samples at the left side of the first color component corresponding block may be used as illustrated in FIG. 22(d) or 22(e).

Alternatively, when the intra prediction mode of the first color component corresponding block is an angular mode, reference samples used in each prediction mode can be used as reference samples of the first color component. For example, when the intra prediction mode is a vertical mode, reference samples illustrated in FIG. 22(b) may be used. When the intra prediction mode is a horizontal mode, reference samples illustrated in FIG. 22(d) may be used. When the intra prediction mode is an up-right diagonal mode, reference samples illustrated in FIG. 22(c) may be used. When the intra prediction mode is a down-left diagonal mode, reference samples illustrated in FIG. 22(e) may be used. When the intra prediction mode is a mode between the vertical mode and the up-right diagonal mode, reference samples illustrated in FIG. 22(f) may be used. When the intra prediction mode is an angular mode of a 45° diagonal direction, upper right reference samples, lower left reference samples, or both are used as illustrated in FIG. 22(g). Reference samples that are differently selected for each intra prediction mode are stored in a format of a look-up table so as to be conveniently used.

The prediction parameter may be derived by adaptively using the reference samples of the first color component or the second color component in accordance with the size and/or the shape of the first color component block and/or the second color component block.

For example, when the second color component target block has a 64×64 size, 32, 16, or 8 reference samples among reference samples at the upper side or the left side of the first color component block or the second color component block may be used. As described above, when the size of the second color component target block is a predetermined size, the reference samples of the first or second color component block may be adaptively used. The predetermined size is not limited to the 64×64 size, but it may be a size signaled through a bitstream or a size derived on the basis of the coding parameter of a current block or a neighbor block thereof.

Alternatively, when the second color component target block has an oblong shape, reference samples adjacent to a longer side, which is a vertical side or a horizontal side, of the second color component target block may be used. For example, when the target block has a block size of 32×8, reference samples at the upper side of the first color component or the second color component block may be used.

Alternatively, when the second color component target block has an oblong shape, reference samples around a square block can be used. For example, when the target block is a 32×8 block, reference samples around a 32×32 block can be used.

The prediction parameter can be derived using reference samples around the restructured first color component block and reference samples around the second color component block. The prediction parameter can be derived on the basis of any one of the factors including a correlation, a change, an average value, and a distribution of color components. In this case, any one of the methods of Least Squares (LS), Least Mean Squares (LMS), etc. may be used.

When deriving the prediction parameters through the LMS method, the prediction parameters may be a and b, α and β, or both. Prediction parameters that can minimize an error between the reference samples of the first color component and the reference samples of the second color component can be derived by Equation 21.

$$E(a, b) = \sum_{n=0}^{N-1} (p2_n - (a \cdot p1'_n + b))^2 \quad \text{[Equation 21]}$$

In Equation 21, $p2_n$ represents a reference sample of the second color component, and $p1'_n$ represents a reference sample of the restructured first color component. N is the number of used reference samples arranged in a vertical direction or a horizontal direction, and a and b represent prediction parameters.

In this case, a correlation between the reference samples can be calculated by Equation 22.

$$k = \text{Max}(0, BitDepth + \log 2(N) - 15) \quad \text{[Equation 22]}$$

$$L = \left( \sum_{y=0}^{N-1} p1'[-1, y] + \sum_{x=0}^{N-1} p1'[x, -1] \right) \gg k$$

$$C = \left( \sum_{y=0}^{N-1} p2[-1, y] + \sum_{x=0}^{N-1} p2[x, -1] \right) \gg k$$

$$LL = \left( \sum_{y=0}^{N-1} p1'[-1, y]2 + \sum_{x=0}^{N-1} p1'[x, -1]2 \right) \gg k$$

-continued
$$LC = \left( \sum_{y=0}^{N-1} p1'[-1, y] \times p2[-1, y] + \sum_{x=0}^{N-1} p1'[x, -1] \times p2[x, -1] \right) \gg k$$

In Equation 22, BitDepth represents a bit depth. p1' represent a sample of the restructured first color component, and p2 represents a sample of the second color component.

Figure 23:
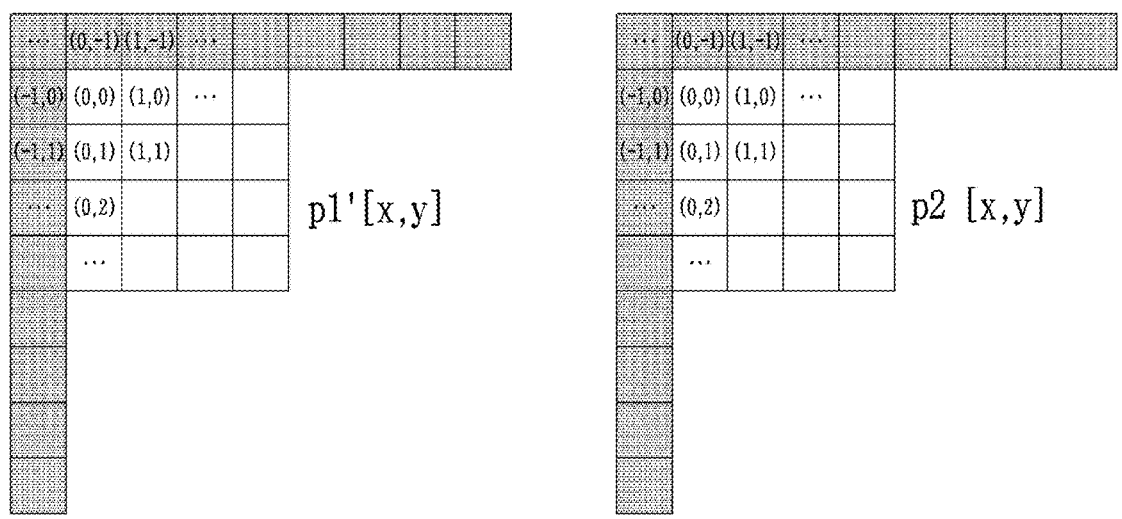
FIG. 23 is a diagram illustrating a sample of a first color component and a sample of a second color component.

FIG. 23 is a diagram illustrating a sample of a first color component and a sample of a second color component.

When there is a region with no reference sample in the process of deriving a prediction parameter, the prediction parameter can be derived using only existing samples.

One or more prediction parameters can be derived. For example, a first prediction parameter may be derived from reference samples having values satisfying a specific requirement among reference samples used to derive prediction parameters. In addition, a second prediction parameter may be derived from referenced samples having values that do not satisfy the specific requirement. The specific requirement may be a condition in which the value of a reference sample is less than a statistic figure (for example, an average value).

According to another embodiment of the present invention, a basic prediction parameter (default parameter) may be used instead of deriving a prediction parameter from values of reference samples. The default parameters may be predefined in the encoder and the decoder. For example, the prediction parameters a and b may be respectively 1 and 0.

Alternatively, when deriving prediction parameters from reference samples, the derived prediction parameters may be encoded and decoded.

When performing an inter color component prediction among color components Y, Cb, and Cr, prediction parameters used to predict color components Cb and Cr can be derived from a color component Y. Prediction parameters used to predict a color component Cr can be derived from a color component Cb. Alternatively, as prediction parameters for predicting a color component Cr, the prediction parameters that have been derived from a color component Y to predict a color component Cb can be used as they are, instead of deriving new prediction parameters for a prediction of the color component Cr.

Hereinbelow, the inter color component prediction execution step will be described.

As described above, after prediction parameters are derived, an inter color component intra prediction can be performed using at least any one of the derived prediction parameters.

For example, a prediction of a second color component target block can be performed by applying the derived prediction parameter to a reconstructed signal of the restructured first color component, according to Equation 23.

$$p2[x,y]=ax\, p1'[x,y]+b \quad \text{[Equation 23]}$$

In Equation 23, p2 [x, y] represents a prediction block of the second color component target block. p1'[x, y] represents the first color component block or the restructured first color component block.

Alternatively, the prediction of the second color component target block can be performed by applying the derived prediction parameter to a residual signal of the restructured first color component, according to Equation 24.

$$p2[x,y]=p2\_\text{pred}[x,y]+a \times p1'\_\text{residual}[x,y] \quad \text{[Equation 24]}$$

In Equation 24, p1' residual represents a residual signal of the first color component and p2_pred represents a prediction signal obtained by performing an intra prediction with respect to the second color component target block.

The predicted samples calculated by Equation 23 or Equation 24 are included in a second color component target block corresponding to a sample, a sample group, a line, or a block. Specifically, the predicted samples are applied to a boundary region of an intra-picture prediction block. In this case, the boundary region includes N columns adjacent to the left reference samples and/or M rows adjacent to the top reference samples, within the intra-picture prediction block. In this case, each of N and M is zero or a positive integer. Here, N and M have different values or the same value depending on least one of an intra prediction mode, a division depth of a block, a block shape, and a block size.

In order to improve the prediction accuracy of intra-picture prediction between color components, when performing an inter-color intra-picture prediction, the inter-color intra-picture prediction is performed by constructing a reference sample set consisting of only the top reference samples as the reference samples of a first color component block (corresponding block) and the reference samples of a second color component block (prediction target block), thereby generating a vertical inter-color intra-picture prediction block. For example, in the LM_A mode, only the top reference samples are used. Alternatively, it is possible to generate a horizontal inter-color intra-picture prediction block by performing an inter-color intra-picture prediction using a reference sample set consisting of only the left reference samples of the first color component block (corresponding block) and the left reference samples of the second color component block (prediction target block). For example, in the LM_L mode, only the left reference samples are used. An intra prediction block of the second color component block (prediction target block) is generated by calculating a statistical value of the vertical inter-color intra-picture prediction block and a horizontal inter-color intra-picture prediction block. The statistical value is, for example, a weighted sum.

In this case, the weighted sum is calculated in units of at least one of a sample, a sample group, a line, and a block.

The weights are differently set according to at least one of the intra prediction mode, the division depth, the size, and the shape of the current block and the sample position in the current block.

In this case, the weights applied to each basic unit differ. For example, the weight varies for each sample, sample group, line, or block.

Information on whether to perform a weighted sum operation is entropy-encoded/entropy-decoded. For example, whether to perform a weighted sum operation is determined according to a criterion that is preset in the encoder and the decoder. For example, whether to perform a weighted sum operation is adaptively determined on the basis of at least one of the coding parameters (i.e., a block division depth, a block size, a block shape, and an intra prediction mode) of at least one of the current block and the neighboring blocks.

In order to improve the prediction accuracy of inter-color intra-picture prediction, a second color component block (prediction target block) is divided into a plurality of regions (i.e., sample groups), and at least one of the reconstruction process, the prediction parameter derivation process, and the inter-color intra-picture prediction process is performed for each region. In this case, the samples of a first color component block (corresponding block) and the reference samples within the neighboring blocks, the prediction parameters, and the inter-color intra-picture prediction samples vary for each region. The region is determined on the basis of at least one of the coding parameters of the current block and the neighboring blocks.

In order to improve the prediction accuracy of inter-color intra-picture prediction, the inter-color intra-picture prediction is performed on a per N×M or larger block. In this case, N and M are the same positive integer or different positive integers, depending on least one of an intra prediction mode, a block division depth, a block shape, and a block size. When the inter-color intra-picture prediction is performed on only N×M or larger blocks, information on whether the inter-color intra-picture prediction is used is not entropy-encoded/entropy-decoded. For example, whether to use the inter-color intra-picture prediction is determined according to a criterion that is preset in the encoder and the decoder. For example, whether to use the inter-color intra-picture prediction is adaptively determined on the basis of at least one of the coding parameters (i.e., a block division depth, a block size, a block shape, and an intra prediction mode) of at least one of the current block and the neighboring blocks.

When performing the inter-color intra-picture prediction, since prediction for a second color component block (prediction target block) uses the samples in a first color component block (corresponding block) but does not use neighboring reference samples adjacent to the second color component block (prediction target block), discontinuity is likely to occur between the neighboring reference samples adjacent to the second color component block (target block) and the samples within the second color component block (target block). In order to reduce the discontinuity, after the second color component block (target block) is generated, boundary filtering is performed on the boundary regions within the second color component block (target block). Whether to perform the boundary filtering is determined on the basis of at least one of the coding parameters of the current block and the neighboring blocks. That is, in the planar mode, boundary filtering is performed on at least one of the left boundary and the top boundary of the second color component block (target block), on the basis of at least one of an intra-picture prediction mode, a block size, a block shape, a filter coefficient, a filter shape, and a filter tap count.

For example, the boundary filtering is performed on at least one sample included in N columns adjacent to the left reference samples and/or at least one sample included in M rows adjacent to the top reference samples, within the second color component block (target block). Here, N and M are positive integers or 0, N is a positive integer less than or equal to the width W of the second color component block (target block), and M is a positive integer less than or equal to the height H of the second color component block (target block). For example, the boundary filtering is performed using the left and top reference samples adjacent to the second color component block (target block) line by line. Here, N and M are the same positive integer or different positive integers, depending on least one of an intra prediction mode, a block division depth, a block shape, and a block size.

When the number of the derived prediction parameters is one or more, one or more prediction parameters may be applied to the reconstructed sample of the first color component. For example, when the reconstructed sample of the first color component satisfies a specific requirement, the inter color component intra prediction may be performed by applying the first prediction parameter derived from the reference samples that satisfy the specific requirement. Meanwhile, when the reconstructed sample of the first color component does not satisfy the specific requirement, the inter color component intra prediction may be performed by applying the second prediction parameter derived from the reference samples that do not satisfy the specific requirement. The specific requirement means a condition that the value of a reference sample is less than a statistic figure (for example, an average value) of the reference samples of the first color component.

The inter color component prediction method may be used in an inter prediction mode. For example, when performing the inter prediction on the current block, inter prediction is performed for a first color component, and inter color component prediction or prediction combining inter prediction and inter color component prediction may be performed for a second color component. For example, the first color component may be a luma component, and the second color component may be a chroma component.

The inter-color component prediction may be performed using the prediction sample or the reconstructed sample of the luminance component. For example, after the inter prediction for the luminance component is performed, prediction for a color component may be performed by applying inter-color component prediction parameters to the prediction sample resulting from the inter prediction of the luminance component. Here, the prediction sample refers to a sample that has undergone at least one of motion compensation, motion refinement, overlapped block motion compensation (OBMC), and bi-directional optical flow (BIO).

In addition, the inter color component prediction may be performed adaptively according to the coding parameters of the first color component. For example, it is possible to determine whether to perform inter color component prediction according to CBF information of the first color component. The CBF information may be information indicating whether a residual signal exists or not. That is, when the CBF of the first color component is 1, inter color component prediction may be performed on the second color component. When the CBF of the first color component is 0, inter color component prediction may not be performed on the second color component, and the inter prediction may be performed on the second color component. Alternatively, a flag indicating whether or not to perform the inter color component prediction may be signaled.

When coding parameters of the first color component satisfies a predetermined condition, a flag indicating whether to perform the inter-color component prediction may be signaled. For example, when the CBF of the first color component is 1, the flag may be signaled to determine whether to perform color component prediction.

When performing inter-color component prediction for the second color component, an inter motion prediction or compensation value for the second color component may be used. For example, inter motion prediction or compensation for the second color component may be performed using inter prediction information of the first color component. In addition, prediction may be performed by calculating the weighted sum of the inter-color component prediction value for the second color component and the inter motion compensation value.

According to one embodiment of the present invention, intra-picture prediction based on implicit partition is performed for intra-picture prediction of a current block.

A conventional intra-picture prediction method is limited in coding efficiency because it uses only intra-picture prediction modes of neighboring blocks and samples of the neighboring blocks. In order to improve the coding efficiency, the implicit block partition-based intra-picture prediction method uses size information and block partition information of neighboring blocks for implicit partition of a current block.

Figure 24:
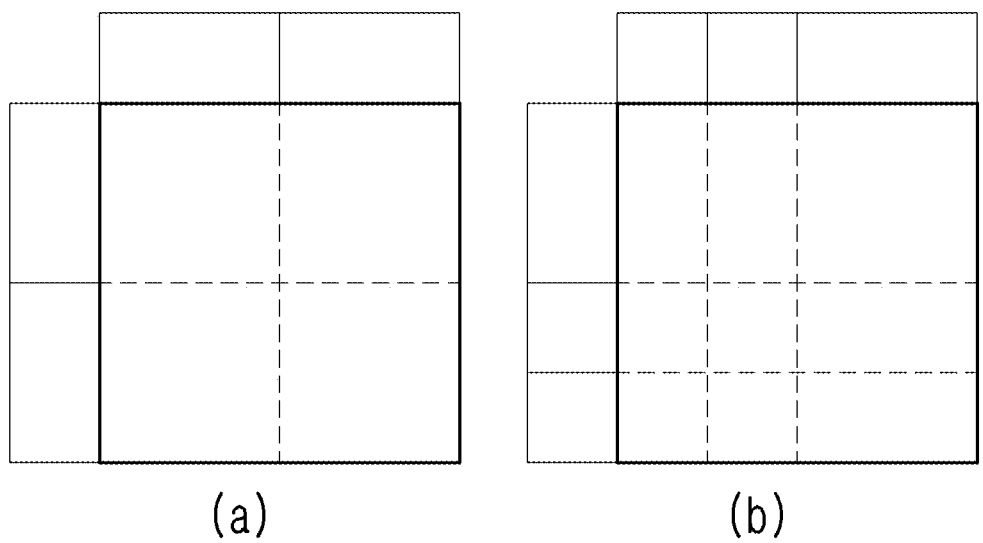
FIG. 24 is a view illustrating an implicit partition-based intra-picture prediction process, according to one embodiment of the present invention.

FIG. 24 is a view illustrating an implicit partition-based intra-picture prediction process, according to one embodiment of the present invention.

As illustrated in FIG. 24, a neighboring block can be divided into sub-blocks having various shapes, and a current block can be implicitly divided according size information and/or partition information of the neighboring block. Here, thin solid lines represent the boundaries of neighboring blocks of a current block, thick solid lines represent the boundaries of the current block, and dotted lines represent the boundaries of implicit blocks of the current block. That is, the current block is implicitly divided according to the size and/or partition depth of the left neighboring block of the current block and the size and/or partition depth of the top neighboring block of the current block.

For example, the implicitly partitioned regions within the current block are sub-blocks. At least one of the intra-picture prediction mode derivation, the reference sample construction, the non-directional intra-picture prediction, the directional intra-picture prediction, and the position information-based intra-picture prediction, and the inter-color intra-picture prediction is performed on a per sub-block basis. In this case, a reference sample set for intra-picture prediction is constructed on the basis of the reconstructed neighboring samples on a per sub-block basis.

At least one of the intra-picture prediction modes of a sub-block and spatially neighboring blocks of the sub-block is used to generate an intra-picture prediction block for each sub-block. After that, a statistical value of the generated intra-picture prediction blocks is calculated and the calculated statistical value is used as an intra-picture prediction block of the sub-block. The statistical value is, for example, a weighted sum.

In this case, the weighted sum is calculated in units of at least one of a sample, a sample group, a line, and a block.

The weighted sum operation is performed on the boundary regions of the intra-picture prediction block. In this case, the boundary region includes N columns adjacent to the left reference samples and M rows adjacent to the top reference samples, within the intra-picture prediction block of the sub-block. In this case, each of N and M is zero or a positive integer. Here, N and M have different values or the same value, depending on least one of an intra prediction mode, a block division depth, a block shape, and a block size. In this case, the current block is a sub-block, a sub-block group, or a block.

The weights used to calculate the weighted sum are differently set according to at least one of the intra prediction mode, the division depth, the size, and the shape of the current block and the sample position in the current block.

Information on whether the implicit block division is performed is entropy-encoded/entropy-decoded. For example, whether to perform the implicit block division is determined according to a criterion that is preset in the encoder and the decoder. For example, whether to perform the implicit block division is adaptively determined on the basis of at least one of the coding parameters (i.e., a block division depth, a block size, a block shape, and an intra prediction mode) of at least one of the current block and the neighboring blocks.

When performing the implicit block division-based intra-picture prediction, boundary filtering is performed on at least one of the left boundary and the top boundary of the current intra-picture prediction block. The boundary filtering is performed on the basis of at least one of the intra prediction mode, the size, the shape, the filter coefficient, the filter shape, and the filter tap count of the current block. In this case, the current block is a sub-block, a sub-block group, or a block.

The boundary filtering is performed on at least one sample included in N columns adjacent to the left reference samples and/or at least one sample included in M rows adjacent to the top reference samples, within the intra-picture prediction block. In this case, each of N and M is zero or a positive integer. Here, N and M have different values or the same value, depending on least one of an intra prediction mode, a block division depth, a block shape, and a block size.

In addition, an offset value is added to at least one of the sub-blocks generated through the implicit block division-based intra-picture prediction. In this case, the offset value is calculated in units of at least one of a sample, a sample group, a line, a sub-block, and a block. That is, the offset value varies for each basic unit. The offset value varies according to at least one of the intra prediction mode, the division depth, the size, and the shape of the current block and the sample position in the current block. For example, the offset value is a difference between the statistical value of the samples in the sub-block and the statistical value of the neighboring reference samples. Specifically, the offset value is added to the boundary regions of the sub-block. In this case, the boundary region includes N columns adjacent to the left reference samples and/or M rows adjacent to the top reference samples, within the sub-block. In this case, each of N and M is zero or a positive integer. Here, N and M have different values or the same value, depending on least one of an intra prediction mode, a block division depth, a block shape, and a block size.

By performing low-pass filtering on the boundaries of the implicit block (i.e., the boundaries between sub-blocks), it is possible to reduce the blocking artifacts occurring at the boundaries.

Inverse transform, dequantization, transform coefficient encoding/decoding, and the like are performed on the current block that is implicitly divided. Alternatively, the inverse transform, dequantization, transform coefficient encoding/decoding, and the like are performed on the current block that is not implicitly divided.

According to one embodiment of the present invention, a weighted sum operation is performed on prediction blocks generated through an intra-picture prediction mode-based intra-picture prediction of a current block. For example, 65 intra-picture prediction modes having directionality has only an angle difference of about 2.8° between adjacent modes. Therefore, some intra-picture prediction modes having a small angle difference therebetween do not significantly contribute to improvement in coding efficiency. Therefore, by performing a weighted sum operation on intra-picture prediction blocks generated using a plurality of intra-picture prediction modes instead of using the intra-picture prediction mode of the current block, it is possible to improve the coding efficiency. In addition, by using the intra-picture prediction mode of the current block together with the intra-picture prediction mode derived from the intra-picture prediction mode of the current block, the residual signal is reduced due to the smoothing of the samples within the intra-picture prediction block, thereby improving the coding efficiency. For example, the derived intra prediction mode is a mode adjacent to the intra-picture prediction mode of the current block.

Figure 25:
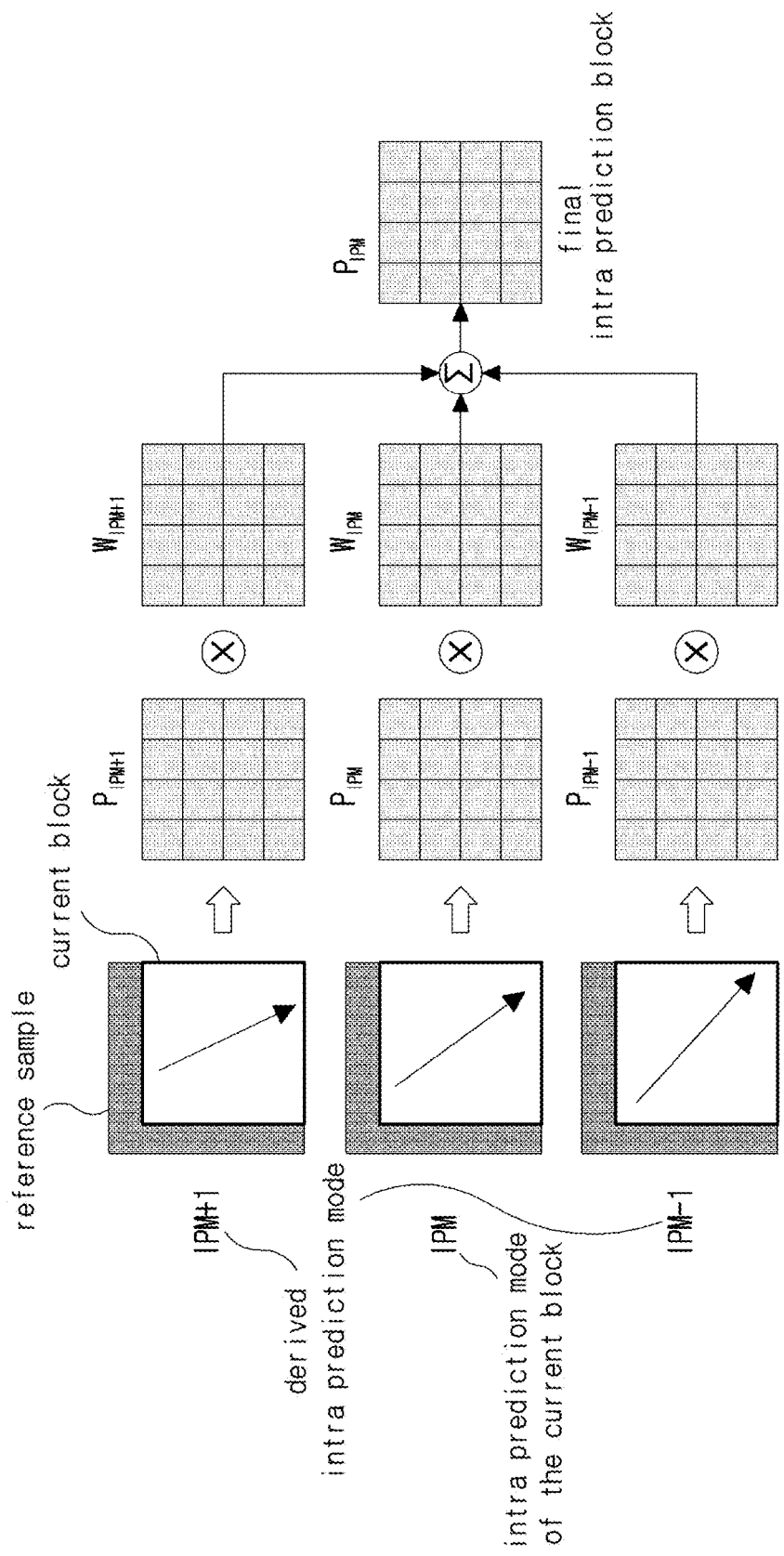
FIG. 25 is an exemplary diagram illustrating a weighted sum operation performed on intra-picture mode-based intra-picture prediction blocks.

FIG. 25 is an exemplary diagram illustrating a weighted sum operation performed on intra-picture mode-based intra-picture prediction blocks.

In the example illustrated in FIG. 25, when the intra-picture prediction mode of a current block current is IPM, three intra-picture prediction blocks $P_{IPM}$, $P_{IPM-1}$ and $P_{IPM+1}$ are generated respectively using the IPM, an IPM−1, and an IPM+1 in which the IPM−1 represents an intra-picture prediction mode adjacent to the intra-picture prediction mode of the current block (i.e., a prediction mode having a mode number that is one less than the mode number of the intra-picture prediction mode of the current block), and the IPM+1 represents an intra-picture prediction mode adjacent to the intra-picture prediction mode of the current block that is one greater than the mode number of the intra-picture prediction mode of the current block. After that, the weighted sum of the three intra-picture prediction blocks is determined as a final intra-picture prediction block $P_{IPM}$ of the current block. In this case, the weights applied to the respective intra-picture prediction blocks are respectively $W_{IPM}$, $W_{IPM-1}$, and $W_{IPM+1}$.

Intra prediction modes IPM+k and IPM−k can be used instead of the intra prediction modes IPM+1 and IPM−1. In this case, K is an integer of 2 or greater.

When the IPM+k or IPM−k is not available, only an available intra-prediction mode is used. According to another embodiment of the present invention, when the IPM of the current block is a directional mode and at least one of the IPM+k and IPM−k is a non-directional mode, the non-directional mode is considered unavailable. According to a further embodiment of the present invention, when the IPM of the current block is a non-directional mode and at least one of the IPM+k and IPM−k is a directional mode, the directional mode is considered unavailable. According to a further embodiment of the present invention, at least one of the IPM, IPM+k, and IPM−k is used regardless of being directional or non-directional.

The number of intra-picture prediction modes used for the weighted sum operation of the intra-picture prediction mode-based intra-picture prediction blocks is not limited to three. It may be N or greater. Here, N is a positive integer.

The intra-picture prediction modes for use in the intra-picture prediction mode-based intra-picture prediction block weighted sum operation include at least one of the intra-picture prediction modes of temporal/spatial neighboring blocks of the current block as well as intra-picture prediction modes adjacent to the intra-picture prediction mode of the current block. In this case, the spatial neighboring block includes at least one of a top block, a left block, a top right corner block, a bottom left corner block and a top left corner block all of which are spatially adjacent to the current block. In this case, the temporal neighboring block may be a block specified on the basis of the position of the current block, within a reference picture. For example, the temporal neighboring block is a co-located block that is a block disposed at the same position as the current block, within a reference picture, or a blocks spatially adjacent to the co-located block, in which the blocks spatially adjacent to the co-located block include at least one of the top, bottom, left, and right blocks and the top right, bottom left, top left, and bottom right corner bocks. When the number of spatial/temporal neighboring blocks is more than one, the more than one neighboring blocks are used in order of a predetermined priority.

The intra-picture prediction modes for use in the intra-picture prediction mode-based intra-picture prediction block weighted sum operation include at least one of directional intra-picture prediction modes, non-directional intra-picture prediction modes, and inter-color intra-picture prediction modes.

In addition, when an intra-picture prediction block generated using the intra-picture prediction mode of the current block and an inter-picture prediction block of the current block are generated, the weighted sum of the generated intra-picture prediction block and the generated inter-picture prediction block is calculated, and the weighted sum is determined as a final intra picture prediction block of the current block. That is, the weighted sum of the generated intra-picture prediction block and the generated inter-picture prediction block is calculated. That is, the intra-picture prediction mode-based intra-picture prediction block weighted sum operation is performed to generate a prediction block of the current block. In other words, when performing the intra-picture prediction mode-based intra-picture prediction block weighted sum operation, the weighted sum with respect to the intra-picture prediction block and the inter-picture prediction block can be calculated instead of the weighted sum with respect to only the intra-picture prediction blocks. Herein, a method of calculating the weighted sum using only the intra-picture prediction blocks will be described in detail. However, the method can also be applied to calculation of the weighted sum of an intra-picture prediction block and an inter-picture prediction block, according to one embodiment of the present invention.

Whether the intra-picture prediction mode-based intra-picture prediction block weighted sum operation is performed is determined according to the intra-picture prediction mode of the current block. For example, the intra-picture prediction mode-based intra-picture prediction block weighted sum operation is performed only when the intra-picture prediction mode of the current block is an odd number mode or an even number mode. Alternatively, for example, the intra-picture prediction mode-based intra-picture prediction block weighted sum operation is performed only when the intra-picture prediction mode of the current block is a directional intra-picture prediction mode or a non-directional intra-picture prediction mode. Further alternatively, for example, the intra-picture prediction mode-based intra-picture prediction block weighted sum operation is performed only when the intra-picture prediction mode of the current block is an inter-color intra-picture prediction mode. Further alternatively, for example, the intra-picture prediction mode-based intra-picture prediction block weighted sum operation is performed only when the intra-picture prediction mode of the current block is a directional intra-picture prediction mode which is specifically an odd number mode. Further alternatively, for example, the intra-picture prediction mode-based intra-picture prediction block weighted sum operation is performed only when the intra-picture prediction mode of the current block is a directional intra-picture prediction mode which is specifically an even number mode. Further alternatively, for example, the intra-picture prediction mode-based intra-picture prediction block weighted sum operation is performed only when the difference between the value of the intra-picture prediction mode of the current block and the value of the intra-picture prediction block of the neighboring block is less than a threshold value. Further alternatively, for example, the intra-picture prediction mode-based intra-picture prediction block weighted sum operation is performed only when the intra-picture prediction mode of the current block differs from the intra-picture prediction mode of the spatial neighboring block.

Whether the intra-picture prediction mode-based intra-picture prediction block weighted sum operation is performed is determined according to at least one of the coding parameters of the current block and the neighboring blocks.

Likewise, the number of the weights used in the calculation of the intra-picture prediction mode-based intra-picture prediction block weighted sum operation is not limited to three as in the above example, and M or more weights can be used. Here, M is a positive integer of two or more For example, when calculating the weighted sum of three intra prediction blocks, the weights are $\{1/4, 2/4, 1/4\}$, $\{1/8, 2/8, 3/8\}$, $\{1/8, 6/8, 1/8\}$, $\{3/16, 10/16, 3/16\}$, or $\{1/16, 14/16, 1/16\}$. Among the examples of the weight, the weight applied to the intra-picture prediction mode of the current block may be a value existing in the middle of a set of weights. For example, the weight applied to the intra-picture prediction block generated using the intra-picture prediction mode IPM is $2/4$, and the weights applied to the intra-picture prediction blocks generated respectively using the intra-picture prediction modes IPM−1 and IPM+1 are equally $1/4$. Here, the weight used for the intra-picture prediction mode of the current block has a relatively larger value than the weight used for the other intra-picture prediction modes.

The weights used for the intra-picture prediction mode-based intra-picture prediction block weighted sum operation are determined on a per sample basis, a sample group basis, a per line basis, or a per block basis. That is, the basis unit for the weighted sum operation is a sample, a sample group, a line, or a block. That is, the weight varies according to each basis unit used for the weighted sum operation. In addition, the weighted sum operation is performed on the boundary regions of an intra-picture prediction block. In this case, the boundary regions include N columns adjacent to the left reference samples and M rows adjacent to the top reference samples, within the intra-picture prediction block of the current block. In this case, each of N and M is zero or a positive integer. Here, N and M have different values or the same value, depending on at least one of an intra prediction mode, a block division depth, a block shape, and a block size. In addition, the weight varies according to at least one of the intra-picture prediction mode, the division depth, the size, the shape of the current block and the sample position in the current block.

An offset value is added to at least one of the intra-picture prediction blocks, each being generated using one of the multiple intra-picture prediction modes at the time of performing the intra-picture prediction mode-based intra-picture prediction block weighted sum operation. In this case, the offset value is calculated in units of at least one of a sample, a sample group, a line, and a block. That is, the offset value varies for each basic unit. In addition, the offset value varies according to at least one of the intra-picture prediction mode, the division depth, the size, the shape of the current block and the sample position in the current block. For example, the offset value is a difference between the statistical value of the samples within the intra-picture prediction block of the current block and the statistical value of the surrounding reference samples. In addition, the offset value is added to the boundary regions of an intra-picture prediction block. In this case, the boundary regions include N columns adjacent to the left reference samples and M rows adjacent to the top reference samples, within the intra-picture prediction block of the current block. In this case, each of N and M is zero or a positive integer. Here, N and M have different values or the same value, depending on at least one of an intra prediction mode, a block division depth, a block shape, and a block size.

Boundary filtering is performed on at least one of the left boundary and the top boundary of an intra-picture prediction block generated by performing the intra-picture prediction mode-based intra-picture prediction block weighted sum operation according to at least one of an intra-picture prediction mode, a block division depth, a block size, a block shape, a filter coefficient, a filter shape, and a filter tap count. The boundary filtering is performed on at least one sample included in N columns adjacent to the left reference samples and/or at least one sample included in M rows adjacent to the top reference samples, within an intra-picture prediction block of the current block. In this case, each of N and M is zero or a positive integer. Here, N and M have different values or the same value, depending on at least one of an intra prediction mode, a block division depth, a block shape, and a block size.

Information on whether the intra-picture prediction mode-based intra-picture prediction block weighted sum operation is performed is entropy-encoded/entropy-decoded. Alternatively, whether the intra-picture prediction mode-based intra-picture prediction block weighted sum operation is performed is determined according to a criterion that is preset in the encoder and the decoder. Alternatively, whether the intra-picture prediction mode-based intra-picture prediction block weighted sum operation is performed is adaptively determined according to at least one of the coding parameters (a block division depth, a block size, a block shape, and an intra-picture prediction mode) of the current block and the neighboring blocks.

When the intra-picture prediction mode-based intra-picture prediction block weighted sum operation is performed according to the intra-picture prediction mode of the current block, the information on whether the intra-picture prediction mode-based intra-picture prediction block weighted sum operation is performed is not entropy-encoded/entropy-decoded because the intra-picture prediction mode-based intra-picture prediction block weighted sum operation is performed instead of the intra-picture prediction method indicated by the intra-picture prediction mode.

For the current block, low-pass filtering is performed on the samples within the intra-picture prediction block that is calculated through the intra-picture prediction mode-based intra-picture prediction block weighted sum operation.

The intra-picture prediction mode-based intra-picture prediction block weighted sum operation is performed only when the size of the current block is M×N or larger. In this case, M and L are positive integers. In addition, N and M are different positive integers or the same positive integer. In addition, N and M are values preset in the encoder/decoder or values derived from the signaled information.

The intra-picture prediction mode-based intra-picture prediction block weighted sum operation is performed only when the current block is a luminance block. The intra-picture prediction mode-based intra-picture prediction block weighted sum operation is performed only when the current block is a chrominance block.

In the intra-picture prediction mode-based intra-picture prediction block weighted sum operation, an intra-picture prediction block of the current block is generated by using a median value of samples within intra-picture prediction blocks.

When performing intra or inter prediction, a first color component may undergo intra prediction and a second color component may undergo inter prediction. For example, the first color component is a luminance component, and the second color component is a chrominance component. Conversely, the first color component may be a chrominance component and the second color component may be a luminance component.

Regarding application of filtering to the prediction samples, whether to apply filtering or not may be determined depending on at least one of the intra prediction mode, size (width and height), block shape, multiple sample line-based prediction, and color component of the current block. The filtering refers to a method of filtering one or more prediction samples using one or more reference samples.

For example, when the intra prediction mode of the current block is a predetermined mode, the filtering may be applied to the prediction samples. For example, the predetermined mode is a directional mode, a non-directional, a horizontal mode, or a vertical mode.

For example, when the size of the current block falls within a predetermined size range, the filtering may be applied to the prediction samples. For example, when the current block has a width less than 64 and a height less than 64, the filtering may be applied. Alternatively, when the width or height of the current block is larger or smaller than a predetermined size, the filtering may be applied.

For example, whether to apply filtering to the prediction samples may be determined depending on the reference sample line used for the prediction. For example, when the reference sample line used for the prediction is the first reference sample line adjacent to the current block, the filtering may be applied. On the other hand, when the reference sample line is one of the second and onward reference sample lines positioned around the current block, the filtering may not be applied. The indicator mrl_index may be used to determine the reference sample line. For example, when the index for the current block is zero, the filtering is applied. However, when the index for the current block is a value greater than zero, the filtering is not applied.

For example, when the color component of the block element is a luminance signal, the filtering is applied. However, when the color component of the current block is a chrominance signal, the filtering is not applied.

The prediction for the current block can be performed by combining one or more exemplary prediction methods described above.

For example, the prediction for the current block may be performed by calculating the weighted sum of a prediction value obtained using a predetermined non-directional intra prediction mode and a prediction value obtained using a predetermined directional intra prediction mode. In this case, the weights may vary depending on at least one of the intra prediction mode of the current block, the size/shape of the current block, and the position of the prediction target sample.

For example, the prediction for the current may be performed by calculating the weighted sum of a prediction value obtained using a predetermined intra prediction mode and a prediction value obtained predicted using a predetermined inter prediction mode. In this case, the weights may vary depending on at least one of the encoding mode, the intra prediction mode, the inter prediction mode, and the size/shape of the current block. For example, when the intra prediction mode is a non-directional mode such as DC or Planar, a weight corresponding to ½ may be applied to an intra prediction sample and an inter prediction sample, respectively. Alternatively, when the intra prediction mode is a vertical mode, the weight for the intra prediction sample decreases with distance from the reference sample line above the current block. Similarly, when the intra prediction mode is a horizontal mode, the weight for the intra sample decreases with distance from the reference sample line on the left side of the current block. The sum of the weight applied to the intra prediction sample and the weight applied to the inter prediction sample may be any one of the powers of two. That is, it may be any of 4, 8, 16, 32, and so forth. For example, when the size of the current block is within a predetermined size range, a weight corresponding to ½ may be applied to the intra prediction sample and the inter prediction sample, respectively.

The intra prediction mode may be fixed to DC mode and Planar mode, or may be determined through signaling of information. Alternatively, the intra prediction mode may be any mode selected from among MPM candidate modes, and may be determined through The MPM candidate modes are derived from the intra prediction modes of neighboring blocks. The mode of the neighboring block can be replaced with a predetermined representative mode. For example, the intra prediction mode of a neighboring block is a directional mode of a specific direction categorized into a vertical direction group, the mode of the neighboring block is replaced with the vertical mode. On the other hand, when the intra prediction mode of a neighboring block is a directional mode of a specific direction categorized into a horizontal direction group, the mode of the neighboring block is replaced with the horizontal mode.

The inter prediction may be at least one of DC mode, merge mode, and AMVP mode. When the inter prediction mode of the current block is merge mode, the prediction for the current block may be performed by calculating the weighted sum of the inter prediction value obtained by using motion information corresponding to a merge index and the prediction value obtained by using DC or Planar mode.

For example, the prediction for the current block may be performed by calculating the weighted sum of one or more prediction samples obtained by using multiple sample lines. For example, the prediction may be performed by calculating the weighted sum of a first prediction value obtained by using the first reference sample line near the current block and a second prediction value obtained by using the second and onward reference sample lines near the current block. The reference sample lines used to obtain the second prediction value may be reference sample lines indicated by mrl_index. The weights for the first prediction value and the second prediction value may be equal. Alternatively, weights for the first prediction value and the second prediction value may vary depending on at least one of the intra prediction mode of the current block, the size/shape of the current block, and the position of the sample to be prediction. The first prediction value may be a value predicted using a predetermined mode. For example, the first prediction value may be a value predicted using at least one of DC mode and Planar mode. The second prediction value may be a value predicted using the intra prediction mode of the current block, which is derived in the available intra prediction mode derivation step.

When prediction is performed by calculating the weighted sum of one or more prediction samples, filtering may not be performed on the prediction samples.

For example, an intra-picture prediction block of the current block is constructed by calculating the sum of the blocks predicted respectively using a predetermined non-directional intra-picture prediction mode and a predetermined directional intra-picture prediction mode. In addition, the weights vary according to at least one of an intra-picture prediction mode, a block size, and a sample position.

For example, the prediction for the current block is performed by calculating the weighted sum of a prediction value obtained using a predetermined intra-picture prediction mode and a prediction value obtained using a predetermined inter-picture prediction mode. In this case, the weights may vary according to at least one of the intra-picture prediction mode, the inter-picture prediction mode, and the size/shape of the current block.

For example, when combining one or more intra-picture prediction modes, a prediction block is constructed by calculating the weighted sum of a prediction value obtained using an intra-picture prediction mode of the current block and a prediction value obtained using a predetermined mode included in an MPM list.

When using at least one of the intra-picture prediction methods described above, intra-picture prediction can be performed using one or more reference sample sets. For example, intra-picture prediction for the current block is performed by using the weighted sum of an intra-picture prediction block generated by using unfiltered reference samples and an intra-picture prediction block generated by using filtered reference samples.

In the process of using at least one of the intra-picture prediction methods described above, a filtering process using neighboring reconstructed samples is performed. Whether the filtering process is performed is determined on the basis of at least one of the intra-picture prediction mode, the size, and the shape of the current block. The filtering is a processing operation included in an intra-picture prediction process. When performing the filtering, at least one of a filter tap, a filter coefficient, a filter tap count, a filter coefficient, the number of filtering target lines, and the number of filtering target samples varies depending on at least one of the intra-picture prediction mode, the size, and the shape of the current block.

In the prediction process, the current block is divided into sub-blocks, and intra-picture prediction blocks of the respective sub-blocks are derived using the intra-picture prediction modes of the neighboring blocks. In this case, filtering is applied to each sub-block within the current block. For example, a low-pass filter is applied to the entire area of the current block. Alternatively, a filter is applied to the samples located at the boundary of each sub-block.

When the current block is divided into sub-blocks and intra-picture prediction is performed on each sub-block, each sub-block means at least one of an encoded/decoded block, a prediction block, and a transform block. For example, when the size of the current block is 64×64 and the size of the sub-block is 16×16, intra-picture prediction is performed by deriving intra-picture prediction modes of respective sub-blocks. In this case, when one or more sub-blocks are further divided into smaller sub-blocks having an 8×8 or 4×4 size, each 8×8 or 4×4 sub-block means a transform block. In this case, the intra-picture prediction mode of a 16×16 block is used.

In performing the directional intra-picture prediction, the current block is encoded/decoded using one or more (for example, N) directional intra-picture prediction modes. Here, N is one of positive integers including 33 and 65. In this case, each directional intra-picture prediction mode has an angular value.

In the directional intra-picture prediction, the current block is encoded/decoded using a directional intra-picture prediction mode in units of M samples. Here, M is a positive integer. In this case, the sample-based directional intra-picture prediction mode is a mode for performing prediction using one or more directional intra-picture prediction modes in units of one or more prediction target samples within the current block.

The above embodiments may be performed in the same method in an encoder and a decoder.

An image may be encoded/decoded by using at least one or a combination of at least one among the above embodiments.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or the corresponding tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes: optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method performed by an image decoding apparatus, the image decoding method comprising:
deriving index information indicating one of a plurality of reference sample lines;
deriving a reference sample line of a current block based on the index information;
deriving an intra prediction mode for the current block based on intra mode information; and
deriving prediction samples for the current block based on the reference sample line and the intra prediction mode,
wherein the intra mode information includes at least one of Most Probable Mode (MPM) flag information, an MPM index indicating an intra prediction mode candidate included in an MPM list, and remaining mode information indicating a remaining mode, and wherein only the MPM index among (i) the MPM flag information, (ii) the MPM index and (iii) the remaining mode information is signaled based on the index information not indicating a first reference sample line adjacent to the current block.

2. The image decoding method of claim 1, wherein the intra prediction mode is not a planar mode based on the index information not indicating the first reference sample line.

3. The image decoding method of claim 1, wherein the index information is signaled based on whether an upper boundary of the current block is an upper boundary of a Coding Tree Unit (CTU).

4. The image decoding method of claim 1, wherein the index information is not signaled based on the upper boundary of the current block being the upper boundary of a Coding Tree Unit (CTU), and wherein the reference sample line is derived as the first reference sample line based on the index information not being signaled.

5. The image decoding method of claim 1, wherein the deriving of the reference sample line includes determining availability for reference samples, and wherein an unavailable reference sample is replaced based on an available reference sample adjacent to the unavailable reference sample.

6. An image encoding method performed by an image encoding apparatus, the image encoding method comprising:

deriving one of a plurality of reference sample lines as a reference sample line of a current block;

deriving an intra prediction mode for the current block;

deriving prediction samples for the current block based on the reference sample line and the intra prediction mode; and encoding image information including index information indicating one of the plurality of reference sample lines and intra mode information for the intra prediction mode, wherein the intra mode information includes at least one of Most Probable Mode (MPM) flag information, an MPM index indicating an intra prediction mode candidate included in an MPM list, and remaining mode information indicating a remaining mode, and wherein only the MPM index among (i) the MPM flag information, (ii) the MPM index and (iii) the remaining mode information is signaled based on the reference sample line not being the first reference sample line adjacent to the current block.

7. The image encoding method of claim 6, wherein the intra prediction mode is not a planar mode based on the reference sample line not being the first reference sample line.

8. The image encoding method of claim 6, wherein the index information is encoded based on whether an upper boundary of the current block is an upper boundary of a Coding Tree Unit (CTU).

9. The image encoding method of claim 6, wherein the first reference sample line adjacent to the current block is derived as the reference sample line and the index information is not encoded, based on an upper boundary of the current block being an upper boundary of a Coding Tree Unit (CTU).

10. The image encoding method of claim 6, wherein the deriving of the reference sample line includes determining availability for reference samples, and wherein an unavailable reference sample is replaced based on an available reference sample adjacent to the unavailable reference sample.

11. A transmitting method for image data, the method comprising:

obtaining a bitstream of encoded image information, wherein the encoded image information is generated based on deriving one of a plurality of reference sample lines as a reference sample line of a current block, deriving an intra prediction mode for the current block; deriving prediction samples for the current block based on the reference sample line and the intra prediction mode, and encoding image information including index information indicating one of the plurality of reference sample lines and intra mode information for the intra prediction mode, and transmitting the image data comprising the bitstream, wherein the intra mode information includes at least one of Most Probable Mode (MPM) flag information, an MPM index indicating an intra prediction mode candidate included in an MPM list, and remaining mode information indicating a remaining mode, and wherein only the MPM index among (i) the MPM flag information, (ii) the MPM index and (iii) the remaining mode information is signaled based on the reference sample line not being the first reference sample line adjacent to the current block.

12. The transmitting method of claim 11, wherein the intra prediction mode is not a planar mode based on the reference sample line not being the first reference sample line.

13. The transmitting method of claim 11, wherein the index information is encoded based on whether an upper boundary of the current block is an upper boundary of a Coding Tree Unit (CTU).

14. The transmitting method of claim 11, wherein the first reference sample line adjacent to the current block is derived as the reference sample line and the index information is not encoded, based on an upper boundary of the current block being an upper boundary of a Coding Tree Unit (CTU).

15. The transmitting method of claim 11, wherein the deriving of the reference sample line includes determining availability for reference samples, and wherein an unavailable reference sample is replaced based on an available reference sample adjacent to the unavailable reference sample.

* * * * *